United States Patent [19]
Baji et al.

[11] Patent Number: 5,535,417
[45] Date of Patent: Jul. 9, 1996

[54] ON-CHIP DMA CONTROLLER WITH HOST COMPUTER INTERFACE EMPLOYING BOOT SEQUENCING AND ADDRESS GENERATION SCHEMES

[75] Inventors: Toru Baji, San Jose, Calif.; Atsushi Kiuchi, Kunitachi, Japan

[73] Assignee: Hitachi America, Inc., Tarrytown, N.Y.

[21] Appl. No.: 127,429

[22] Filed: Sep. 27, 1993

[51] Int. Cl.[6] .................................................. G06F 13/28
[52] U.S. Cl. ......................... 395/842; 395/829; 395/853
[58] Field of Search .............................. 364/200 MS File, 364/900 MS File; 395/275, 425, 400, 842–848, 853, 855, 829

[56] References Cited

U.S. PATENT DOCUMENTS

| | | | |
|---|---|---|---|
| 4,467,420 | 8/1984 | Murakami et al. | 395/425 |
| 4,760,524 | 7/1988 | Iwasaki et al. | 395/800 |
| 4,896,266 | 1/1990 | Klashka et al. | 395/275 |
| 4,920,480 | 4/1990 | Murakami et al. | 395/800 |
| 5,155,812 | 10/1992 | Ehlig et al. | 395/275 |
| 5,175,864 | 12/1992 | Tairaku et al. | 395/800 |
| 5,179,689 | 1/1993 | Leach et al. | 395/425 |
| 5,228,139 | 7/1993 | Miwa et al. | 395/575 |
| 5,276,836 | 1/1994 | Fukumaru et al. | 395/425 |
| 5,379,381 | 1/1995 | Lamb | 395/275 |
| 5,440,749 | 8/1995 | Moore et al. | 395/800 |

*Primary Examiner*—Matthew M. Kim
*Attorney, Agent, or Firm*—Flehr, Hohbach, Test, Albritton & Herbert

[57] ABSTRACT

A single chip digital signal processor (DSP) includes memory mapped resources and an on-chip direct memory access controller (DMAC). The memory mapped resources of the DSP include an on-chip program memory, an on-chip data memory, internal registers and memory mapped external memories and peripheral devices. The DMAC includes a host computer interface that processes host originated data transfer commands for transferring data to and from memory mapped resources of the DSP, and commands for setting the mode of operation of the DSP. The DMAC also has a dedicated interrupt controller for handling interrupts from a host computer and from peripheral devices. The DMAC processes interrupts from the host while a primary direct memory access transfer is being performed by the DMAC without having to store address register and count register information in a memory stacking area. As a result, the DMAC can switch from a primary DMA transfer to a host data transfer and back without using any instruction cycles for "overhead" associated with storing and restoring registers in a memory stacking area. The DMAC's host interface is also designed to be connected to a byte-structured boot ROM and the DMAC includes a boot sequencer for automatically loading a boot program from the ROM into the DMAC's on-chip instruction memory whenever the DSP is reset and a boot ROM is connected to the host interface.

12 Claims, 43 Drawing Sheets

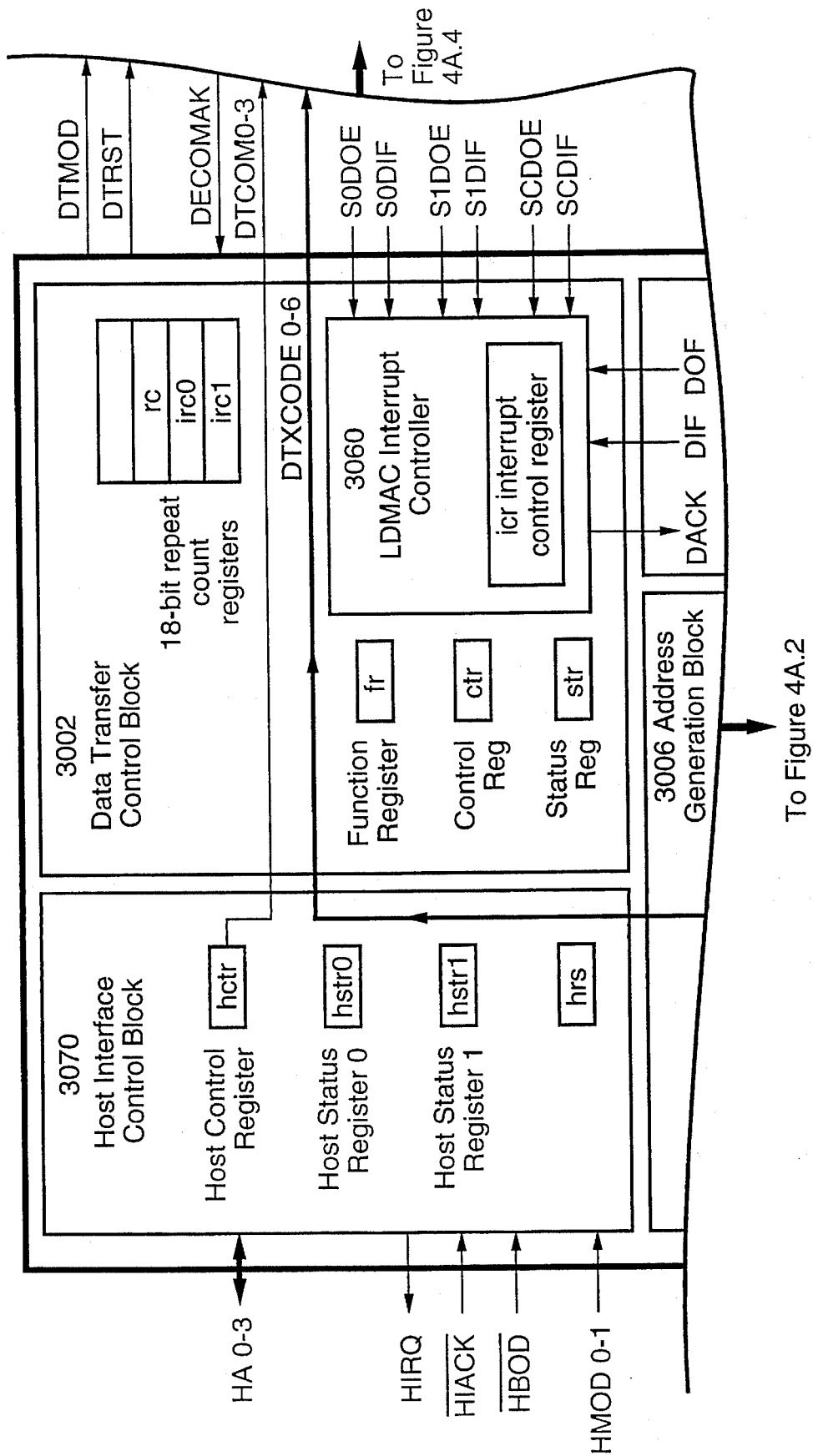
Figure 4A.1

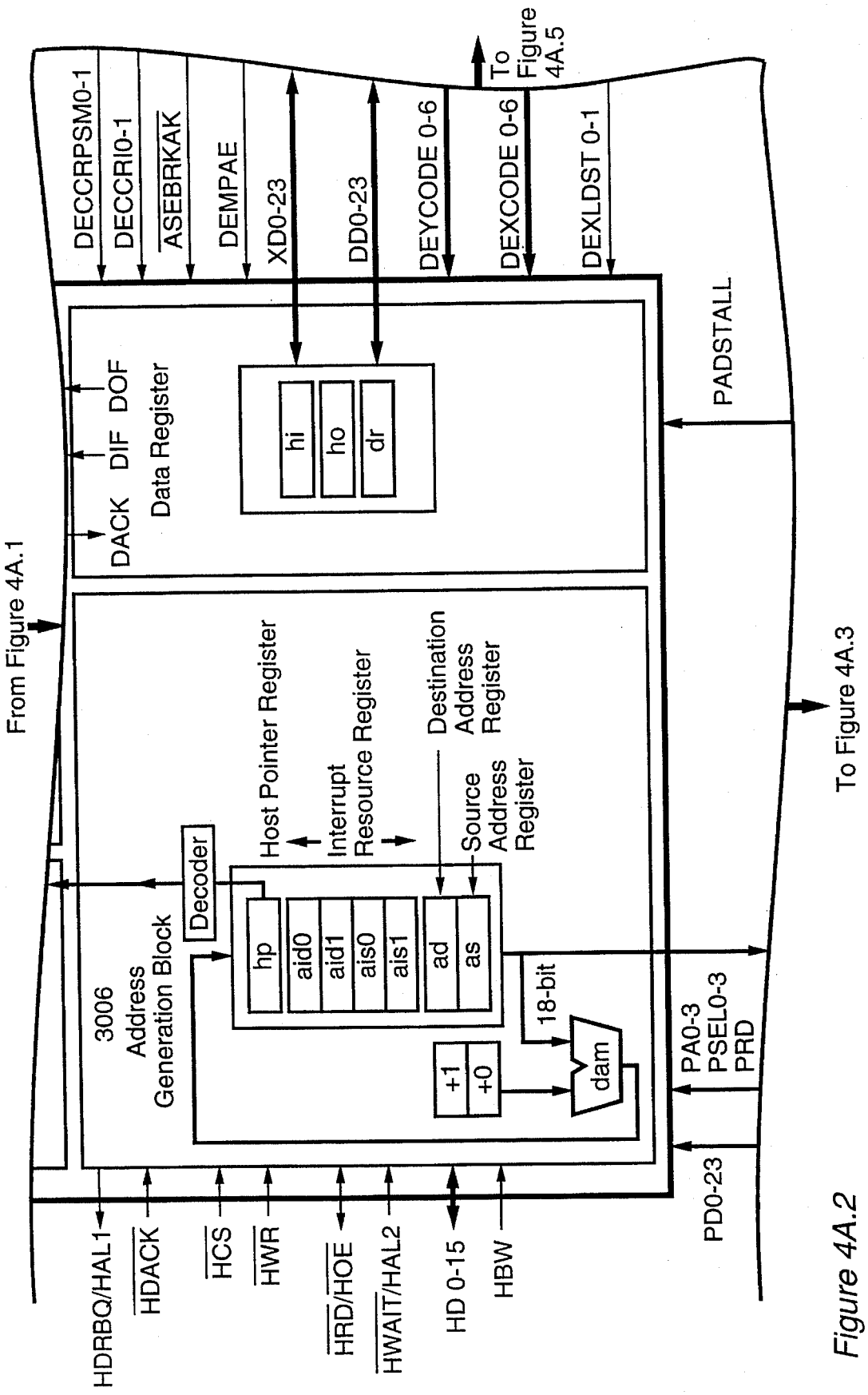
Figure 4A.2

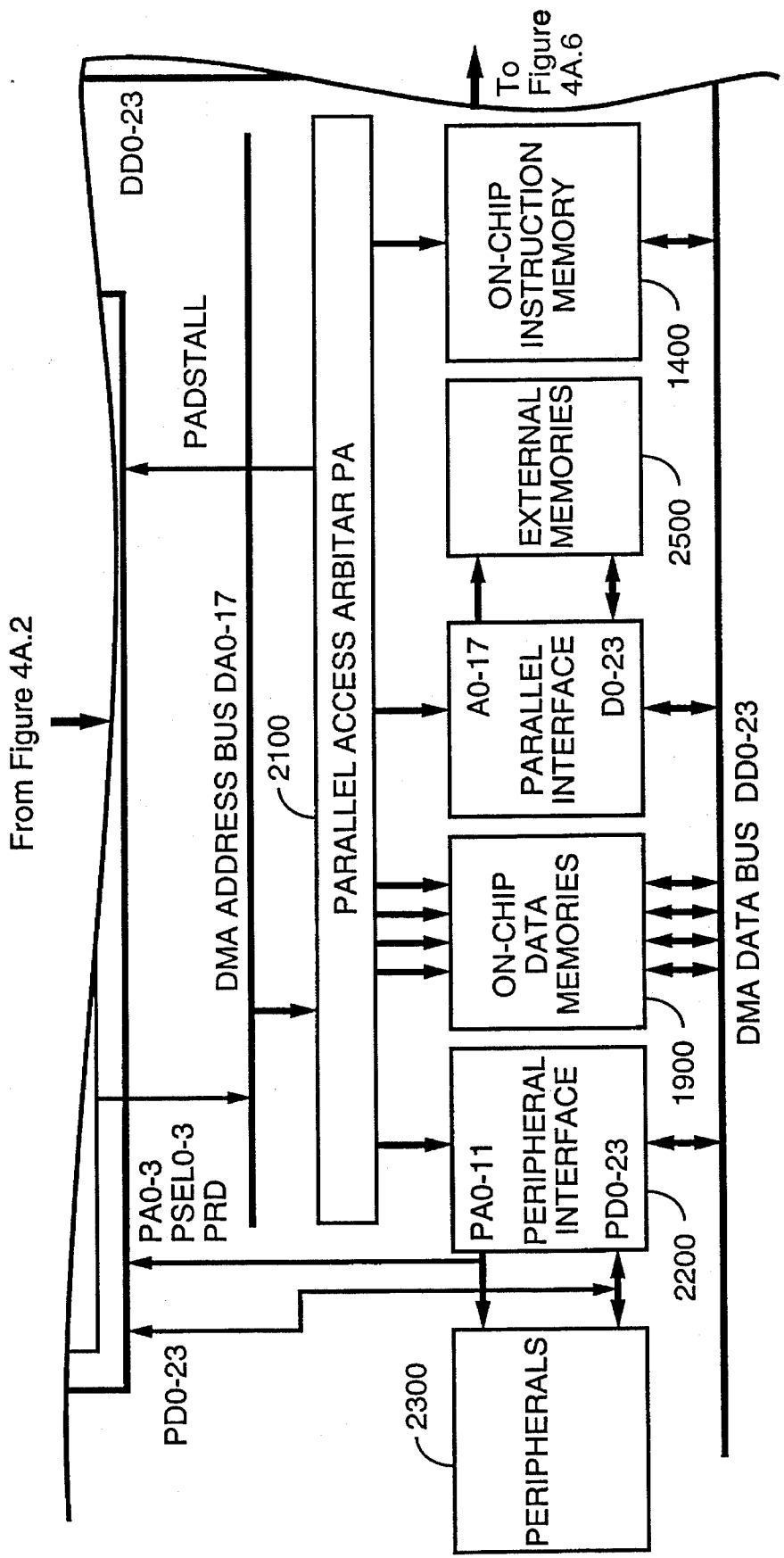
Figure 4A.3

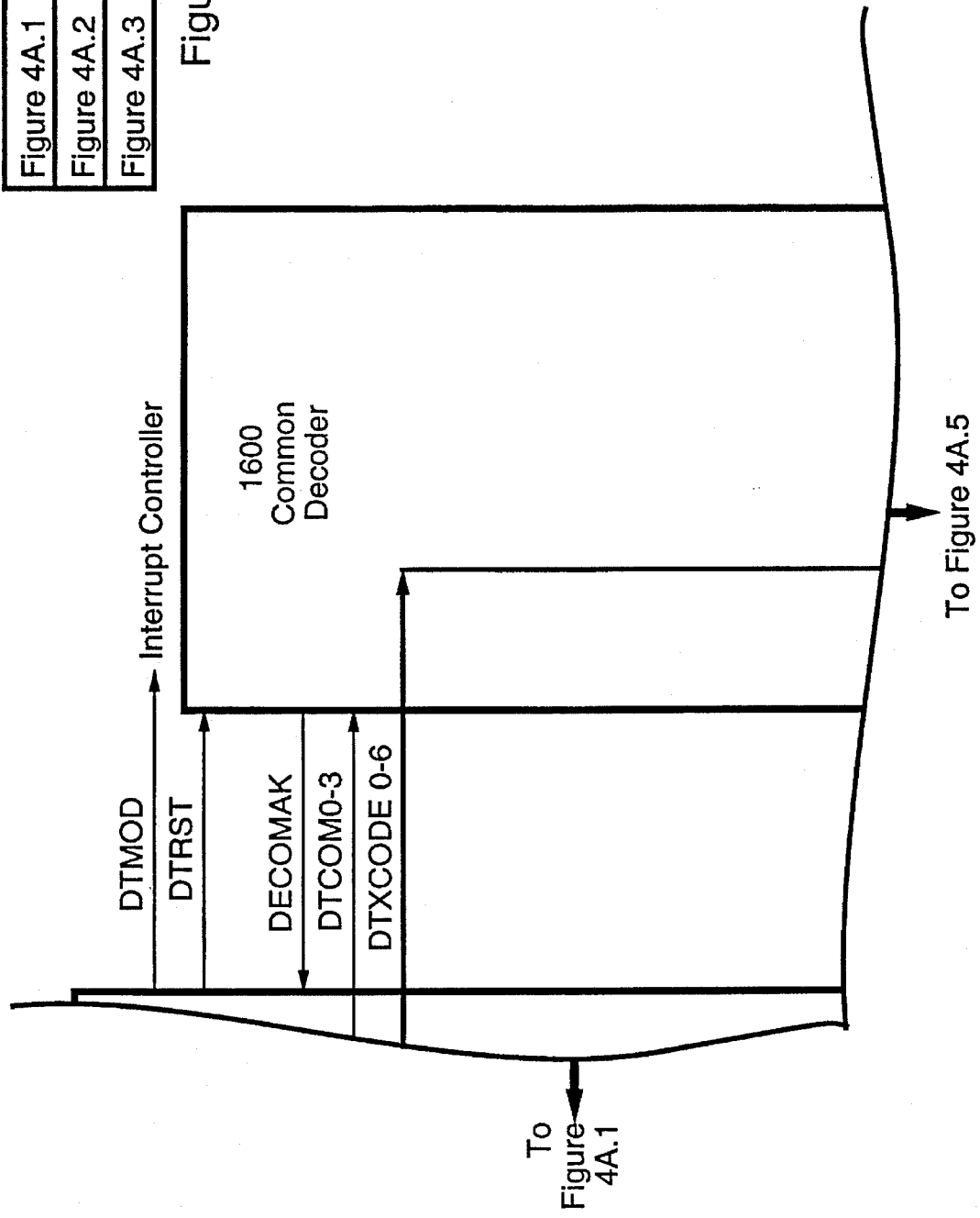

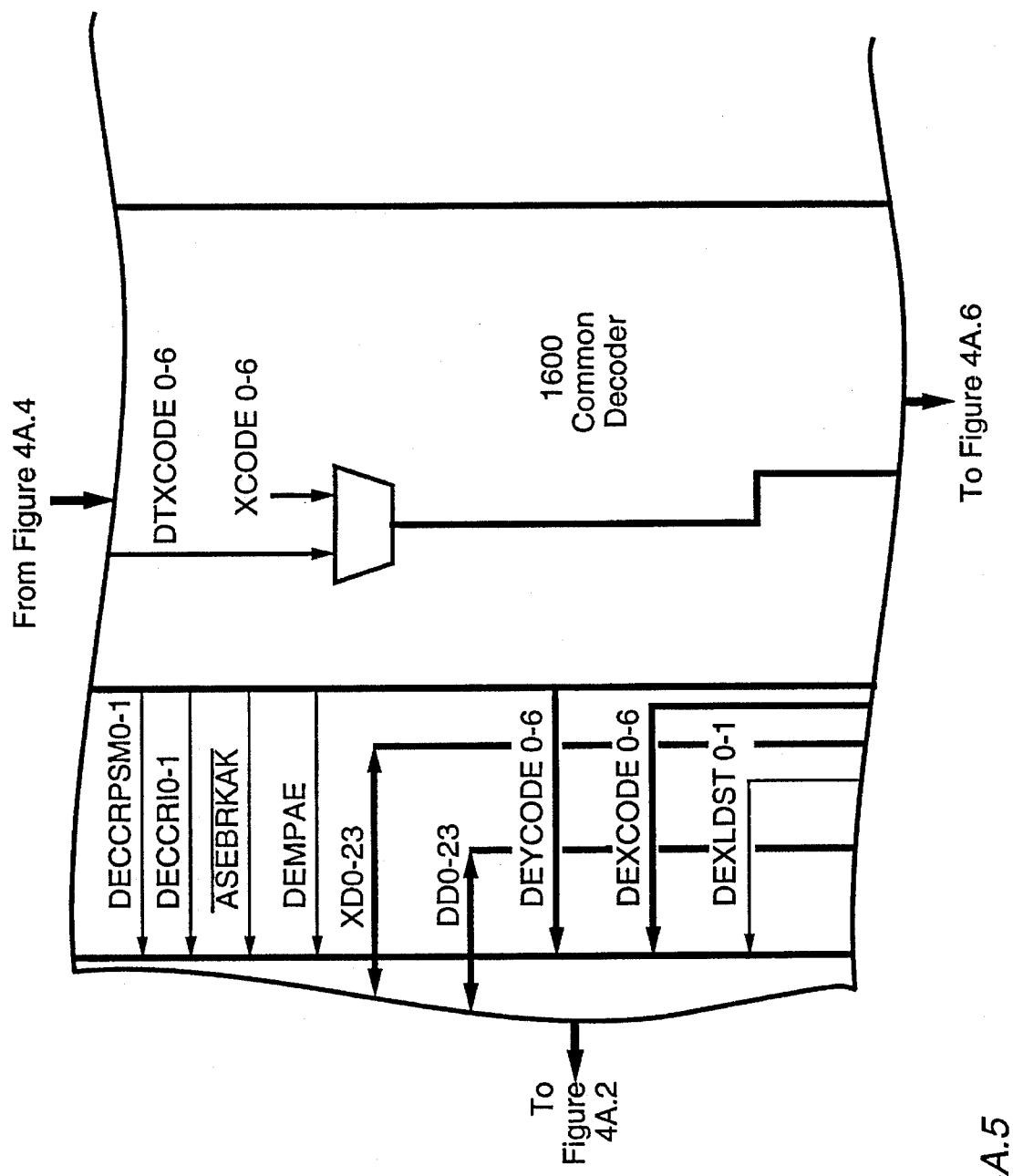
Figure 4A.5

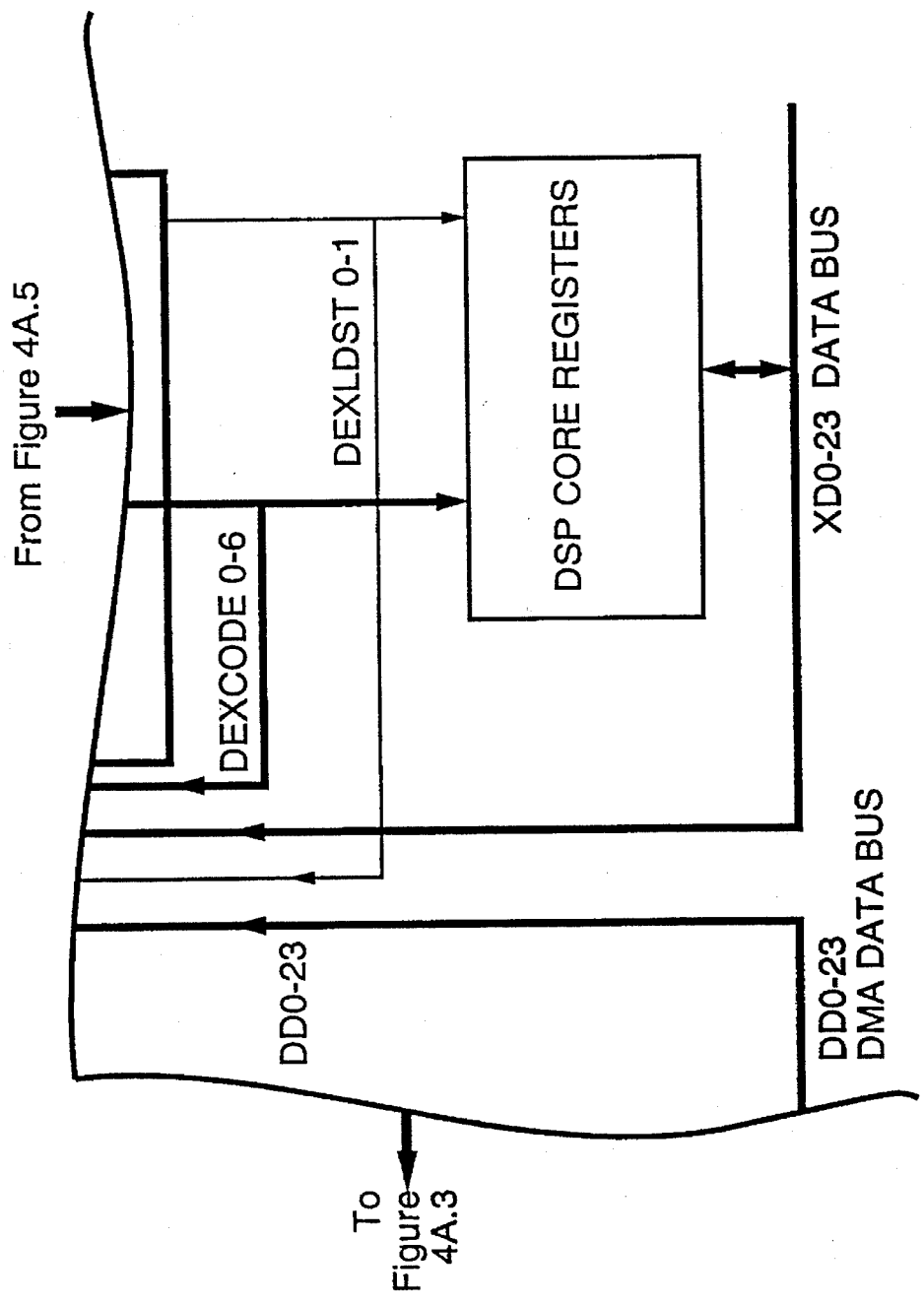
Figure 4A.6

| MICRO FUNCTION NUMBER IN fr | FUNCTION | OPERATION SEQUENCE | | TRANSFER FLOW |
|---|---|---|---|---|
| 0 | from Single Source to Single Destination | Status dssr[5:0] | Operation | |
| | | 0 | reserved | |
| | | 1 | r = *sp; | |
| | | 2 | *dp = r; | |
| | | 3 | dstop; | |
| 1 | from Single Source to Multiple Destination | Status dssr[5:0] | Operation | |
| | | 4 | drepeat; | |
| | | 5 | r = *sp; | |
| | | 6 | *dp++ = r; | |
| | | 7 | dstop; | |
| 2 | from Multiple Source to Single Destination | Status dssr[5:0] | Operation | |
| | | 8 | drepeat; | |
| | | 9 | r = *sp++; | |
| | | A | *dp = r; | |
| | | B | dstop; | |
| 3 | from Multiple Source to Multiple Destination | Status dssr[5:0] | Operation | |
| | | C | srepeat; | |
| | | D | r = *sp++; | |
| | | E | *dp = r; | |
| | | F | dstop; | |

*Figure 5A*

| See Figure 5B-1 | See Figure 5B-2 |
|---|---|

Figure 5B

| CLASS | MICRO FUNCTION NUMBER IN ictr | FUNCTION | OPERATION SEQUENCE | TRANSFER FLOW |
|---|---|---|---|---|
| Peripheral Interupt 0 | <F01, F00> = 0 | No pointer incrementation | Status dssr[5:0] Operation<br>10: r = *ais0<br>11: *aid0 = r | *ais0 → r → *aid0 |
| | <F01, F00> = 1 | Destination pointer incrementation | 12: r = *ais0<br>13: *aid0++ = r | *ais0 → r → *aid0++ |
| | <F01, F00> = 2 | Source pointer incrementation | 14: r = *ais0++<br>15: *aid0 = r | *ais0++ → r → *aid0 |
| | <F01, F00> = 3 | Source & destination pointer incrementation | 16: r = *ais0++<br>17: *aid0++ = r | *ais0++ → r → *aid0++ |

Figure 5B-1

| CLASS | MICRO FUNCTION NUMBER IN ictr | FUNCTION | OPERATION SEQUENCE | TRANSFER FLOW |
|---|---|---|---|---|
| Peripheral Interupt 1 | <F01, F00> = 0 | No pointer incrementation | Status dssr[5:0] Operation<br>20: r = * ais1<br>21: * aid1 = r | *ais1 → r → *aid1 |
| | <F01, F00> = 1 | Destination pointer incrementation | 22: r = * ais1<br>23: * aid1++ = r | *ais1 → r → *aid1++ |
| | <F01, F00> = 2 | Source pointer incrementation | 24: r = * ais1++<br>25: * aid1 = r | *ais1++ → r → *aid1 |
| | <F01, F00> = 3 | Source & destination pointer incrementation | 26: r = * ais1++<br>27: * aid1++ = r | *ais1++ → r → *aid1++ |

*Figure 5B-2*

| CLASS | HOST COMMAND | FUNCTION | OPERATION SEQUENCE | TRANSFER FLOW |
|---|---|---|---|---|
| Host Data Transfer 0 | RDP | Transfer memory/reg. pointed by hp to ho | Status dssr[5:0] Operation<br>37  ho = *hp | *hp → ho |
| | WRP | Transfer hi content to memory/reg. pointed by hp | Status dssr[5:0] Operation<br>38  *hp = hi | hi → *hp |
| Host DMA | DMACR | Cycle Steal Read | Status dssr[5:0] Operation<br>3C  ho = *hp++ | *hp++ → ho |
| | DMACW | Cycle Steal Write | Status dssr[5:0] Operation<br>3D  *hp++ = hi | hi → hp++ |
| | DMABR | Burst Read | Status dssr[5:0] Operation<br>3E  ho = *hp++ | *hp++ → ho |
| | DMABW | Burst Write | Status dssr[5:0] Operation<br>3F  *hp++ = hi | hi → hp++ |

*Figure 5C*

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| — | — | PTE1P | PTE0P | PIRQ 1 | PIRQ 0 | F11 | F10 | F01 | F00 | S12 | S11 | S10 | S02 | S01 | S00 |

Interrupt Selection (j = 0; PIRQ 0, j = 1; PIRQ 1)
<Sj2, Sj1, Sj0> = <0, 0, 0> ; S0DIF   (Serial I/O 0 Input Full)
             = <0, 0, 1> ; S0DOE  (Serial I/O 0 Output Empty)
             = <0, 1, 0> ; S1DIF   (Serial I/O 1 Input Full)
             = <0, 1, 1> ; S1DOE  (Serial I/O 1 Output Empty)
             = <1, 0, 0> ; SCDIF  (Serial Communications
                                      I/O Input Full)
             = <1, 0, 1> ; SCDOE (Serial Communications
                                      I/O Output Empty)
             = <1, 1, 0> ; reserved
             = <1, 1, 1> ; no service   (Set at Reset)

---

Function Selection (j = 0; PIRQ 0, j = 1; PIRQ 1)

| <Fj1, Fj0> | | | j = 0 | j = 1 |
|---|---|---|---|---|
| = <0, 0> | ; | Function 0 | *aid0 = *ais0 | *aid1 = *ais1 |
| = <0, 1> | ; | Function 1 | *aid0++ = *ais0 | *aid1++ = *ais1 |
| = <1, 0> | ; | Function 2 | *aid0 = *ais0++ | *aid1 = *ais1++ |
| = <1, 1> | ; | Function 3 | *aid0++ = *ais0++ | *aid1++ = *ais1++ |

---

DTP Interrupt Flag (j = 0; PIRQ 0, j = 1; PIRQ 1)
PIRQj = 0 ;   No interrup Request to DTP Interrupt Controller
         1 ;   Interrup Request to DTP Interrupt Controller
                (Cleaned when interrupt is accepted)

---

DSP Interrupt Priority Level (j = 0; PIRQ 0, j = 1; PIRQ 1)
PTEj P= 0 ;   No interrup Request to DSP Core (Priority Level = "0")
          1 ;   Interrup Request DMAC to DSP Core when
                 data transactions specified in the repeat counter dircj
                 becomes 1 (Level = "3")

*Figure 6*

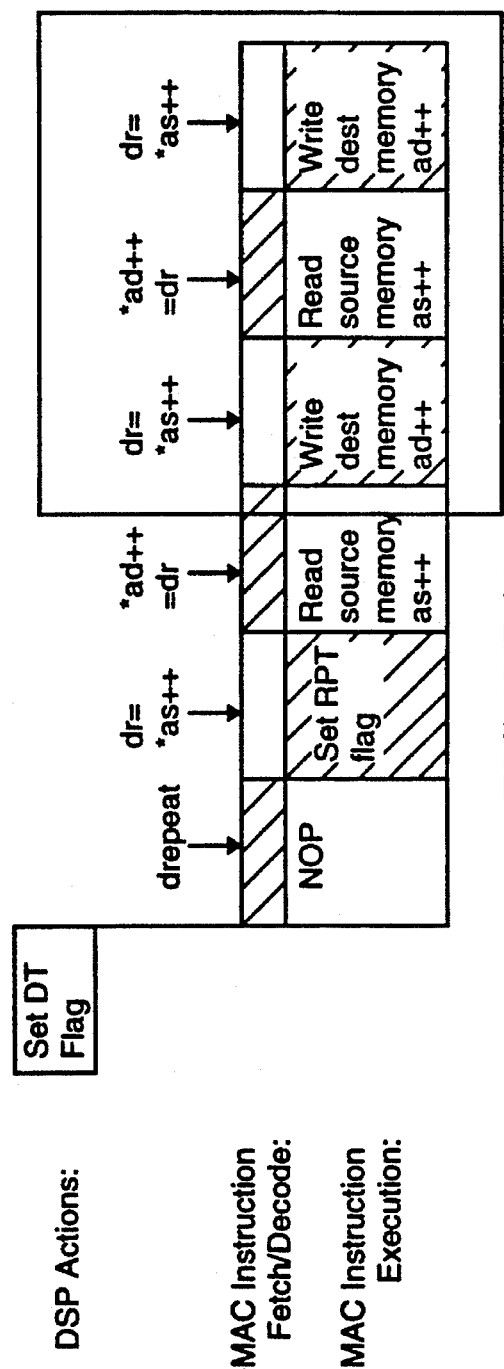
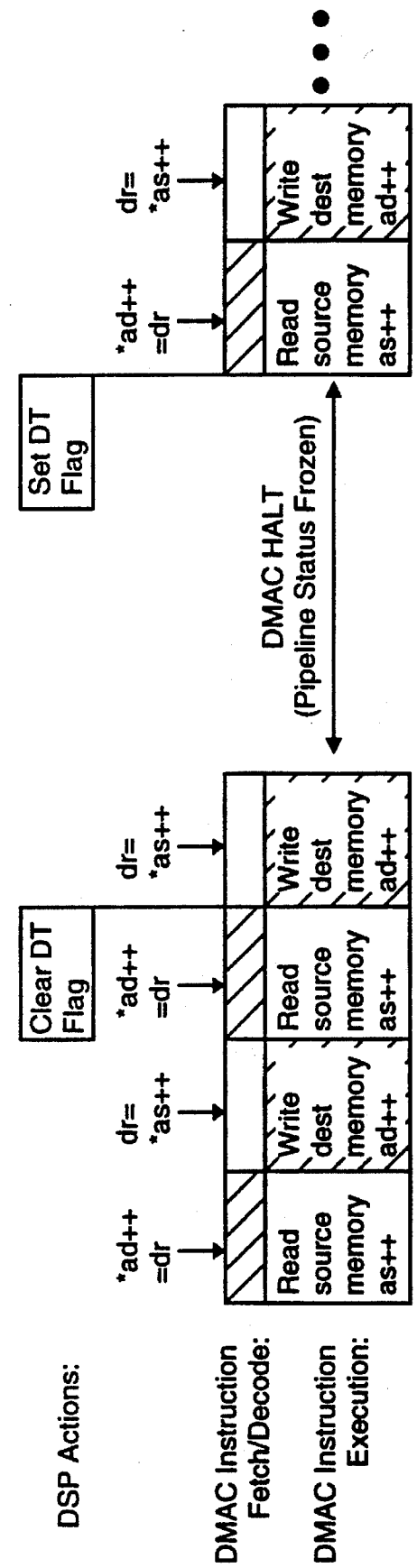
FIGURE 8A
FIGURE 8B

Host Read of DSP Resource Using 8-Bit Host Data Bus
(HBW=0)

Host writes Source Address a17-0 to the pointing registers hp2, hp1, hp0 in three separate write operations.

↓

Write RDP Command into DSP control register hctr.

↓

DMAC executes the specified RDP command, depositing specified data into register ho.

↓

Host reads d23-0 from output registers ho2, ho1, ho0 in three separate read operations.

FIGURE 12A

Host Writes Data to DSP Resource Using 8-Bit Host Data Bus
(HBW=0)

Host writes Destination Address a17-0 to the pointing registers hp2, hp1, hp0 in three separate write operations.

↓

Host writes data d23-0 into registers hi2, hi1, hi0 in three separate write operations.

↓

Write WRP Command into DSP control register hctr.

↓

DMAC executes the specified WRP command, writing the specified data from hi register to the address (which may point to a register, internal memory, external memory, or any other memory mapped DSP resource).

FIGURE 12B

Host Read of DSP Resource Using 16-Bit Host Data Bus (HBW=0)

Host writes Source Address a17-0 to the pointing registers hp2, hpL in two separate write operations.

↓

Write RDP Command into DSP control register hctr.

↓

DMAC executes the specified RDP command, depositing specified data into register ho.

↓

Host reads d23-0 from output registers ho2, hoL in two separate read operations.

FIGURE 13A

Host Writes Data to DSP Resource Using 16-Bit Host Data Bus (HBW=0)

Host writes Destination Address a17-0 to the pointing registers hp2, hpL in two separate write operations.

↓

Host writes data d23-0 into registers hi2, hiL in two separate write operations.

↓

Write WRP Command into DSP control register hctr.

↓

DMAC executes the specified WRP command, writing the specified data from hi register to the address (which may point to a register, internal memory, external memory, or any other memory mapped DSP resource).

FIGURE 13B

ON-CHIP DMA CONTROLLER WITH HOST COMPUTER INTERFACE EMPLOYING BOOT SEQUENCING AND ADDRESS GENERATION SCHEMES

This invention relates to an on-chip direct memory access controller (DMAC) provided on a digital signal processor (DSP) chip that includes, in addition to the DMAC, an interface to an external host processor, several on-chip interfaces for peripheral I/O devices, an on-chip parallel interface to external memory, an on-chip data memory, an on-chip instruction memory, and a plurality of busses.

CROSS-REFERENCES TO RELATED APPLICATIONS

The following applications, which are assigned to the same assignee as the instant application, have been filed on the same date as the instant application and contain related subject matter. They are incorporated herein by reference.

Digital Signal Processor and Method for Executing DSP and RISC Class Instruction Defining Identical Data Processing or Data Transfer Operations, Kiuchi et al., U.S. patent application Ser. No. 08/443,199, filed May 17, 1995, which is a continuation of U.S. patent application Ser. No. 08/127,694, filed Sep. 27, 1993, now abandoned.

Digital Signal Processor and Method for Executing an Instruction with Variable Length Type Code, Baji et al., U.S. patent application Ser. No. 08/127,938, filed Sep. 27, 1993, now abandoned.

Digital Signal Processor and Associated Method for Conditional Data Operation with No Condition Code Update, Kiuchi et al., U.S. patent application Ser. No. 08/364,418, filed Dec. 27, 1995, which is a continuation of U.S. patent application Ser. No. 08/127,691, filed Sep. 27, 1993.

On Chip DMA Controller with Interrupt Functions for Digital Signal Processor, Baji, U.S. patent application Ser. No. 08/127,685, filed Sep. 27, 1993.

Double Precision Division Circuit and Method for Digital Signal Processor, Nakagawa et al., U.S. patent application Ser. No. 08/127,660, filed Sep. 27, 1993, now U.S. Pat. No. 5,426,600, issued Jun. 20, 1995.

Data Processor With Control Logic for Storing Operation Mode Status and Associated Method, Kiuchi, U.S. patent application Ser. No. 08/127,679, filed Sep. 27, 1993, now U.S. Pat. No. 5,440,747, issued Aug. 8, 1995.

Digital Signal Processor with No-Chip Address Decoder and Wait Status Controller, Baji, U.S. patent application Ser. No. 08/127,682, filed Sep. 27, 1993.

Modulo Arithmetic Addressing Circuit, Shridhar et al., U.S. patent application Ser. No. 08/127,431, filed Sep. 27, 1993, now U.S. Pat. No. 5,381,360, issued Jan. 10, 1995.

BACKGROUND OF THE INVENTION

In data processor systems there are typically two types of data transfers. The first is the transfer of data and instructions between memories and the central processing unit (CPU), and the second involves moving data between peripheral I/O devices and memories, or between memories. Data processing systems can handle these transfers in one of two ways:

(1) The CPU can control all data transfers. This is of course necessary where data transfers into and out of the CPU are involved.

(2) A DMA (direct memory access) controller can be used to control data transfers while the CPU continues to perform data processing tasks. As a result, less of the CPU's time is wasted managing data move operations.

While some digital signal processors include an on-chip DMA controller (also herein called a DMAC), in traditional data processor systems the DMAC is not included on the CPU chip. In addition, in traditional data processor system most components serviced by the DMAC are located off-chip vis a vis the CPU. As a result, most DMA transfers are performed over a relatively slow external bus and are thus time consuming, being limited by the speed of the DMA bus and the various bus interfaces provided by the respective peripheral devices.

Accordingly, it is a goal of the present invention to improve DMAC performance and the speed of data transfers. This goal is achieved in part by putting as many functions as possible on-chip, including memories, peripheral interfaces, and the DMA controller. The DMAC runs concurrently with the DSP core and provides for local data transfers between DSP memory mapped resources, including memories and interfaces for various input/output (I/O) peripherals, and accepts host and peripheral data transfer requests.

To achieve some of these functions, existing DMACs provide a dedicated bus for DMA transfers and respond to interrupts from peripheral I/O devices transferring data. However none of those DMACs interrupt local DMA (e.g., data transfer between memories) to handle peripheral interrupts, nor do they provide dedicated pointers and counters for peripheral interrupts. As a result, peripheral interrupts are handled less than optimally in current on-chip DMACs. Similarly, none of the existing DMACs respond to host interrupts (for data transfer requests or commands) in the middle of a local DMA operation, nor do they provide dedicated registers to make host data transfers as efficient as possible. Finally, current on-chip DMACs do not provide a host interface that allows a host to issue DSP commands, or a boot ROM to download programs and data to a stand alone DSP. Failing to integrate such host features in the DMAC means that they must be foregone or provided elsewhere at the cost of additional hardware.

It is therefore the object of the present invention to provide an on-chip DMAC that operates concurrently with the DSP core, expedites peripheral and host data transfer requests, and provides a host interface with an eye to minimizing on-chip hardware. The specific objects are to provide:

host and peripheral data transfers during local DMA transfers;

dedicated pointers and counters for peripheral interrupts;

dedicated pointers for host interrupts;

a host interface function using DMAC hardware;

powerful host commands and accessibly to all resources; and the capability to boot a stand-alone DSP from a byte-structured ROM.

SUMMARY OF THE INVENTION

The foregoing and other objects of the present invention are achieved by a single chip digital signal processor (DSP) that includes memory mapped resources, and an on-chip direct memory access controller (DMAC). The memory mapped resources of the DSP include an on-chip program memory, an on-chip data memory, internal registers and memory mapped external memories and peripheral devices. The DMAC includes separate address and count registers for handling a primary data transfer and two interrupt data transfers. The count registers share the same decrementer and the address registers share the same address computation circuit. The DMAC also has a dedicated interrupt controller for handling interrupts from a host computer and from peripheral devices.

While a primary direct memory access transfer is being performed by the DMAC, the DMAC can receive and process interrupts from the host and from up two peripheral devices without having to store address register and count register information in a memory stacking area. As a result, the DMAC can switch from a primary DMA transfer to an interrupt DMA transfer and back without using any instruction cycles for "overhead" associated with storing and restoring registers in a memory stacking area.

The DMAC also includes a host computer interface that enables a host computer to send to the DMAC (A) read, write and DMA commands for initiating data transfers to and from memory mapped resources of the DSP, (B) commands for setting the mode of operation of the DSP to Run, Sleep or Software Standby, and (C) a command for performing a general reset of the DSP to a known state, and (D) a command for causing the DSP core to execute a single instruction.

The DMAC's host interface is also designed to be connected to a byte-structured boot ROM and the DMAC includes a boot sequencer for automatically loading a boot program from the ROM into the DMAC's on-chip instruction memory whenever the DSP is reset and a boot ROM is connected to the host interface.

BRIEF DESCRIPTION OF THE DRAWINGS

Additional objects and features of the invention will be more readily apparent from the following detailed description and appended claims when taken in conjunction with the drawings and tables, in which:

FIGS. 4A–4D are block diagrams of the direct memory access controller (DMAC) of the present invention.

FIGS. 5A–5D diagrammatically represent data transfer micro-control programs executed by the data transfer sequencer in the DMAC of the present invention.

FIG. 6 diagrammatically represents the fields of the DMA interrupt control register in the preferred embodiment.

FIGS. 8A–8C depict an multiple source to multiple destination local data transfer.

FIGS. 12A and 12B are flow charts of host read and write procedures using an 8-bit host data bus.

FIGS. 13A and 13B are flow charts of host read and write procedures using a 16-bit host data bus.

DESCRIPTION OF THE PREFERRED EMBODIMENT

FIGS. 1–24 illustrate the invention disclosed herein. In these figures, like components are designated by like numerals.

DSP ARCHITECTURE

Figure 1:
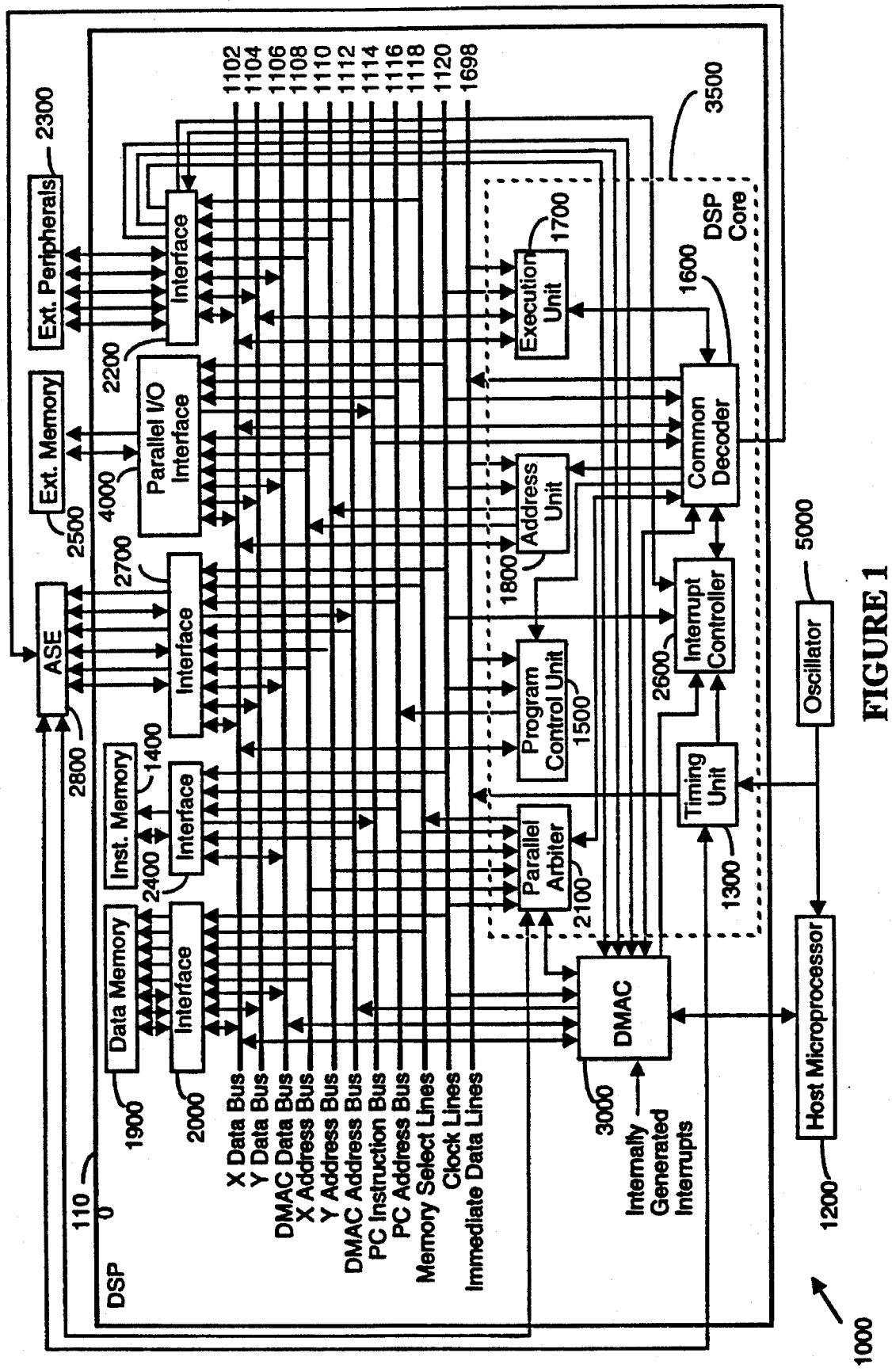
FIG. 1 is a block diagram of a digital signal processor (DSP) in accordance with the present invention.

FIG. 1 shows a data processing system 1000 that includes a digital signal processor (DSP) 1100 and a host microprocessor (host) 1200. The DSP 1100 has a Harvard Architecture with separate 24-bit internal busses for data and instructions: X data bus (XD) 1102, Y data bus (YD) 1104, DMA data bus (DD) 1106, and PC instruction bus (INST) 1114. The 24-bit data and instructions transferred over the XD 1102, YD 1104, DD 1106 and INST 1114 busses are accessed at addresses asserted respectively on the 18-bit internal address busses XA 1108, YA 1110, DA 1112 and PC 1116. Transfers over the XD 1102, YD 1104, and INST 1114 busses are under control of the DSP Core 3500, which alone can assert pointers onto the XA 1108, YA 1110 and PC 1116 busses, while transfers over the DD bus 1106 are controlled by the Direct Memory Access Controller (DMAC) 3000 asserting pointers onto the DA bus 1112. The DSP Core 3500 incorporated a program control unit 1500, execution unit 1700 and address unit 1800.

This plurality of data busses enables multiple concurrent data transfers between the on-chip processors (DSP Core 3500 and DMAC 3000) and the DSP storage resources (data memory 1900, instruction memory 1400, external memory 2500 and off-chip peripherals 2300), which are coupled via the plurality of data busses as follows:

| Storage Resource | Coupled to DSP Core 3500 via bus: | Coupled to DMAC 3000 via bus: |
| --- | --- | --- |
| data memory 1900 | XD & XA, YD & YA | DD & DA |
| instruction memory 1400 | INST & PC | DD & DA |
| external memory 2500 | XD & XA, YD & YA, INST & PC | DD & DA |
| peripheral device interface 2200 | XD & XA, YD & YA | DD & DA |

As shown in FIG. 1, the storage resources coupled to the DSP Core 3500 via the XD 1102 and XA 1110 busses, and the YD 1104 and YA 1110 busses are the data memory 1900, peripheral device interface (PDI) 2200 (for accessing external peripherals 2300), and parallel memory interface 2400 (for accessing external memory 2500). Additionally, the DMAC 3000 is also coupled to the XD bus 1102, which enables direct transfers between the DSP Core 3500 and the DMAC 3000. The DMAC 3000 is coupled to the data memory 1900, instruction memory 1400, parallel memory interface 2400, and peripherals devices interface 2200 via the DD 1106 and DA 1112 busses. The PC Instruction Bus (INST) 1114 and the PC Address Bus (PC) 1116 are employed to couple the DSP Core 3500 with the instruction memory 1400 and parallel memory interface 2400.

Figure 2:
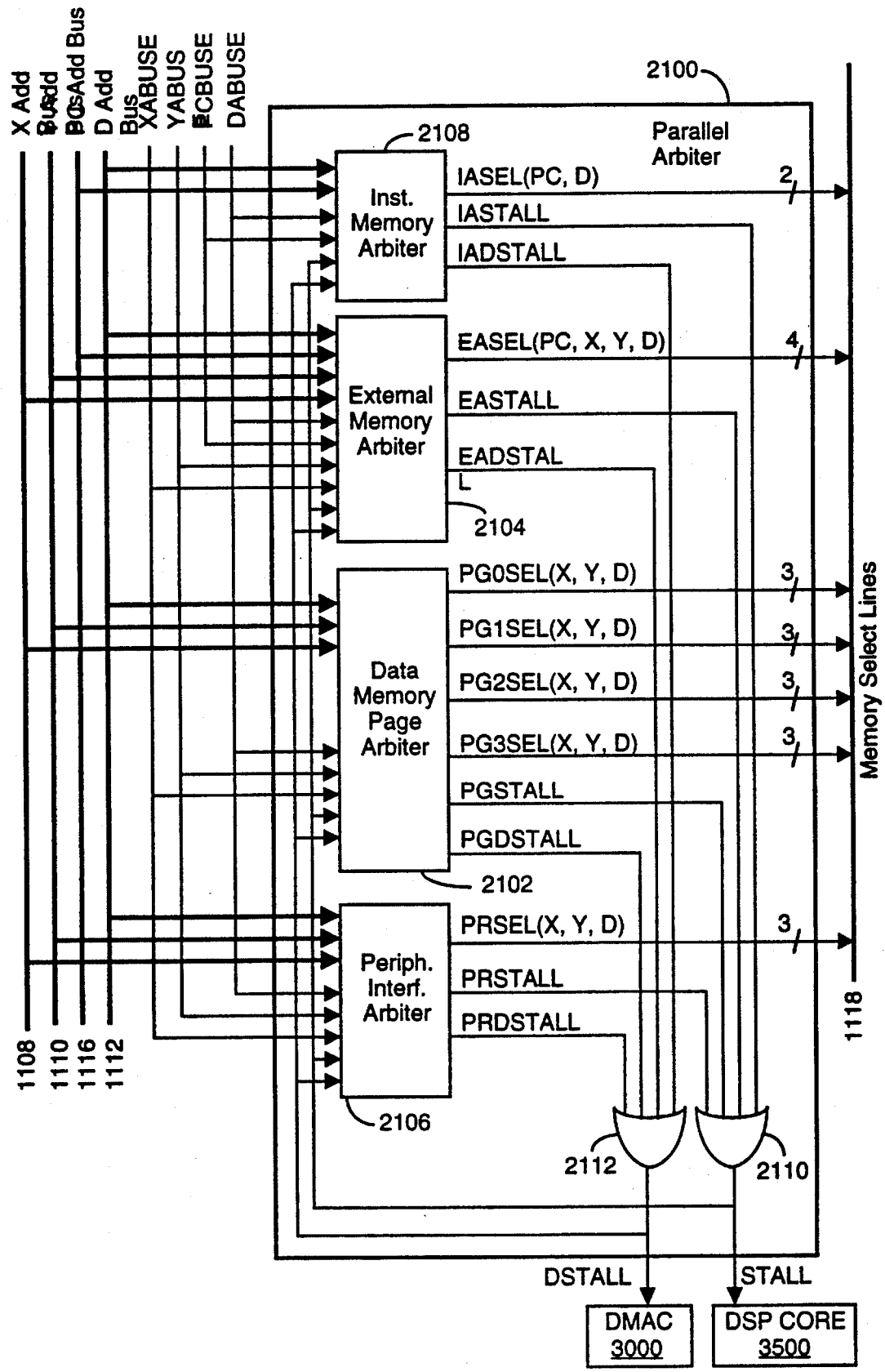
FIG. 2 is a block diagram of a bus access arbitration circuit.

Referring to FIG. 1, the DMAC 3000 is also connected to the DSP Core 3500 via the XD bus 1102, which enables direct transfers between the two on-chip processors. Also, any pointer put on the DA bus 1112 by the DMAC 3000, or put on the XA 1108, YA 1110 or PC 1116 busses by the DSP Core 3500 is received by the parallel arbiter 2100. By monitoring the address busses, the parallel arbiter 2100 is able to arbitrate memory access conflicts that arise when access to a single port memory device (and all of the storage resources have but a single port) is simultaneously attempted over a plurality of busses. The parallel arbiter 2100 is shown in FIG. 2, and is described in greater depth below.

PARALLEL ARBITER

In this DSP 1100, virtually all resources, including registers, internal memories, external memories, internal interfaces to peripheral devices, and the like are "memory mapped", meaning that each such resource has a predefined, unique, address. Both the DMAC 3000 and the DSP Core 3500 can independently access almost all memory mapped locations in the external memory 2500, instruction memory 1400, peripheral devices 2300 or data memory 1900 as well as most of the internal registers. By memory mapping all DSP resources, the DSP 1100 also makes all memory mapped resources accessible to the host processor 1200.

Additionally, as discussed above, each of these storage devices, all of which have a single port, can be accessed concurrently by the DMAC 3000 (over DA bus 1112) and the DSP Core 3500 (over at least one of the XA 1108, YA 1110 or PC 1116). Consequently, the following memory access conflicts can arise in this DSP:

Page conflicts: The data memory 1900 consists of four pages (P0, P1, P2, P3), each of which can be individually accessed by the DSP Core 3500 (over the X address bus 1108 and Y address bus 1110) and the DMA address bus 1112 (under control of the DMAC 3000). Page conflicts arise where more than one of the pointers on the XA 1108, YA 1110 or DA 1112 busses access the same memory page.

External access conflicts: More than one of the pointers on the XA bus 1108, YA bus 1110 (controlled by DSP Core 3500 control), DA 1112 bus (under DMAC 3000 control) or PC bus 1116 simultaneously access the external memory 2500.

Peripheral access conflicts: More than one of the pointers on the XA bus 1108 or YA bus 1110 (controlled by DSP Core 3500) or DA bus 1112 (under DMAC control) access the external peripheral devices 2300 via the peripheral device interface 2200.

Instruction memory conflicts: More than one of the pointers on PC Bus 1116 or DA bus 112 simultaneously accessing the on-chip instruction memory 1400.

The parallel arbiter 2100 resolves these conflicts by intercepting and decoding all memory pointers placed on the address busses XA 1108, YA 1110, DA 1112 and PC 1116, detecting the occurrence of the aforementioned conflicts, and granting bus accesses according to a fixed priority scheme. This design has the dual virtues of greatly simplifying control logic complexity required to handle multiple bus interfaces to single port memories, while allowing the DSP Core 3500 and the DMAC 3000 to independently access the storage resources as needed.

Referring to FIG. 2, the parallel arbiter 2100 consists of four arbitration blocks that each arbitrate one of the aforementioned conflicts: PGA 2102 (page arbiter (on-chip data memory arbiter)), EA 2104 (external memory arbiter), PRA 2106 (peripherals arbiter) and IA 2108 (on-chip instruction memory arbiter). Each of these arbiters takes inputs from the address busses over which the corresponding storage resource can be accessed. Thus, the PGA 2102 receives inputs from the XA 1108, YA 1110 and DA 1112 busses; the EA 2104 from the XA 1108, YA 1110, DA 1112 and PC 1116 busses; the PRA 2106 from the XA 1108, YA 1110, and DA 1112 busses; and the IA 2108 from the DA 1112 and PC 1116 busses. The arbitration blocks PGA 2102, EA 2104, PRA 2106 and IA 2108 also receive bus enable signals XABUSE, YABUSE, DADUSE, and PCBUSE, which, when asserted, indicate that the DSP Core 3500 or the DMAC 3000 is trying to access memory over address bus XA 1108, YA 1110, DA 1112 or PC 1116 respectively.

Each of PGA 2102, EA 2104, PRA 2106, and IA 2108 detect the memory access conflicts by decoding the addresses on the aforementioned busses, and generate bus select signals to the storage resources and stall signals to delay the on-chip processors (DMAC 3000 and DSP Core 3500) attempting the conflicting bus accesses.

The DSP Core 3500 stall signals are PGSTALL (from PGA), EASTALL (from EA), PRSTALL (from PRA) and IASTALL (from IA), which are collected in OR gate 2110, the output of which, PASTALL, is provided to the DSP Core. The DMAC 3000 stall signals are PGDSTALL (from PGA), EADSTALL (from EA), PRDSTALL (from PRA) and IADSTALL (from IA), which are collected in OR gate 2112, the output of which, PADSTALL, is provided to the DMAC.

Arbitration proceeds in the arbitration blocks according to the following rules:

Rule 1: Arbitration is based on access priority. When two or more address pointers access the same memory resource or the external/peripheral port, service the access based on the following access priority scheme:

1) waiting DA 1112
2) XA 1108
3) YA 1110
4) PC 1116
5) DA 1112

Rule 2: Arbitration for the DSP Core 3500 and DMAC 3000 are independent. Whenever the access for DSP Core 3500 or DMAC 3000 is finished, the corresponding stall signal is reset independently.

Rule 3: Wait until all arbitrations have been completed. This is implemented by the OR gates 2110 and 2112 in the final stage of the parallel arbiter.

Rule 4: Wait until previous arbitrations have been completed. Because arbitration to the DSP Core 3500 and the DMAC 3000 is executed independently, there is a chance that the next DSP Core access could be requested while the previous DMAC access is being executed under the parallel arbiter's control. In this case, the parallel arbiter 2100 asserts the PASTALL signal to delay the next DSP Core 3500 access until the previous DMAC 3000 access is completed. The same rule applies to a previous DSP Core 3500 access that is underway.

Rule 5: Access wait states are included in the external access arbitration. The PIO ready signal PIOREADY is sent from the wait state controller of the parallel interface to the external arbiter EA. As long as the external access is in the wait state, EA sets the EASTALL or EADSTALL signal high so as to stall the unit (i.e., the DSP Core or DMAC) performing the external access.

Figure 3A:
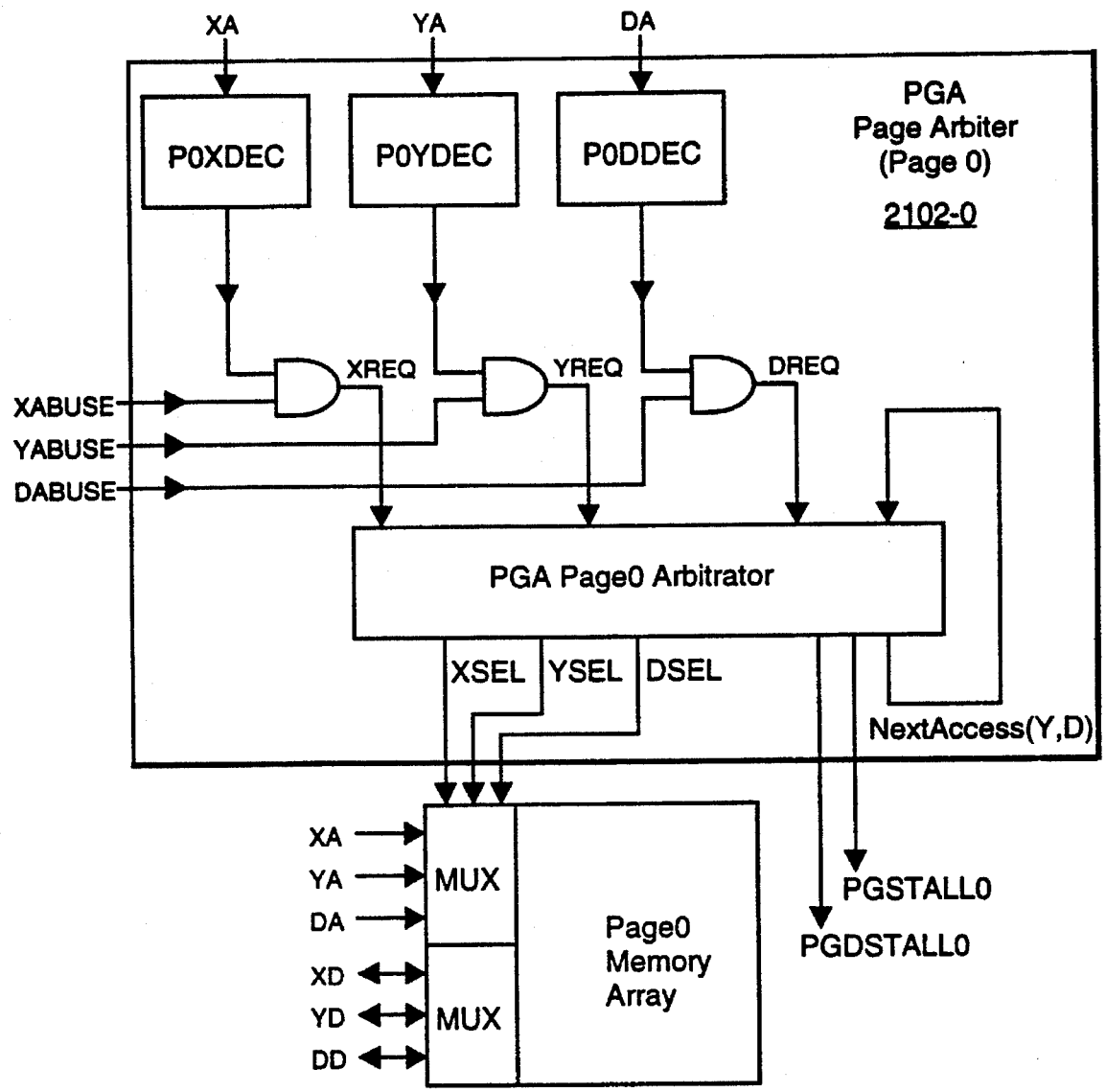
FIG. 3A is a block diagram of an access arbiter for one page of the DSP's internal memory.

FIG. 3A shows the internal structure of the page 0 arbitration circuit 2102-0, which is part of PGA 2102, the page memory arbiter. Three decoders detect when page 0 is being addressed by each of the XA, YA and DA busses. Since the page memory consists of four pages, P0, P1, P2, and P3, PGA consists of four blocks identical to that shown in FIG. 3A. This figure is generalizable to the other arbitration blocks EA, PRA, and IA, which have the same architecture.

The Page 0 arbitration circuit has three identical decoders P0XDEC, P0YDEC, and P0DDEC which determine whether a page 0 access is being attempted via the XA, YA or DA address busses respectively. The resulting decoded signals are logically ANDed with the bus enable signals XABUSE, YABUSE and DABUSE signals, which indicate if each of those busses is in use in the current DSP instruction cycle, to produce request signals XREQ, YREQ and DREQ, which are inputs to the page 0 arbitrator. A conventional arbitration circuit then prioritizes the request signals if more than one enabled request signal is received using a fixed priority order (top priority:X, second priority:Y, last priority:D). Following arbitration, the arbiter asserts one of the bus select signals XSEL, YSEL, DSEL (assuming that at least one of the address busses is enabled and addressing page 0) going to the page 0 memory, which determines which address bus provides the pointers into page 0. If none of the enabled address busses XA, YA or DA is addressing page 0 during a particular instruction cycle, the PG0A arbiter is inactive for that instruction cycle.

As the arbiter can receive three simultaneous access requests, but by necessity can grant only one access per DSP cycle, the arbiter also generates NextAccess(Y,D) signals, which indicate waiting access requests. These waiting request signals are fed back to the page 0 arbiter so that waiting access requests are handled before another arbitration is initiated. The PGA page 0 arbiter generates a DSP Core stall signal PGSTALL, if a Y bus access request is delayed, and generates a DMAC stall signal PGDSTALL, if a DMA bus access request is delayed. The stall signals from the four page arbiters are logically ORed to generate the PGSTALL and PGDSTALL signals shown in FIG. 2.

Figure 3B:
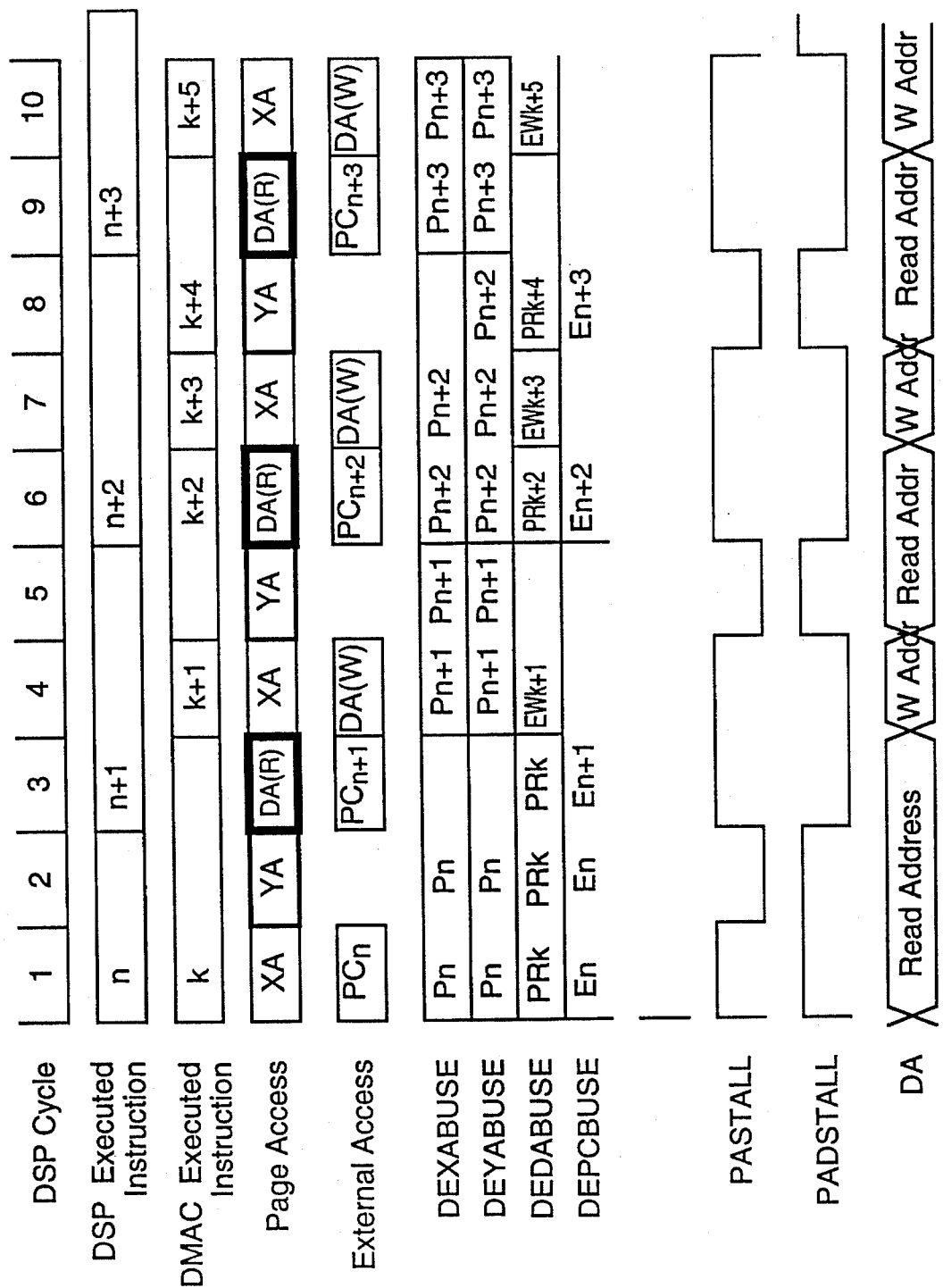
FIGS. 3B and 3C are timing diagrams showing the operation of the internal memory page arbiter 2102-0 and cooperation of the page arbiter with the external access arbiter 2104 for a specified sequence of instructions.
Figure 3C:
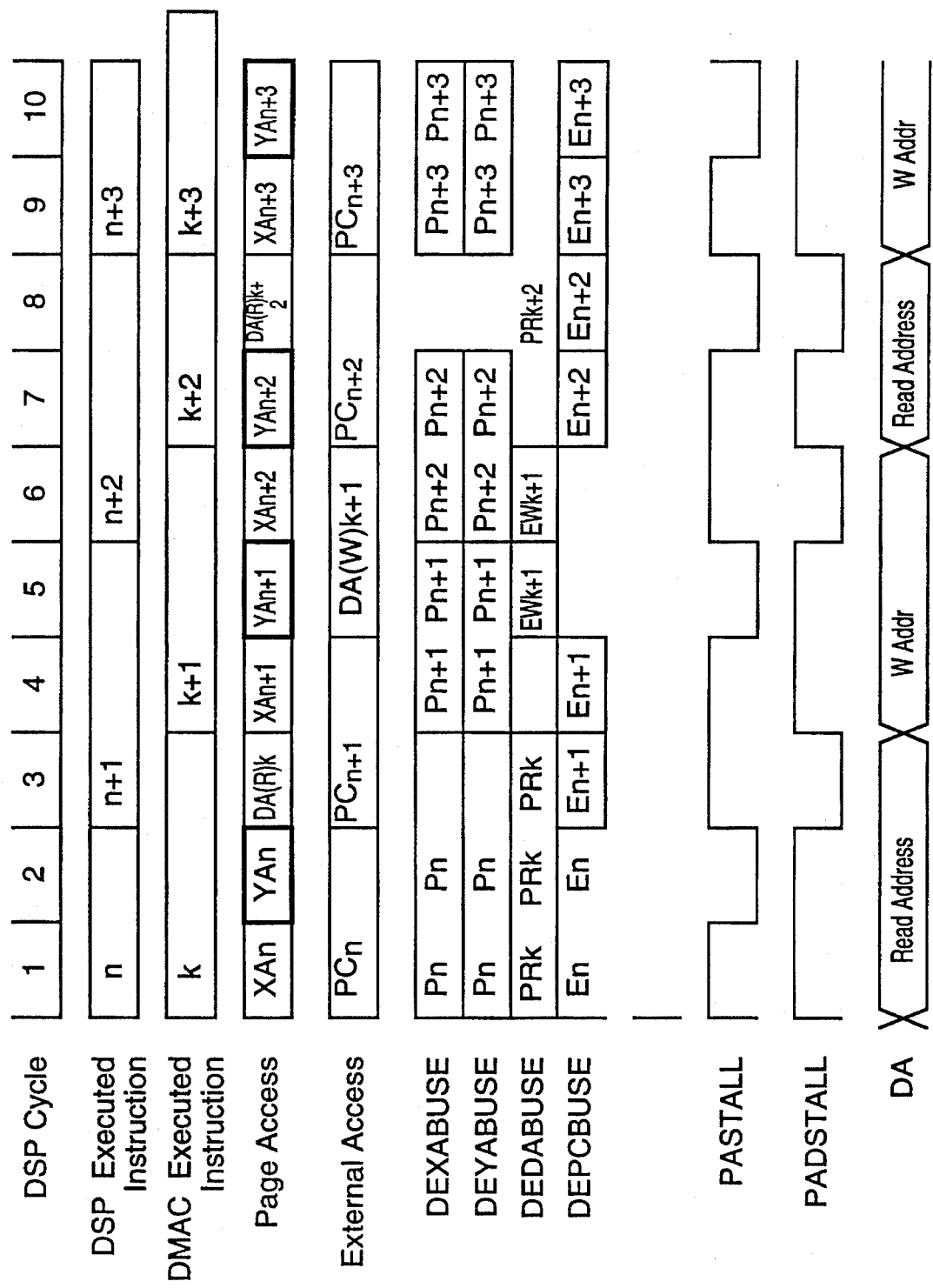

FIGS. 3B and 3C show timing diagrams for a three way conflict for access to a memory page between addresses on the XA, YA and DA busses, and a two way conflict for access to an external memory between addresses on the PC and DA busses. These timing diagrams show DMA read operations as "DA(R)" and write operations as "DA(W)", reflecting the fact that all DMAC data transfers consist of a read (source data memory to register) and a write (register to destination data register).

In FIG. 3B it is assumed that there are no external memory access waits because the external memory 2500 is fast enough to not require wait states, while FIG. 3C assumes that one wait state is required for each external memory access.

Referring to FIG. 3B, XA 1108, YA 1110, PC 1116 and DA 1112 are all asserting access requests on DSP Cycle 1. Here, the XA, YA and DA busses all are asserting addresses in the same on-chip data memory page, while PC is attempting to access the external memory. The PGA block 2102 arbitrates between XA, YA, and DA (Read) requests, granting access to that memory page in DSP Cycles 1, 2 and 3 respectively. In cycle 1, the PGA 2102 allows the XA 1108 access, but asserts the PGSTALL signal to stall the DSP Core because the YA 1110 access is waiting. Also in cycle 1, the EA grants PC 1116 access and thus resets the EASTALL signal. However, PASTALL, the stall signal to the DSP Core 3500, remains asserted because it is generated by ORing all the DSP Core stall signals, one of which (PGSTALL) has been asserted. In DSP cycle 2, the PGA 2102 allows YA access to the page of memory and clears PGSTALL because no DSP derived accesses are being held, which allows the DSP to proceed to the next instruction n+1 in Cycle 3. On the other hand, the access from DA is postponed until the third DSP cycle. In this cycle, the stall signal to the DMAC (PADSTALL) is reset, which allows the DMAC to proceed to the next DMA instruction k+1 in the fourth cycle.

The PC access in the third cycle experiences no conflict with the DA(Write) access because the DMAC is accessing the on-chip memory during this instruction cycle. In the fourth cycle, as just XA and YA are accessing the same on-chip data memory page, XA is serviced first and then YA. Even though the n+1th instruction fetch (PCn+1) access has been finished, the DSP Core must wait until the YA access is allowed, and therefore the PASTALL signal is asserted during the fourth cycle.

Because the PCn+1 access to external memory was completed in the third cycle, the DA(write) access can be executed without a stall in the fourth cycle. As demonstrated by this example, the arbitration process is made very efficient by providing independent stall signals for the DSP Core 3500 and DMAC 3000.

Referring to FIG. 3C, which shows operation of the parallel arbiter when accesses to external memory require one wait cycle to be completed, which means that two instruction cycles are required to complete each external memory access. Therefore the first PC access (PCn) to external memory takes up the first and second access cycles. However, the XA and YA accesses also require two cycles to complete because of the page conflict between those accesses. Therefore, the nth instruction cycle for DSP Core is be completed in the same amount of time as in the non-wait example shown in FIG. 3B.

In the third cycle, the next PCn+1 access cycle starts. However, the XA and YA accesses are postponed for one cycle until the DA(read) access (which was also asserted during the first instruction cycle) is finished. The DMAC begins executing its k+1 instruction in the fourth cycle. However, the DMAC is stalled by the parallel arbiter during the fourth cycle wait because the PCn+1 access to external memory has not yet completed, and therefore the DMAC write to external memory DA(W)k+1 begins in the 5th cycle.

DMAC ARCHITECTURE

Referring to FIGS. 1 and 4A–4F the DMAC 3000 controls local data transfers between DSP memory mapped storage resources (including addresses for external peripherals 2300, data memory 1900, instruction memory 1400, and external memory 2500) and between the host 1200 and the DSP Core 3500. The DMAC 3000 handles host and peripheral data transfer requests by interrupting local data transfers, provides integrated handling of host commands, and loads programs and data from a byte structured boot ROM into the DSP 1100 when the DSP 1100 is operating as a stand alone processor.

The DMAC 3000 is primarily occupied with local data transfers. However, the DMAC 3000 can interrupt local transfers to handle data transfer requests from up to two on-chip "peripherals" (consisting of serial I/O devices 0 and 1, and the serial communications device) and the host 1200. As will become apparent in the following discussion of the DMAC 3000 functional blocks, the DMAC 3000 handles this diversity of transfers by providing separate registers dedicated to local data transfers, two interrupt driven peripheral transfers, and interrupt-driven host data transfers and commands.

DMAC Data Transfer Programs

In general, all DMAC 3000 data transfers are determined by a limited number of transfer programs implemented in hardware and consisting entirely of load and store operations wherein a datum is transferred under DMAC 3500 control from a source location, through a temporary data register in the DMAC 3500, to a destination location. The DMAC almost always receives and transmits data on the DD bus 1106, while the DMAC 3000 broadcasts pointers to the source and destination locations on the DA bus 1112. The aforementioned transfer programs are limited to four variations, wherein data is moved from a single source to single destination, a single source to multiple destinations, multiple sources to a single destination, and multiple sources to multiple destinations.

Facilitating this range of transfers and interrupts, the DMAC 3000 provides control registers for on-chip transfers (storing such information as the repeat counts for local transfers and two peripheral data transfers, the local transfer program number, DMAC status and control flags set by the DSP Core). The DMAC 3000 also provides registers to concurrently store source and destination pointers for local data transfers, the two interrupt-driven peripheral data transfers, and host data transfers. The DMAC 3000 also provides circuitry for incrementing those pointers to facilitate transfers involving multiple destinations and multiple sources. Finally, the DMAC provides its own interrupt handler to resolve multiple interrupts for host transfers and the two peripheral transfers, and the DMAC 3000 dedicates several registers to the host interface for the purpose of transferring data and commands between the host 1200 and the DSP 1100.

Data Transfer Controller

Figure 4B:
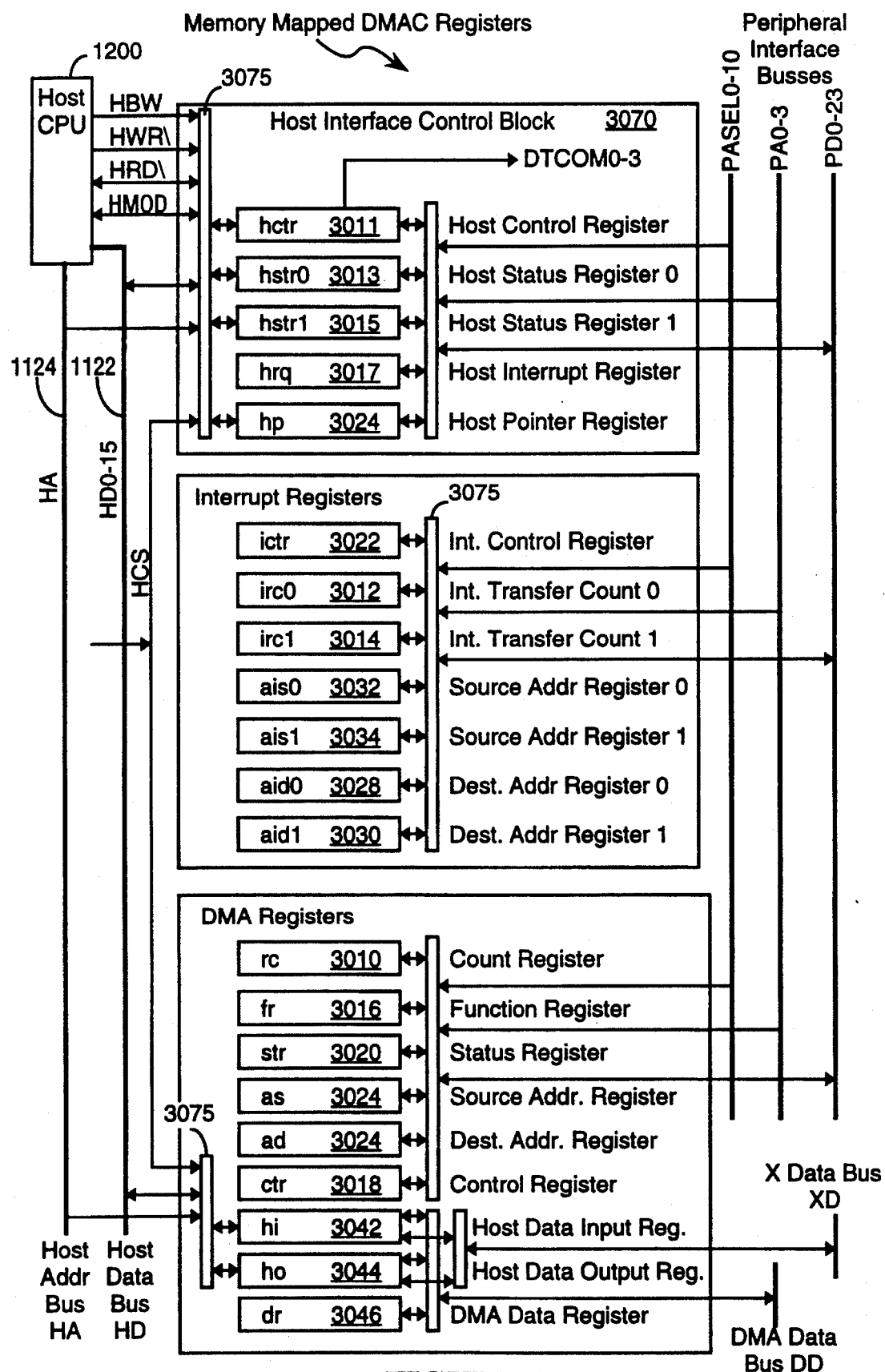
Figure 4C:
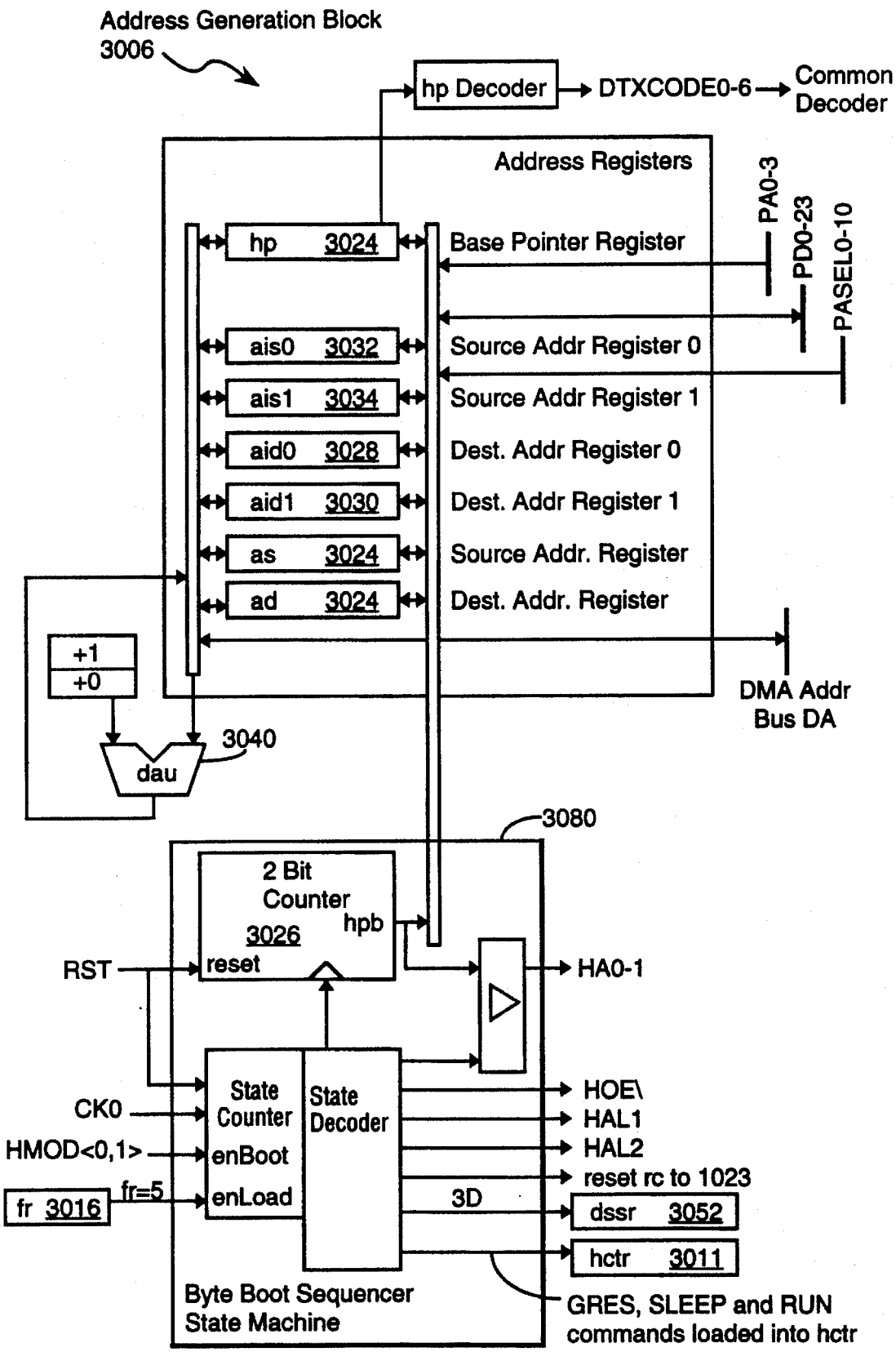
Figure 4D:
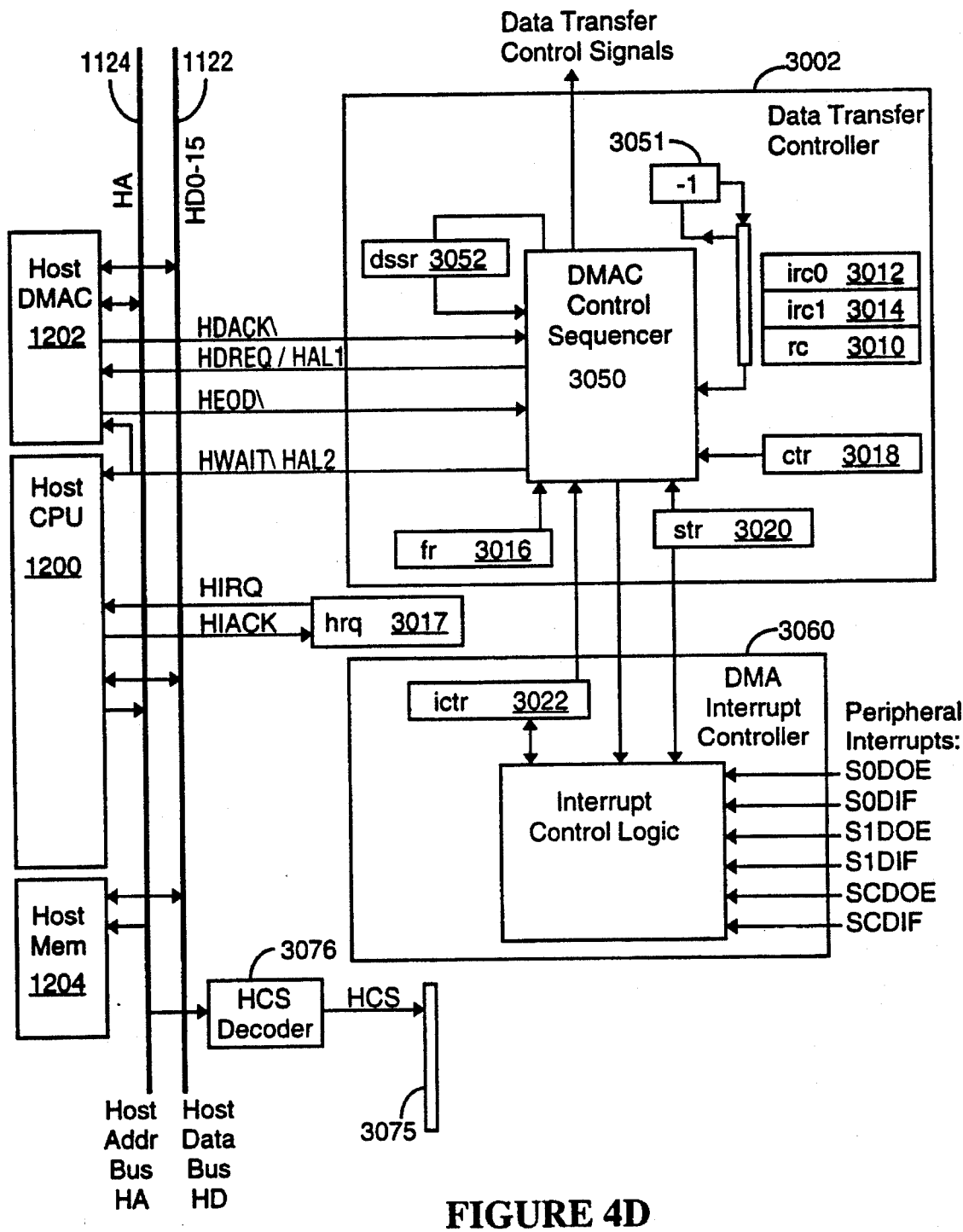

As shown in FIG. 4D, the data transfer controller 3002 contains transfer count registers rc 3010, irc0 3012, and irc1 3014, which respectively hold the counts of data to be transferred for background local transfers and peripheral data transfers 0 and 1. The data transfer controller also contains the function register fr 3016, control register ctr 3018 and status register str 3020.

The control register ctr 3018 contains the local data transfer enable flag DT, which is readable and writable by the DSP Core and the DMAC. When DT=1 local data transfers are enabled, and when DT=0 there is no local data transfer activity. Generally, the DSP initiates all local data transfers by setting DT=1. When the local data transfer is completed by the DMAC 3000, the DMAC clears the DT flag.

The repeat count registers are rc 3010, irc0 3012 and irc1 3014. Register rc holds repeat counts for local data transfers, also known as foreground or interruptable data transfers. Registers irc0 and irc1 hold repeat counts for data transfers initiated by peripheral interrupts PIRQ0 and PIRQ1 respectively. Upon initiating a data transfer, the number of data transfers to be performed is stored in the one of these registers corresponding to the type of transfer being performed, The repeat count register currently being used is decremented following each transfer of one data word from source to destination. Each of the repeat count registers can store a value as large as 256K, which is equal to the size of the largest addressable memory. A shared decrementer circuit 3051 in sequencer 3050 is used for decrementing whichever of the repeat count registers icr0, irc1 and rc is being used by the current transfer operation.

To initiate a local data transfer operation, the DSP Core 3500 writes the function number of the desired transfer operation to DMAC function register fr 3016, shown in FIGS. 4B and 4D. The function number (valid values of which are 0–3 and 5) represents a data transfer program implemented in a PLA sequencer 3050 and built from the six primitive instructions shown in Table 1.

TABLE 1

| INSTRUCTIONS | CODE | | |
| --- | --- | --- | --- |
| | b2 | b1 | b0 |
| r = *sp | 0 | 0 | 0 |
| r = *sp++ | 1 | 0 | 0 |
| *dp = r | 0 | 1 | 0 |
| *dp++ = r | 1 | 1 | 0 |
| drepeat | 0 | 0 | 1 |
| dstop | 0 | 1 | 1 |

In Table 1, variable r represents one of the temporary data registers dr 3046, hi 3042, or ho 3044. For local transfers, r will always mean dr 3046. Variables sp and dp respectively represent one of the source pointer registers (as 3038, ais0 3032, or ais1 3034) or one of the destination pointer registers (ad 3036, aid0 3028, or aid1 3030). A pointer variable proceeded by "*" indicates an access of the data addressed by the pointer. A pointer variable proceeded by "*" and followed by "++" indicates that the pointer is to be incremented following the access. Thus, instruction r=*sp is a source data load involving the transfer of data pointed by sp to the data register r, whereas instruction r=*sp++ is a source data load with a post increment to sp so that following the access sp points the next memory address. Similarly, instruction *dp=r is a destination data write involving the transfer of the contents of data register r to the memory location pointed by dp, and instruction *dp++=r is a destination data write with a post increment to dp.

Two DMAC control instructions, drepeat and dstop are also provided. When used in a transfer program, the drepeat instruction causes the DMAC to repeat the next two program instructions for the number of times assigned in the repeat counter register rc. The dstop instruction causes the DMAC to clear the data transfer flag DT in register ctr and halt the DMAC. It also issues an interrupt to the DSP core signifying that the local DMA transfer is complete by setting the DIRQ flag.

Table 2 shows the operands used by the four data transfer operations represented in Table 1 for different classes of DMA transfers. For example, the ho and hi registers 3042 and 3044 are used to temporarily store data during host DMA transfers and for executing host commands, while the dr register 3046 is used to temporarily store data during local DMA and peripheral interrupt transfers.

Referring to FIG. 5A, the DMAC's transfer control sequencer 3050 provides four local data transfer programs using the six primitive functions shown in DMAC will not send the DMAE interrupt to the DSP when a local DMA transfer is completed. The DRPT flag is set whenever the DMAC begins a transfer of more than one word to indicate the DMAC is in repeat mode. The DRPT flag is reset upon completing a data transfer when the dstop instruction is executed.

DMAC Interrupt Controller

Figure 4E:
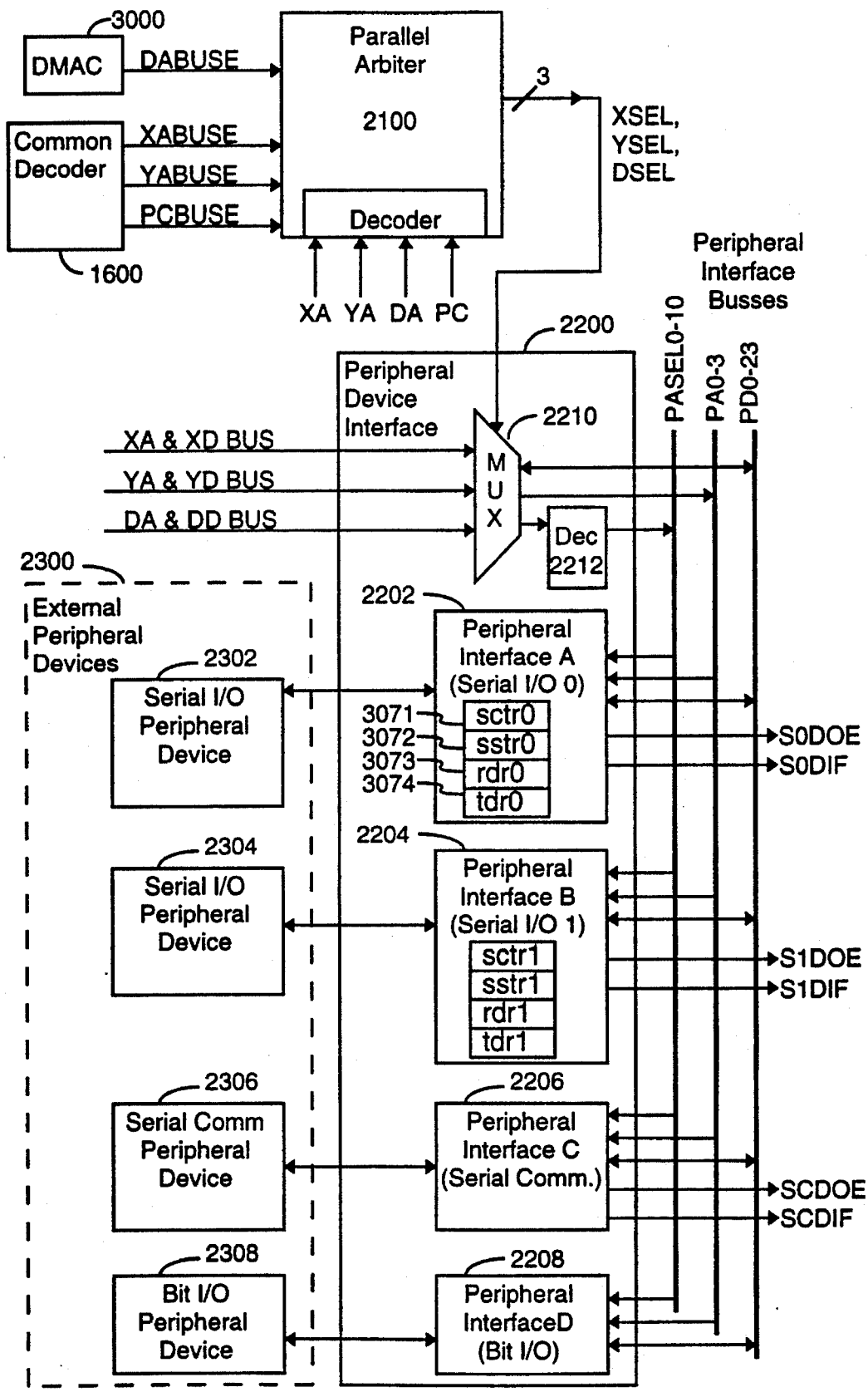
FIG. 4E is a block diagram of the on-chip peripheral devices interfaces which are used in DMA transfers to and from serial communication peripheral devices.

The typical data transfer mediated by the DMAC is between fast memories, including the on-chip data and instruction memories and the external memory. At various times, the DMAC will also need to handle data transfer requests from relatively slower peripherals for external systems 2300 via serial I/O interfaces and a serial communications interface. Referring to FIGS. 4D and 4E, interrupt signals from up to three external peripherals can be separately handled, with each of the peripheral devices having its own Output Enable (for outbound data transfers) and Input Full (for inbound data transfers) interrupts: S0DOE and S0DIF for Serial I/O Peripheral Device 0 2302, S1DOE and S1DIF for Serial I/O Peripheral Device 1 2304, SCDOE and SCDIF for a Serial Communication Device 2306. Serial I/O

TABLE 2

Operands for each DMA Operation

| Class | | Functions | Instruction | register r | source pointer sp | destination pointer dp |
|---|---|---|---|---|---|---|
| Host | RDP | Read Pointed Location | r = *sp | ho | hp | |
| Commands | WRP | Write Pointed Locations | *dp = r | hi | | hp |
| Host DMA | | Host <- DSP | r = *sp++ | ho | hp | |
| | | Host -> DSP | *dp++ = r | hi | | hp |
| Stand-Alone Byte-Boot | | ROM -> DSP | *dp++ = r | hi | | hp |
| Local DMA | | load | r = *sp | dr | as | |
| | | store | *dp = r | dr | | ad |
| | | load with pointer inc. | r = *sp++ | dr | as | |
| | | store with pointer inc. | *dp++ = r | dr | | ad |
| Peripheral Interrupt | | load | r = *sp | dr | ais0 / dais1 | |
| | | store | *dp = r | dr | | aid0 / aid1 |
| | | load with pointer inc. | r = *sp++ | dr | ais0 / ais1 | |
| | | store with pointer inc. | *dp++ = r | dr | | aid0 / aid1 |

Tables 1 and 2. Each of the four local data transfer programs has an associated function register fr value. Setting fr=0 results in a single source to single destination data transfer; fr=1 a single source to multiple destination data transfer; fr=2 a data transfer from multiple source to multiple destination; and fr=3 a data transfer from multiple source to multiple destination. In the programs involving multiple source or destination, note that dstop is the last instruction, and is only executed when the data transfer instructions have been performed as many times as required by drepeat. During data transfers, a six bit sequence register dssr 3052 is used by the sequencer 3050 to keeps track of the current step of the data transfer microprogram currently being executed.

Figure 5B:
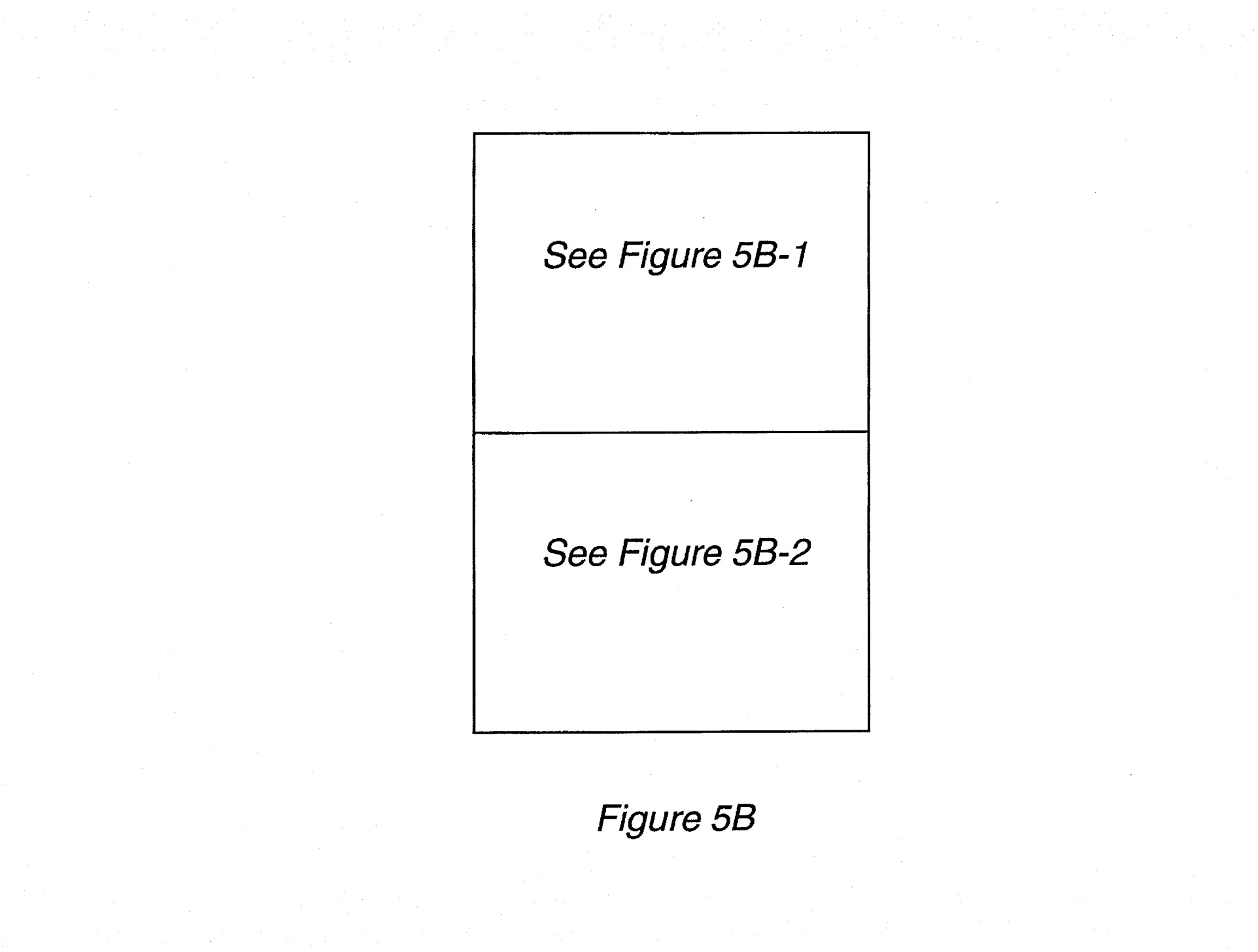
Figure 5D:
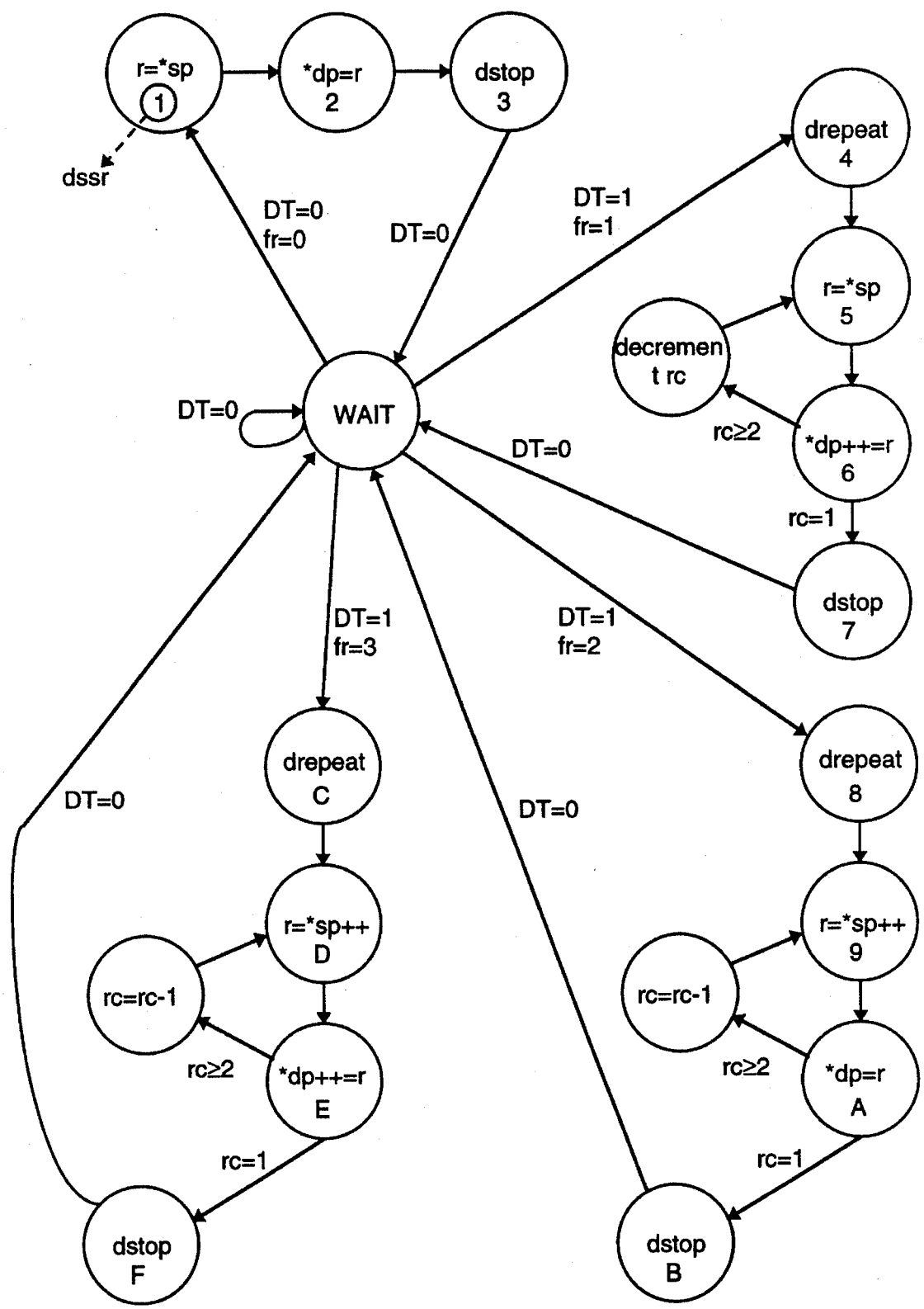

FIG. 5B shows the microprograms stored in the DMAC for peripheral interrupt data transfers, and FIG. 5C shows the microprograms stored in the DMAC for host data transfers and host DMA operations. FIG. 5D is a state diagram of the DMAC for local data transfer operations.

The status register str 3020 includes bit flags DRPT and DMAEP. DMAEP is an interrupt mask. When DMAEP is set, it enables the DMAC to interrupt the DSP core with a DMAE (local DMA end) signal when the local DMA transfer is completed. If the DMAEP flag is cleared, the Peripheral devices 0 and 1 may be CODEC chips or other devices which access serial digital data. The Serial Communication Device 2306 is typically a device having an RS232 port.

Note that external peripheral device 2308 does not generate any interrupt signals. External device 2308 is typically one or more switches, one or more control pins for various devices, and/or an interface for reading and/or writing a number of circuit nodes, often used for "mode control" settings and the like.

The DMAC handles these peripheral data transfer requests on an interrupt basis using a dedicated DMA interrupt controller 3060. Enabling these transfers is the dedicated peripheral interrupt control register ictr 3022, shown in FIGS. 4B, 4D and 6. Register ictr 3022 provides four fields of information for each of the two possible peripheral interrupts PIRQ0 AND PIRQ1. The DSP core has read/write access to all of these fields of ictr 3022 except the interrupt flags (PIRQ1, PRIQ0) themselves, for which it has only read access.

The interrupt selection fields (S12,S11,S10 for PIRQ1 and S02,S01,S00 for PIRQ0) specify which peripheral is the source of the interrupt (either Serial I/O 0 2302, Serial I/O 1 2304, or Serial Communication I/O 2306) and whether the peripheral is ready to read ("Output Empty") or write ("Input Full"). For example, if bits S02,01,00=<0,0,0>, then peripheral interrupt 0 is assigned to Input Full (i.e., received data) interrupts from the Serial I/O 0 peripheral device.

The function selection fields (F11,F10 for PIRQ1 and F01,F00 for PIRQ0) specify the data transfer operation to be performed. FIG. 6 shows the interrupt data transfer functions in abbreviated form, where each shown data transfer function actually performs separate load and store primitive operations as discussed above. Further, it should be noted that software executed by the DSP core 3500 will load values into the Sj2,Sj1,Sj0 and Fj1,Fj0 fields in order to specifying the peripheral I/O operations, if any, that are to be performed by the peripheral device interface 2200 in conjunction with the DMA controller 3000.

The DMAC interrupt flags PIRQ0 and PIRQ1 when set indicate pending PIRQ0 and PIRQ1 interrupts to the DMAC; these flags are cleared by the DMAC when the interrupts are accepted. Finally, if the DSP interrupt priority level flags PTE1P and PTE0P are set, the DMAC will interrupt the DSP Core upon completion of the pending data transfer (i.e., when irc0 or irc1 are equal to 1); if PTEOP or PTEIP equals 0, the DMAC 3000 does not issue an interrupt to the DSP Core 3500.

Address Generation Block

The DMAC handles different kinds of data transfers. The most common is the local data transfer between memory mapped storage resources. Local data transfers are interruptable by up to two data transfers from the memory mapped on-chip peripherals, which include the two serial I/O interfaces and the serial communications interface. To handle these different load/store data transfers as expeditiously as possible, the DMAC provides three sets of source and destination registers dedicated respectively to local data transfers and the two peripheral interrupt transfers.

The address generation block 3006 provides data transfer source and destination addresses to the DA bus 1112. These addresses are provided by dedicated 18-bit registers aid0 3028 and aid1 3030, which store destination addresses for fast interrupt peripheral transfers 0 and 1 respectively; ais0 3032 and ais1 3034, which store source addresses for fast interrupt peripheral transfers 0 and 1; and ad 3036 and as 3038, which store the destination and source addresses for local data transfers.

The host processor has read/write access to all registers and memory locations in the DSP through the DMAC, and thus has mad/write access the above described address block registers.

While the DMAC 3000 can only execute one data transfer at any time, the provision of separate dedicated address registers for interrupts and local data transfers permits the DMAC to handle interrupts as quickly as possible. In particular, since the address registers for an interrupted local DMA transfer do not need to be stored in a stack memory area prior to servicing the interrupt, several instruction cycles normally used for saving register values are saved, as are the instruction cycles for restoring those register values after the interrupt servicing is completed.

Referring to FIG. 4C, for host data transfers the address generation block 3006 provides an 18-bit host pointer register hp 3024, which holds the address of either the DSP data transfer source or destination. The host pointer register value address is extended by a 2-bit host pointer base counter hpb 3026, which comes into play when the DSP is being booted from a byte-structured ROM. The 18-bit hp register 3024 is accessed by the host CPU 1200 as three separate registers hp0, hp1, and hp2 when the host data bus is 8-bits wide, and as two registers hpL and hp2 when the host data bus is 16-bits wide.

The address generation block 3006 also contains a DMA arithmetic unit dau 3040 that increments the addresses held in the aforementioned registers for implementing data load and store with post increment operations, discussed above.

DMAC Data Registers

As discussed above, data transfers performed by the DMAC are achieved through a series of load/store operations wherein a data word is read from a source address into a transfer register, then written from the transfer register to the destination address. The DMAC provides three dedicated 24-bit data transfer registers, host data input register hi 3042, host output data register ho 3044, and DMA data register dr 3046. Registers hi 3042 and ho 3044 are employed in host data transfers, hi 3042 storing data written by the host 1200, and ho 3044 storing data to be read by the host 1200. Register dr 3046 is employed as temporary data storage for local data transfers.

DMAC Host Interface Control Block

The DMAC includes a host interface control block 3070 with several registers dedicated to host data transfers. These dedicated registers include the host control register hctr 3011, host status register 0 str0 3013, the host status register 1 str1 3015, and host interrupt register hrq 3017. The use of these host interface registers are discussed below in the section entitled "Host Data Transfers". The host interface in integrated with the DMAC and thus is very efficient in terms of circuitry because it uses the same hardware as the DMAC. Furthermore, the inclusion of the host interface with the DMAC enables the host to issue commands to the DMAC. The host commands are shown in Table 7 below in the section on Host Transfer Commands.

BUS CONNECTIONS

FIGS. 1, 4B, 4C and 4E shows DMAC 3000 connections to the DSP busses DA, DD, and XD; and the host busses HA 1124 and HD 1122. Data transfers between memory mapped storage resources, including the host registers, peripheral interfaces, external memories and on-chip memories, are performed using the DMA data bus DD 1106 and DMA address bus DA 1112. Accordingly, as shown in FIG. 4C, the address registers hp 3024, aid0 3028, aid1 3030, ais0 3032, ais1 3034, ad 3036, and as 3038 are connected to the DMA address bus DA 1112; and as shown in FIG. 4B, the data registers hi 3042, ho 3044, and dr 3046 are connected to the DMA data bus DD 1106. The DMAC also supports host data transfers through the host data registers ho and hi to registers within the DSP Core 3500 which are only accessible over the XD bus 1102. For these transfers, connections are provided between the DMAC host data registers hi 3042 and ho 3044 and the XD bus 1102.

FIG. 4E also shows a direct connection between the DMAC and the on-chip peripheral interfaces A 2202, B 2204, C 2206 and D 2208, which comprise the peripheral interfaces for external systems 2300 via the 24-bit peripheral data bus PD0-23 1126, the 4-bit peripheral address bus PA0-3 1128 and the peripheral select bus PASEL. The DMAC accesses the peripheral device interface over the DD and DA busses, which, if allowed by the PRA 2106 in the parallel arbiter 2100, grants access the DMAC access to the PD and PA busses. As discussed below, the peripheral address and data busses are also used by the DSP core to directly read and write the DMAC's memory mapped internal registers.

Note that the peripheral data bus PD is actually selected by the parallel arbiter 2100 from one of XD 1102, YD 1104, and DD 1106, and PA is selected by the parallel arbiter from one of XA 1108, YA 1110, and DA 1112. FIG. 4E shows the multiplexer circuitry for selecting the internal bus to be connected to the peripheral bus. To access a peripheral device 2300, the DSP Core or DMAC first supplies a bus enable signal (e.g., XABUSE, YABUSE, DTBUSE) to the parallel arbiter 2100 and places the address of a memory mapped peripheral on the corresponding address bus, providing the same address to the parallel arbiter. The parallel arbiter 2100 then grants access to the peripheral, possibly after some delay in case of an access conflict. When the parallel arbiter grants the access, it sends XA, YA and DA select signals to the PDI multiplexer 2210, selecting one of the busses as the peripheral data and address bus. The PDI then couples 24-bit lines of the selected data bus to the peripheral data bus PD0-23. The PDI also includes an address decoder 2212 for generating a 11-bit peripheral select signal PASEL0-10 that selects 1 out of 11 possible peripherals as the destination or source of the data transfer. PDI produces this signal by decoding bits 4–7 of the 18-bit peripheral address supplied by the DMAC or DSP Core, those bits mapping uniquely to a single peripheral. The PDI 2200 then addresses 1 of 16 possible registers within the selected peripheral by supplying bits 0–3 of the 18-bit peripheral address to the peripheral via the peripheral address bus PA0-3. The following table shows the memory mapping of the peripheral registers and their PASEL address:

| Peripheral | Address Range | PASEL |
|---|---|---|
| Bit Interface | 07400–0740F | 0 |
| Parallel I/O Port | 07410–0741F | 1 |
| Serial I/O Port 0 | 07420–0742F | 2 |
| Serial I/O Port 1 | 07430–0743F | 3 |
| Serial Communication Interface | 07440–0744F | 4 |
| Timer | 07450–0745F | 5 |
| Standard DMA Registers of DMAC | 07460–0746F | 6 |
| Interrupt Driven Registers of DMAC | 07470–0747F | 7 |
| Host Interface Driven Registers of DMAC | 07480–0748F | 8 |
| Micro ROM of DMAC | 07490–0749F | 9 |
| Reserved | 074A0–074AF | A |

In the above listed addresses, each address is an 18-bit value represented by four hexadecimal digits (the first of the hexademical digits has only two operative bits, both of which are set to zero for the above listed memory mapped resources).

In accordance with above memory mapping scheme, if a program running in the DSP Core 3500 needs to access the DMAC control register ctr 3018 using the XA 1108 bus, the DSP Core 3500 sends the X bus enable signal XABUSE to the parallel arbiter 2100 along with the ctr 3018 address, 0×7460, which the DSP Core 3500 sets onto the XA bus 1108. The parallel arbiter decodes the address bits 4–7 to select peripheral 6, Standard DMA Registers of DMAC, via the PASEL bus. Finally, the parallel arbiter passes address bits 0–3 ("0000") on the peripheral address bus PA0-3 so as to address the control register ctr, which is assigned address "0000" within the DMAC.

DMAC FUNCTIONS

The DMAC provides four data transfer functions:

(1) local data transfers between memory mapped storage resources, which include data memory 1900, instruction memory 1400 and parallel I/O interface 2400;

(2) fast handling of peripheral data transfer requests;

(3) data transfers between DSP 1100 and host microprocessor 1200; and (4) Boot up from byte structured ROM in DSP stand alone operation.

As mentioned above, all of these data transfer functions consist of a series of load/store operations. To execute these instructions, the DMAC employs a two stage pipeline where one instruction is fetched and encoded as the previous instruction is being executed. These functions are described below.

Local Data Transfers

The most common form of data transfers controlled by the DMAC are local data transfers, which involve the high throughput movement of data between data memory 1900, instruction memory 1400, parallel memory interface 2400 (providing an interface to external memories 2500) and the peripheral devices interface 2200 (providing an interface to external systems 2300). In a typical local data transfer, the DMAC might move a DSP program from a relatively slow external memory 2500 into the faster on-chip instruction memory 1400. Local data transfers, being the most common DMAC data transfers, are interruptable by the less frequent peripheral and host data transfer requests.

As with other DMAC data transfers, local data transfers consist of a sequence of load/store operations in which data from a source address (stored in source address register as) is loaded temporarily onto the data transfer register dr then is written to a destination address (stored in destination address register ad). As all local data transfers use the dedicated DA 1112 and DD 1106 busses, data register dr is connected to the DD 1106 bus, and address registers as and ad to the DA 1112 bus. For the most part, the DMAC is able to execute local data transfers concurrently with DSP Core operation. However, a local data transfer operation might be delayed when both the DMAC (over the DMA address bus) and the DSP Core (over the X, Y, or PC address busses) attempt to access the same memory device at the same time. As discussed above, these access conflicts are resolved by the parallel arbiter, which stalls DMAC operation to allow DSP Core access, then steals a cycle from the DSP Core to allow the DMAC memory access.

Figure 7:
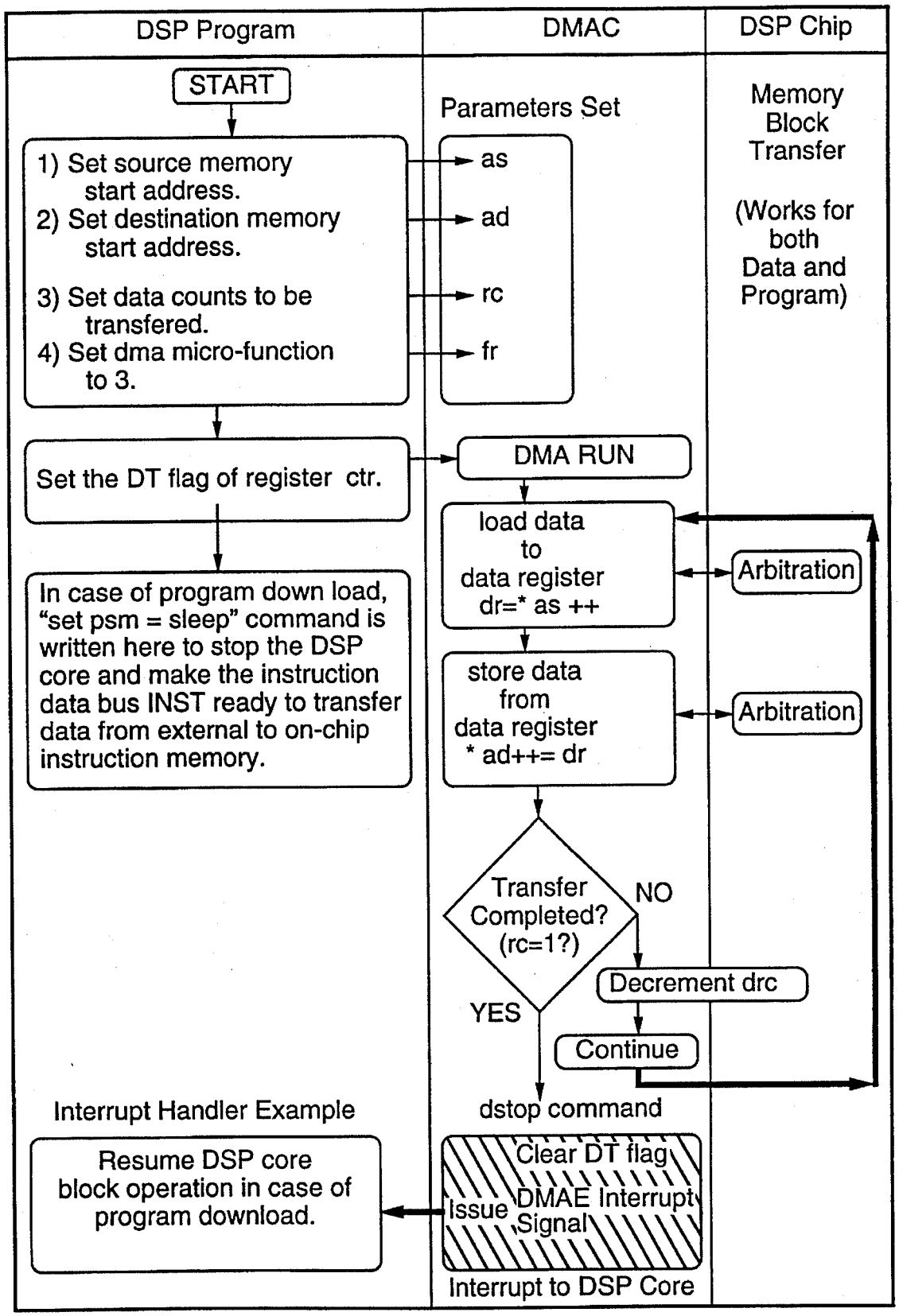
FIG. 7 is a flow chart of a local data transfer performed by the DMAC.

FIG. 7 depicts the local data transfer procedure in the case of a memory block transfer. The DSP program initiates this transfer by writing the source start address to the register as 3038, the destination start address to register ad 3036 and the number of words to be transferred to repeat count register rc 3010. The DSP program then specifies the block transfer function by writing 3 to the DMA micro function register fr 3016. The DSP Core could specify other local transfers by setting fr 3016 to "0" (single source to single destination data transfer), "1" (single source to multiple destination data transfer), or 2 (multiple source to multiple destination data transfer). As its final step in initiating a DMAC local data transfer, the DSP sets the DT flag contained in the ctr register 3018.

As soon as the DSP Core sets the DT flag, the DMAC executes the first transfer instruction of the multiple source to multiple destination program, which is a source data load with pointer increment (dr=*as++) consisting of the following steps:

(1) DMAC 3000 sends the contents of source data register as 3038 to the DMA address bus 1112 and the parallel arbiter 2100 (i.e., the DMAC requests access to the source memory).

(2) DMAC awaits parallel arbiter 2100 approval to access the source data. When the DMAC attempts to access the same storage device as the DSP Core, the parallel arbiter will delay DMAC access by holding the PADSTALL signal high. At worst, the arbiter will delay the DMAC for three "logical" instruction cycles (where the DSP Core is attempting to access the same memory as the DMAC 3000 via the XA, YA, and PC busses) although the number of physical instruction cycles of delay will depend on the number of wait states, if any, required to access the memory device in which the source data is stored.

(3) After the parallel arbiter grants the DMAC request to access the source memory (by negating the PADSTALL signal), DMAC 3000 loads data register 3046 over the DMA data bus with the data at the source address set on the DA bus 1112;

(4) DMAC increments the contents of source address register contents via the dau 3040.

Next, DMAC 3000 executes a destination data store with pointer increment (*ad++=dr) consisting of the following steps:

(1) DMAC 3000 sends the contents of ad 3036 to the DMA address bus DA 1112 and the parallel arbiter 2100 and places the contents of the dr register 3046 onto the DMA data bus DD 1106;

(2) when the parallel arbiter 2100 grants the write request, the destination device will be coupled to the DD bus 1106 and the write operation is performed; the parallel arbiter may issue a PADSTALL to delay the DMA transfer operation if an address conflict occurs;

(3) DMAC increments the contents of destination address register ad 3036 via the dau 3040 when the transfer is completed.

After this sequence is completed, repeat counter rc 3010 is tested to determine whether the data transfer has been completed. If rc 3010 is greater than or equal to 2, signifying the transfer is not complete, rc 3010 is decremented by one and the DMAC continues the block data transfer operation by loading the next datum. If rc 3010="1", DMAC stops execution and signals data transfer completion to the DSP Core by clearing the DT flag and issuing an interrupt DTDMAE (DMA end) to the DSP interrupt controller 2600. However, if interrupt priority flag DMAEP in status register str 3020 is set to "0" DMAC 3000 will not issue the interrupt.

The DMAC follows the same operation sequence for local transfer functions 0, 1, and 2, except for the pointer post increments. In a function "0" transfer (single source to single destination), there are no post load/store increments to the destination or source addresses. In function "1" and "2" transfers, the DMAC post increments the destination or source pointers respectively.

FIG. 8A shows the timing of a newly initiated multiple source to multiple destination local data transfer operation (function "3"). Note that instruction execution in the DMAC is pipelined, consisting of instruction fetch/decode and execution cycles. As discussed above, prior to starting this data transfer operation, the DSP Core loads the function register fr, the source and destination registers as and ad, and the repeat count register. The DSP Core then initiates the DMAC data transfer program by setting the DT flag in the control register ctr 3018. In the first instruction cycle after DT is set, the DMAC fetches/decodes the initial drepeat instruction (this instruction when executed will determine how many times the load/store sequence will be repeated) and executes a NOP instruction. In the second instruction cycle, the DMAC fetches/decodes the load with pointer increment instruction and executes the drepeat instruction (which sets the RPT flag in the str register 3020. In the third instruction period, the DMAC executes the load with pointer increment instruction while fetching the subsequent store with pointer increment instruction. The first load/store sequence is competed in the fourth cycle when the DMAC executes the store with pointer increment instruction and fetches/decodes the next load/increment instruction.

FIG. 8B shows the sequence of actions performed by the DMAC when the DSP Core halts an active local data transfer operation by clearing the DT flag in the control register ctr 3018 and later causes operation to be resumed by resetting the DT flag. After the DSP Core clears the DT flag, the DMAC freezes the pipeline status following the completion of the pending read/write operation. When the DSP Core resets the DT flag in the control register ctr 3018, the DMAC resumes execution starting with the frozen pipeline status.

Figure 8C:
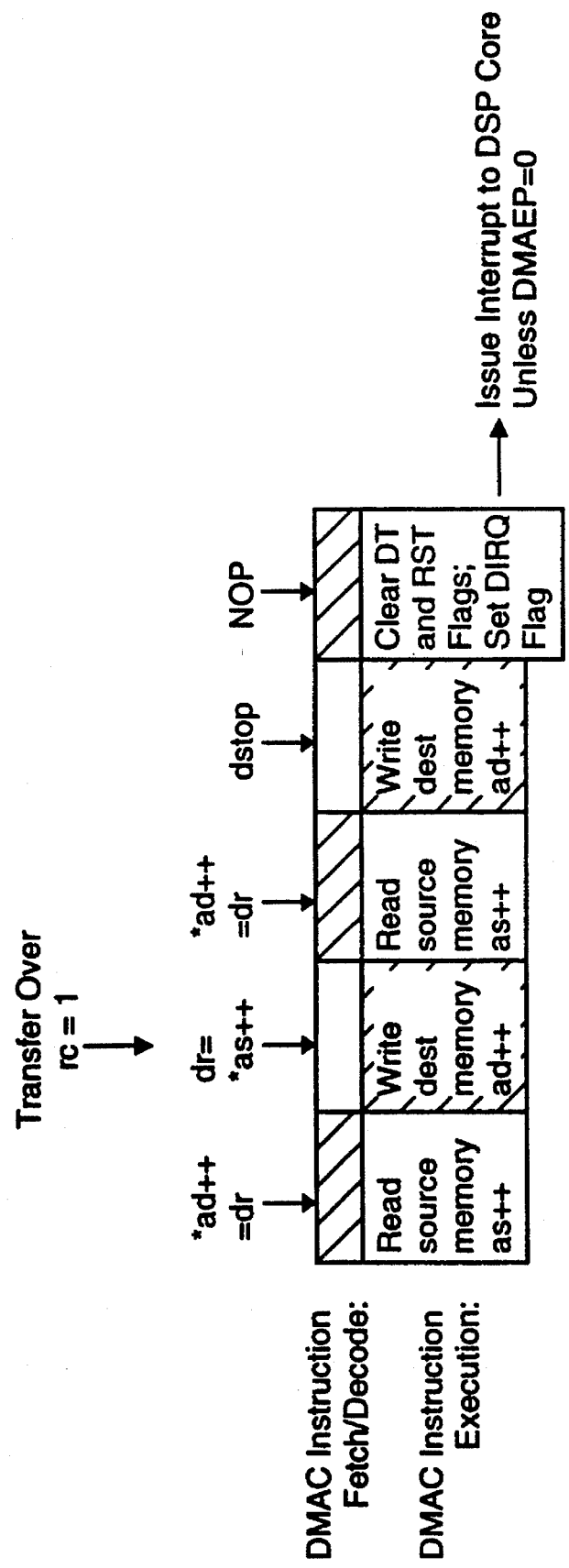

FIG. 8C shows the actions performed by the DMAC at the end of a data transfer.

PERIPHERAL DEVICE INTERRUPTS

There are six interrupts to DMAC operation which are shown in Table 3. These interrupts are one of the unique features of this DSP in that they allow the DSP to quickly interrupt a local data transfer operation to handle host or peripheral data transfer requests.

TABLE 3

| | | DMAC INTERRUPT PRIORITY TABLE | |
|---|---|---|---|
| Priority | Number | Interrupts | Remarks |
| Highest | 0 | Reset/HReset | Pin Reset / Host Reset |
| High | 1 | DT clear | DMAC halt by DSP Core or Host |
| | 2 | DIF | Host Data Input Register Full under host DMA, or WRP Host Command |
| | 3 | DOE | Host Data Output Register Empty under host DMA, or RDP Host Command |
| Low | 4 | PIRQ0 | Peripheral Interrupt 0 (interrupt source selected in dictr) |
| Lowest | 5 | PIRQ1 | Peripheral Interrupt 1 (interrupt source selected in dictr) |

Figure 9:
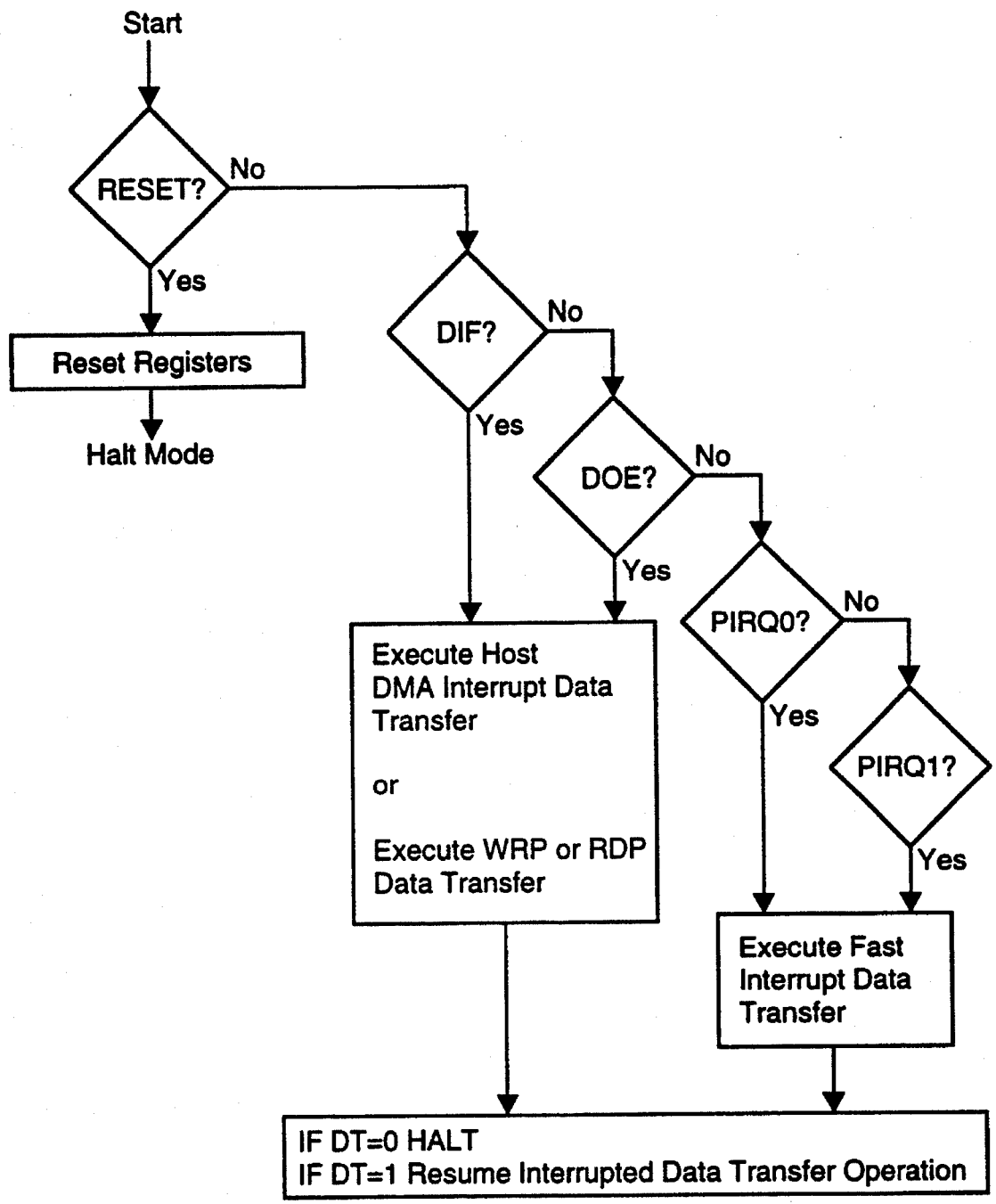
FIG. 9 is a flow chart of the prioritization process for determining the order in which the DMAC should service several overlapping interrupts.

Referring to Table 3 and FIG. 9, the highest priority interrupt is the reset from the DSP core (RST signal) or from the host interface (DTRESET initiated by GRES host command). When one of these is detected, the registers are reset and DMAC enters into halt mode. If no reset is detected, the DMAC looks for host interface interrupts DIF (data input full) and DOE (data out empty), both of which are represented by bit flags in the hstr1 register. If these are found, the DMAC executes the host DMA data transfer or WRP/RDP host commands using the host pointer register hp 3024 and data registers hi 3042 or ho 3044. After this is finished, the DMAC checks the DT flag. If the DT flag is set, the DMAC resumes the interrupted main data transfer operation. If the DT flag is cleared, the DMAC enters into halt mode.

Finally, the DMAC looks for peripheral interrupt 0 (PIRQ0) and then peripheral interrupt 1 (PIRQ1), both of which are represented by bit flags in the ictr register. If either of these interrupts is detected, the DMAC executes one data transfer sequence by executing the "load dr" and "store dr" commands with the functions assigned in the interrupt control register ictr 3022. The destination registers aid0/1, source registers ais0/1 and repeat count registers irc0/1 are used for interrupts PIRQ0 and PIRQ1, respectively. After the transfer is finished, the DMAC checks the DT flag in the control register ctr. If this flag is set, the DMAC resumes the interrupted main data transfer operation. If DT is cleared, the DMAC enters the halt mode.

Figure 10:
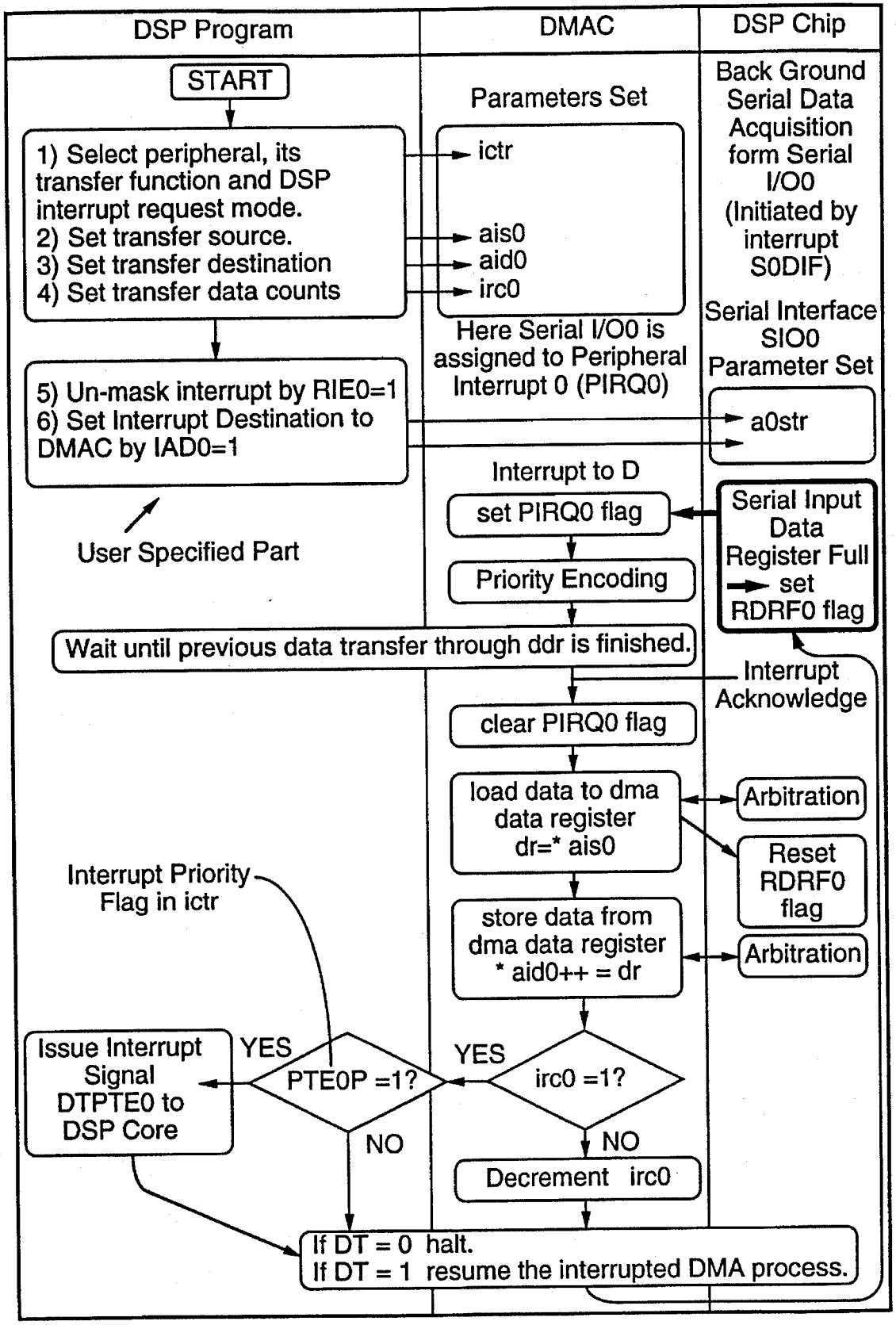
FIG. 10 is a flow chart of a data transfer to a peripheral device performed by the DMAC.

FIG. 10 shows the process by which the DMAC transfers data from a serial interface input register (part of peripheral device interface 2200) into a block of memory. The destination address pointer (to a memory location) is incremented for each interrupt. In this way, asynchronous data from the serial device can be written in order to the destination memory. This is an example of transferring data from a single source register to multiple memory locations, such as a data transfer from a modem or Codec to an internal or external memory.

To begin the transfer, the DSP first writes the selected peripheral, transfer function and DSP interrupt request mode to the interrupt control register ictr 3022. In this case, the DSP selects serial interface 0 input as peripheral interrupt 0 PIRQ0 by setting <S20,S10,S00> to <0,0,0>. Second, the DSP specifies that the transfer is to be from a single source (serial interface 0 data receive register) to multiple destinations (a block of memory) by setting <F01,F00> to <0,1> which corresponds to the transfer function *aid++=*ais. Third, the DSP core sets the PTE0P flag that determines whether the DMAC will interrupt the DSP upon completion of a data transfer. Setting PTE0P to 0 means that no interrupt is sent to the DSP Core. Setting PTE0P to 1 instructs the DMAC to send the respective interrupt PTE0 or PTE1 to the DSP core when interrupt transfer counter irc0 equals 1.

Next, the DSP sets the source and destination addresses to aid0 3028 and ais0 3030 respectively. In this example, ais0 will hold the address of the serial interface 0 receive data register, and aid0 will hold the starting address of the block of memory where the serial data is to be written. If required, the data number of the data to be transmitted in the interrupt repeat counter register dirc0.

Figure 4F:
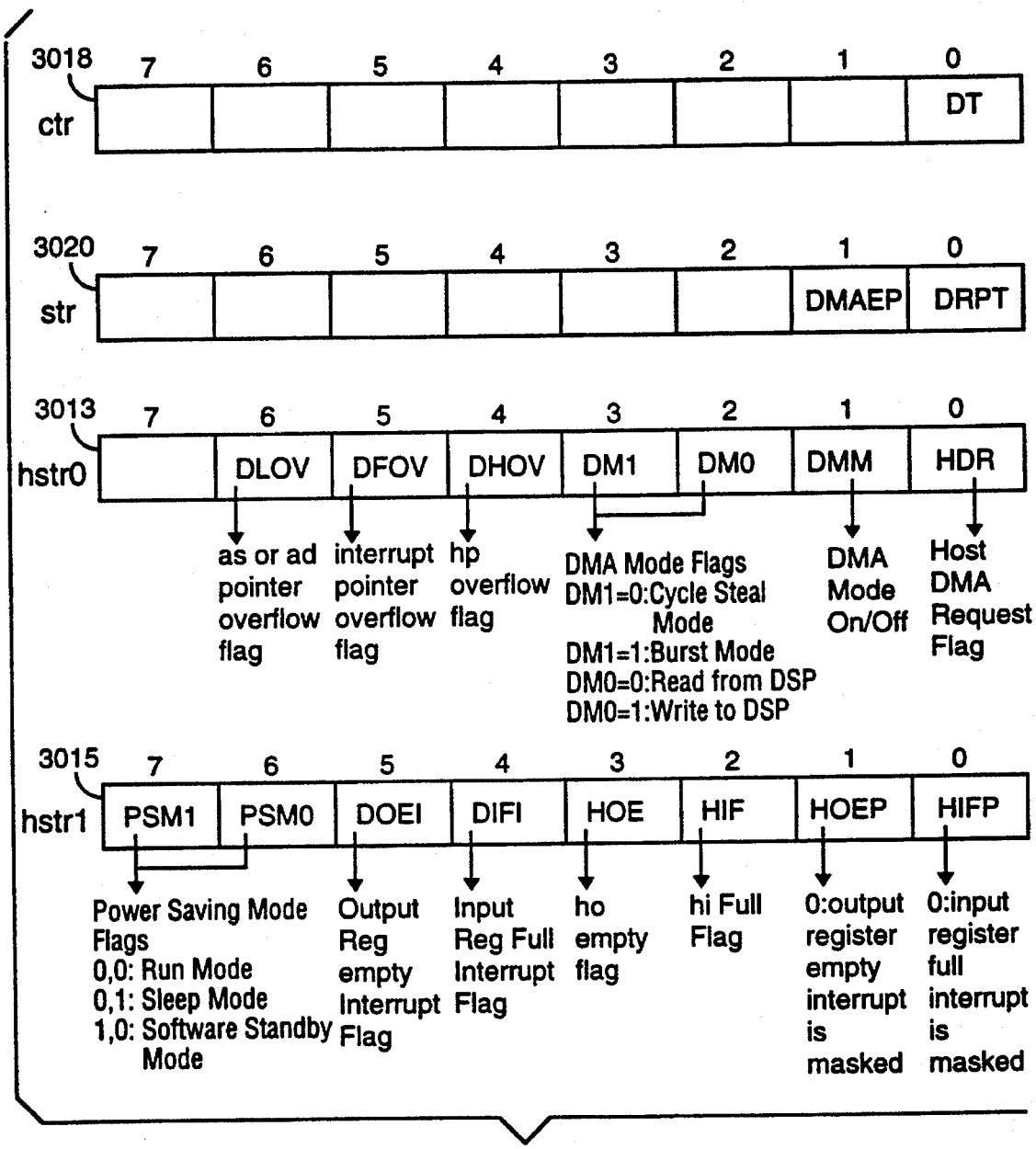
FIGS. 4F and 4G are block diagram of certain registers in the DMAC and in an on-chip peripheral device interface, respectively.
Figure 4G:
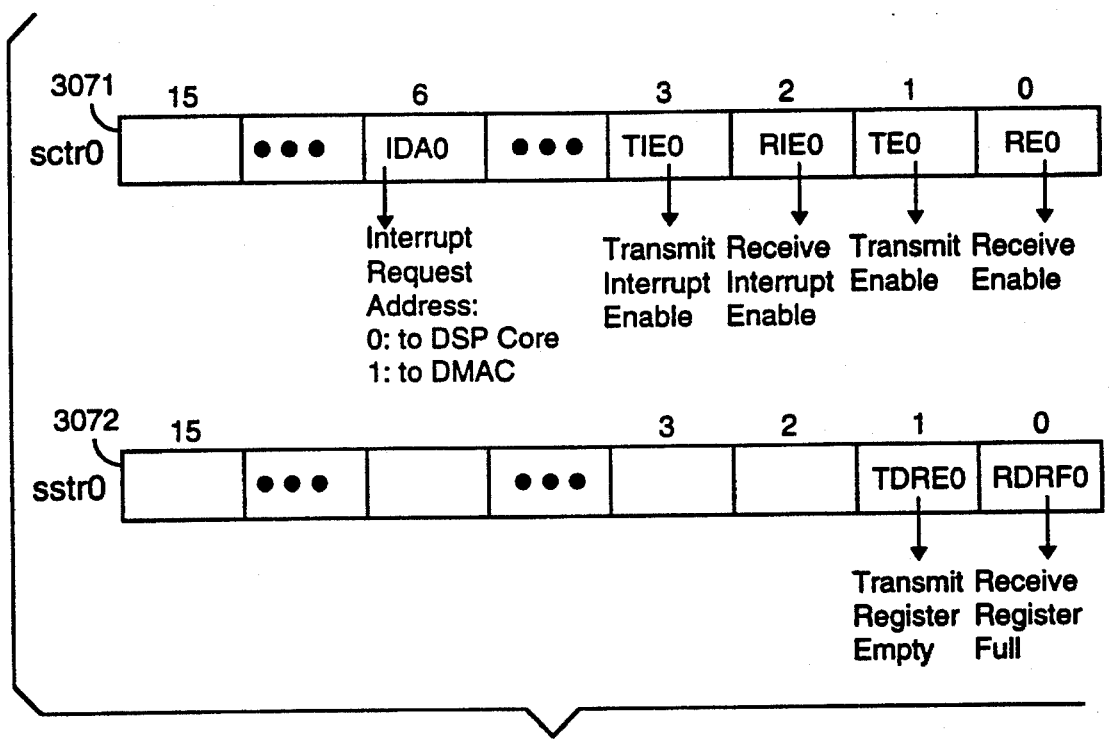

The DSP next unmasks the serial interface interrupt by setting the flag RIE0 to 1 in the serial interface 0's control register sctr0 3071 (see FIGS. 4E and 4G). When the serial interface 2202 receives data that fills its data read register rdr0 3073 (a 24-bit shift-input, parallel-output register in the preferred embodiment), it sets the RDRF0 flag in status register sstr0 3072. Setting the RIE0 flag to 1 in register sctr0 allows the serial interface 0 2202 to send a received data interrupt signal either to the DMAC or to the DSP interrupt controller when the serial receive data register rdr0 has been filled with data received from an external device 2302. If the IAD0 (interrupt request address) flag in the sctr0 register 3071 equals 0, the received data interrupt is sent to the DSP core 3500; if the IAD0 flag equals 1, the received end interrupt is sent to the DMAC. If RIE0 is set to 0, the received data interrupt is not be sent to the DSP interrupt controller or DMAC, with the result that no data will be received by the DSP.

Similarly, for data transmissions to a peripheral device, the peripheral interface 2202 includes transmit data register tdr0 (a 24-bit parallel-input, shift-output register in the preferred embodiment) in which the data to be transferred is stored. The peripheral interface 2202 sets a bit flag TDRE0 in the status register sstr0 when the data in the tdr0 register has been received by the peripheral device 2302, and then generates a corresponding "output empty" interrupt request signal. That interrupt is routed to the DMAC 3000 if IDA0 equals 1, and the DMAC then loads a next data word into the transmit data register tdr0 if the repeat count irc0 for the peripheral interrupt is greater than 1.

Similar registers sctr1, sstr1, rdr1 and trd1 are included in serial interface 1 2204.

DMAC interrupt operation is initiated by the serial input data register full interrupt signal SODIF from the serial interface 0 2202 which is sent to the DSP interrupt controller 2600, which sets the interrupt flag PIRQ0 in ictr 3022 to a value of 1. That, in turn, signals the DMAC interrupt controller 3004 that serial data is ready for reading. Multiple peripheral interrupts arriving at the DMAC interrupt controller are handled according to their priority, determined by Table 3. If accepted, the peripheral data transfer is accomplished through a pair of dr load and dr store operations. As above, arbitration is conducted for memory accesses performed during the dr load and dr store operations. Just before the dr load operation of the DMAC's interrupt program the DMAC clears the PIRQ0 flag so prepare the DMAC's interrupt controller 3060 to receive a next interrupt. Following the dr load operation, the DMAC clears the serial input data register full flag RDRF0, which prepares the serial interface to receive more data. Apart from the clearing of the PIRQ0 and RDRF0 flags, the interrupt data transfer operation is just like the local data transfer operation discussed above, except that the source and data registers are ais0 and aid0.

After the completion of the dr load and dr store, DMAC checks the contents of the repeat counter irc0. If irc0=1 (signifying that the peripheral transfer is complete) and PTE0P=1 (signifying that the DSP core 3500 is to be interrupted upon completion of the transfer), the DMAC issues the PTE0 interrupt (peripheral transfer 0 end) to the DSP core 3500. If irc0>=2, repeat counter irc0 is decremented by one and the DMAC waits for the next peripheral interrupt. At this point, if flag DT=1 (signifying an interrupted DMAC data transfer process), the DMAC will resume the interrupted process. If flag DT=0 (signifying no interrupted activity), the DMAC will halt.

Figure 11:
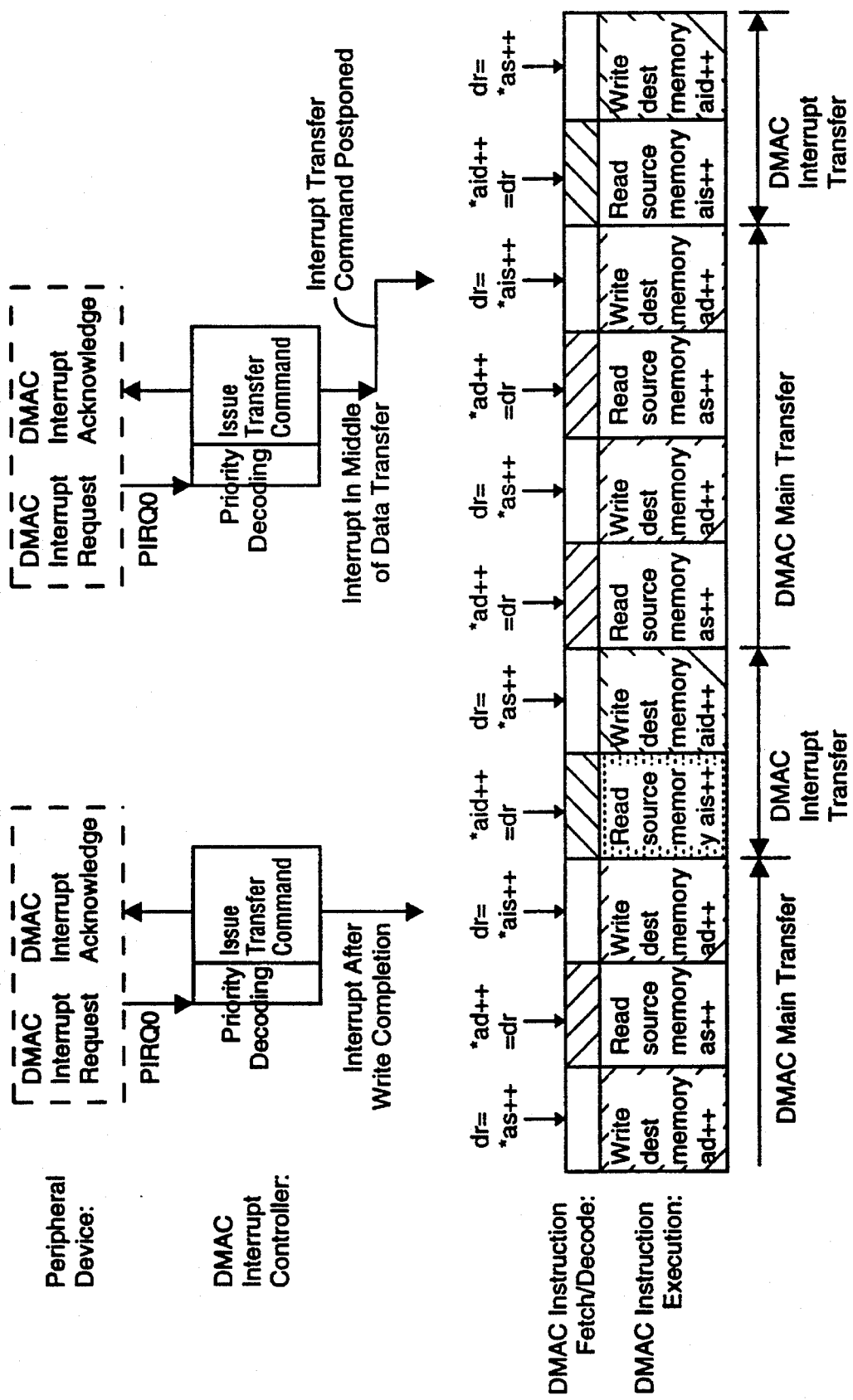
FIG. 11 is a timing diagram for a local data transfer interrupted by a peripheral interrupt transfer operation.

FIG. 11 shows the timing of the peripheral data transfer operation. The DMAC interrupts receives the interrupt (via DSP setting flag PIRQ0) and in the next cycle decodes priority. In the case of conflicting interrupts, low priority interrupts are ignored. In the following cycle, the DMAC interrupt controller acknowledges the interrupt and fetches the interrupt handling program (the PLA state is generated from the transfer function specified in ictr). Two consecutive instructions (load dr and store dr) are fetched. After two cycles in which those instructions are executed, the DMAC interrupt controller resumes the main transfer routine. Note that the DMAC delays execution of its interrupt handling program until the completion of the already running local data transfer. That is, if execution of the previous data transfer operation is not finished, the interrupt operation is postponed for one DMAC operation cycle.

HOST DATA TRANSFERS

The DMAC 3000 includes an interface to Hitachi and other popular microprocessors. This interface provides a 16-bit or 8-bit connection to the host data bus (HD) 1122 and a 4-bit connection to the host address bus HA 1124 (which allows the host to access up to 16 8-bit DSP registers). This host interface provides the following functions:

1) Reception of commands from the host microprocessor 1200, including operation mode commands to the DSP Core 3500 and data transfer commands.

2) Access from the host to all DSP memory/register resources, including the external memory 2500. This function is achieved through a host pointer register hp 3024 and the hi and ho host data input and output registers hi 3042 and ho 3044 in the DMAC 3000, which allows the host to access any memories that are memory mapped to the host.

3) DMA transfers between host memory and all DMA memory, controlled by the host DMA controller 1202.

As shown in FIGS. 4B and 4D and in Table 4, the host computer 1200 is connected to the DSP via the following set of connection lines in the host interface:

TABLE 4

HOST INTERFACE CONNECTION LINES
(DSP External Pins)

| Signal(s) | Name | I/O |
|---|---|---|
| Bus Signals: | | |
| HA0-3 | Host Address | I |
| HD0-15 | Host Data | I/O |
| Mode Control Signals: | | |
| HBW | Host Bus Width (8 or 16 bit) | I |
| HMOD0-1 | Host Interface Mode | I |
| HCS\ | Host Chip Select | I |
| I/O Control Signals: | | |
| HWR\ | Host Write | I |
| HRD\ /HOE | Host Read / Output Enable | I/O |
| HWAIT\ / HAL2 | Host Wait / Address Latch Signal 2 | O |
| HDREQ / HAL1 | Host Data Request for DMA / Address Latch Signal 1 | O |
| HDACK\ | Host data acknowledge for DMA | I |
| HEOD\ | Host DMA end of data | I |
| HIRQ | Host Interrupt Request | O |
| HIACK | Host Interrupt Acknowledge | I |

The mode control signals and I/O control signals are herein collectively called the host control signal bus.

As shown in FIGS. 4B and 4D, the host bus interface 3075 provides connections between the host and the following DSP registers, including the 24-bit data registers hi 3042, ho 3044, the 18-bit host pointer register hp 3024, host interface status registers hstr0 3013 and hstr1 3015, and host control register hctr 3011. The host bus interface 3075 is enabled only when a decoder 3076 (external to the DSP) detects that the most significant bits on the host address (on host address lines more significant than HA3) match a predefined or preassigned value and generates an enabled host chip select signal HCS on the DSP's HCS\ input pin.

Since the host data bus 1122 provides only 8 or 16-bit data, the DMAC's host interface registers ho 3044, hi 3042 and hp 3024 are not addressed in one piece, but in 8-bit or 16-bit segments. The HBW signal from the host CPU 1200 specifies whether the host data bus HD is 8 bits wide or 16 bits wide. The 4-bit host address bus interface enables the host to directly address up to sixteen 8-bit DSP registers. All other DSP registers and memory resources are accessed by the host computer by specifying the register or memory address in the hp register 3024 and then performing data transfers through the DMAC's hi and ho registers.

Broadly speaking, the addressable registers in the DMAC consist of 8-bit or 16-bit register segments of the 24-bit host pointer register hp 3024, host input register hi 3042 and the host output register ho 3044. The other registers directly addressable by the host computer are the host control and status registers hctr 3011, hstr0 3013 and hstr1 0315. These registers are directly connected to the 8-bit or 16-bit host data bus and are addressable via the four-bit host address lines. Table 5 shows how the addresses HA0-3 correspond to the registers where HD is 8-bits (i.e., when the registers are accessed 8-bits at a time). Table 6 shows how the addresses HA0-3 correspond to the registers where the HD is 16-bits (i.e., when the registers are accessed 16-bits are a time).

TABLE 5

Registers Directly Accessed From Host Using 8-bit Host Data Bus

| HA3 | HA2 | HA1 | HA0 | Register | Content |
|---|---|---|---|---|---|
| 0 | 0 | 0 | 0 | hp0 | host pointing register 0 (b7–0) |
| 0 | 0 | 0 | 1 | hp1 | host pointing register 1 (b15–8) |
| 0 | 0 | 1 | 0 | hp2 | host pointing register 2 (b17,16) |
| 0 | 0 | 1 | 1 | reserved | |
| 0 | 1 | 0 | 0 | hi0 | host input register 0 (b7–0) |
| 0 | 1 | 0 | 1 | hi1 | host input register 1 (b15–8) |
| 0 | 1 | 1 | 0 | hi2 | host input register 2 (b23–16) |
| 0 | 1 | 1 | 1 | reserved | |
| 1 | 0 | 0 | 0 | ho0 | host output register 0 (b7–0) |
| 1 | 0 | 0 | 1 | ho1 | host output register 1 (b15–8) |
| 1 | 0 | 1 | 0 | ho2 | host output register 2 (b23–16) |
| 1 | 0 | 1 | 1 | reserved | |
| 1 | 1 | 0 | 0 | hctr | host control register 0 |
| 1 | 1 | 0 | 1 | hstr0 | host status register 1 |
| 1 | 1 | 1 | 0 | hstr1 | host status register 2 |
| 1 | 1 | 1 | 1 | reserved | |

TABLE 6

Registers Directly Accessed From Host Using 16-bit Host Data Bus

| HA3 | HA2 | HA1 | HA0 | Register | Content |
|---|---|---|---|---|---|
| 0 | 0 | 0 | 0 | hpL | host pointing register 0 (b15–0) |
| 0 | 0 | 0 | 1 | reserved | |
| 0 | 0 | 1 | 0 | hp2 | host pointing register 2 (b17,16) |
| 0 | 0 | 1 | 1 | reserved | |
| 0 | 1 | 0 | 0 | hiL | host input register 0 (b15–0) |
| 0 | 1 | 0 | 1 | reserved | |
| 0 | 1 | 1 | 0 | hi2 | host input register 2 (b23–16) |
| 0 | 1 | 1 | 1 | reserved | |
| 1 | 0 | 0 | 0 | hoL | host output register 0 (b15–0) |
| 1 | 0 | 0 | 1 | reserved | |
| 1 | 0 | 1 | 0 | ho2 | host output register 2 (b23–16) |
| 1 | 0 | 1 | 1 | reserved | |
| 1 | 1 | 0 | 0 | hctr | host control register 0 |
| 1 | 1 | 0 | 1 | hstr0 | host status register 1 |
| 1 | 1 | 1 | 0 | hstr1 | host status register 2 |
| 1 | 1 | 1 | 1 | reserved | |

The DSP 1100 of the present invention dedicates several external pins to the host interface. These pins are shown in Table 4. The state of some of these pins is tied to flags in host registers str0, str1, and hctr.

Broadly speaking, host data transfers are similar to the local data transfers described above in that they consist of a source data load then a destination data write. They differ from the other transfers in that either the source or destination is external to the DSP, which means that the DMA Bus is only used for one half of the transfer. For example, to write to DSP memory, the host CPU 1200 writes the destination memory address to the host pointer register hp 3024 and the input data to the host input data register hi 3042. To read from DSP memory, the host writes the destination memory address to the host pointer register hp 3024 and the DSP puts the output data in the host output data register ho 3044 to be read by the host.

There are two types of host data transfers. Host pointer register hp 3024 is where the host writes the address of the source or destination of data to be written or read by the host. The DMAC provides two registers connected to the host data interface hi 3042 and ho 3044, the host input and output registers respectively. Using the two busses and the these three registers, the DMAC supports two types of host data transfers. One is an independent read/write by the RDP/WRP host command controlled by the DMAC. The other is a continuous host DMA transfer controlled by a host DMA controller.

Table 7 lists the set of host commands that can be directed to the DMAC by a host computer in the preferred embodiment. The host computer writes host commands into the host control register hctr 3011.

TABLE 7

HOST COMMANDS

| Code | Command | Operation | Accepting Modes |
|---|---|---|---|
| 0000 | NOP | No Operation | Run, Sleep |
| 0001 | SLEEP | Set DSP to Sleep Mode | Run, Sleep |
| 0010 | SSBY | Set DSP to Software Standby Mode | Run, Sleep |
| 0011 | reserved | none | |
| 0100 | RUN | Set DSP to Run Mode (ignored in Run Mode) | Sleep |
| 0101 | Step | Execute One Program Step (ignored in Run Mode) | Sleep |
| 0110 | reserved | none | |
| 0111 | RDP | ho = *hp   (Read DSP) | Run, Sleep |
| 1000 | WRP | *hp = hi   (Write DSP) | Run, Sleep |
| 1001 | reserved | | |
| 1010 | reserved | | |
| 1011 | GRES | General Reset: Set DSP to RST Mode | Run, Sleep |
| 1100 | DMACR | Set to DMA cycle Steal Read Mode | Run, Sleep |
| 1101 | DMACW | Set to DMA cycle Steal Write Mode | Run, Sleep |
| 1110 | DMABR | Set to DMA Burst Read Mode | Run, Sleep |
| 1111 | DMABW | Set to DMA Burst Write Mode | Run, Sleep |

The independent host read/write operations allows random access to any location in the DSP including the external memory connected to the DSP's parallel interface. This is useful for modifying a small portion of data or set control functions of the DSP and its peripherals. On the other hand, DMA transfers provide an efficient way to transfer relatively large amounts of data.

Where DSP chip memory-mapped resources are the destination or source of a host data transfer, both data transfer operations are executed as interrupts to the DMAC. The host interrupt is treated as a peripheral interrupt, discussed above. Note that the host data input full interrupt, DIF, is the second-highest priority interrupt, and that the data output empty interrupt, DOE, has third priority. Thus, host interrupts are handled in preference to peripheral interrupts. As with other local data transfers, all accesses by the host go through the parallel arbiter 2100, which, when necessary (where there is a page access conflict), steal DSP core cycles to access memory. When there is no memory access conflict, even slow host data transfers can be executed in the background without slowing DSP core operation.

Where the source or destination for the transfer is a DSP core register, DMAC issues RDP (read DSP) or WRP (write DSP) commands to the DSP common decoder. These commands are then executed by the DSP core as regular register-register move operations. The host RDP/WRP commands are discussed below.

Read/Write by RDP/WRD Host Commands

FIGS. 12A and 12B show the host read and write procedures for an 8-bit host data bus, and FIGS. 13A and 13B show the host read and write procedures for a 16-bit host data bus respectively.

In the case of an 8-bit host data bus, the host must access the DSP three times to read/write 24 bit data and to set 18-bit pointer data through 8-bit data bus HD0-7. Therefore, a total of 7 host accesses are required to implement this procedure (three to transfer data, three to transfer pointer, and one for WRP/RDP command. In the case of a 16-bit host data bus, the host must access the DSP twice to read/write 24 bit data and to set 18-bit pointer data through 16-bit HD0-16. Therefore, a total of 5 host accesses are required to implement this procedure (two to transfer data, two to transfer pointer, and one for WRP/RDP command).

To read from DSP memory or peripherals, the host first writes the 18-bit memory source address directly to the host pointer register hp 3024 (when using an 8-bit host data bus, the hp registers is accesses as registers hp2, hp1, and hp0; when a 16-bit host data bus is used, the hp register is accessed as registers hp2 and hpL). The host then issues the RDP command by writing the RDP command into the host control register hctr 3011 (see FIGS. 4A and 4B), upon which the source data pointed to by the hp register is transferred to the host output register ho 3044.

One bit of host status register 1 hstr1 is the interrupt flag DOEI. The DOE1 interrupt flags is set after the RDP host command is fetched by the DSP and interrupt signal DOE (host data output empty) is sent to the DMAC interrupt controller. After the DMAC interrupt controller accepts the interrupt, interrupt acknowledge signal DACK is sent back to the DMAC 3000, which clears DOEI. The DOE interrupt has priority level 3 (see Table 3).

Finally, the host can read the data from register ho either 8-bits at a time from ho2, ho1, and ho0, or in two reads from ho2 and hoL.

When the host writes data into the DSP, first host 1200 writes the 18-bit destination address directly to pointing register hp 3024 (when 8-bit host data, hp is hp2,1,0; when 16-bit host data, hp is hp2,L). Then, the host writes the data into the host input registers hi2,1,0 (8-bit host) or hi2,L (16-bit host). The host then writes the host command WRP to the host control register hctr 3011. This command transfers the contents of hi 3042 into the destination pointed by hp 3024.

The DMAC interrupt flag DIFI (in register hstr1) is set by the DMAC after the WRP host command fetch and interrupt signal DIF is sent to the DSP interrupt controller. The DSP interrupt controller 2600 acknowledges the interrupt by sending a DACK signal to the DMAC 3000, which then clears the DIFI flag.

Figure 14A:
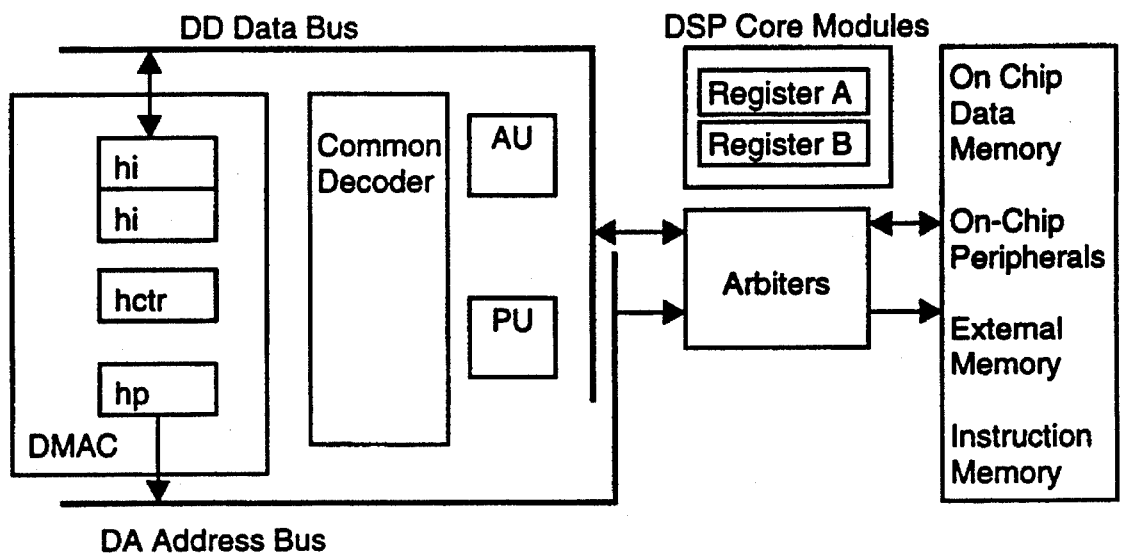
FIGS. 14A and 14B depict data paths by which a host CPU accesses DSP resources.
Figure 14B:
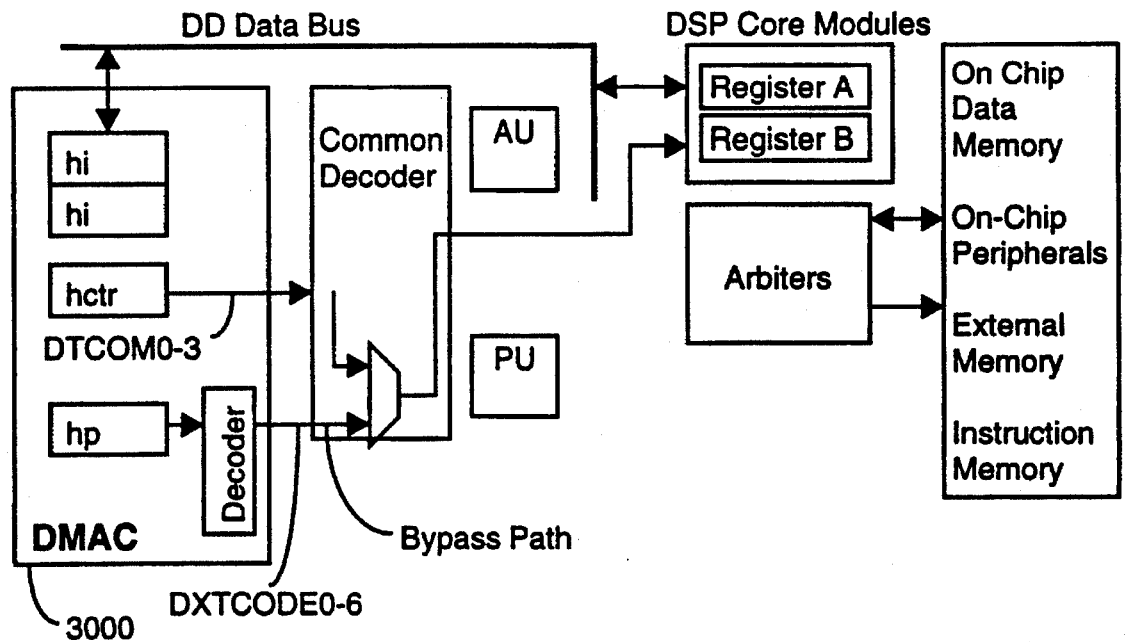

FIGS. 14A and 14B show the various data paths by which the host 1200 accesses DSP resources. Where the transfer is between the host input and output registers hi 3042 and ho 3044, and DSP memories (on-chip data/instruction memories 1900 and 1400, memory mapped peripherals 2300, or external memory 2500), the transfer is implemented over the DA 1112 and DD 1106 busses and is executed as a DMAC 3000 interrupt.

FIG. 14B shows the data transfer between host input/output registers hi and ho and DSP Core 3500 registers. When the host address pointer hp holds the address of a DSP core register, which is not accessible from the DMA busses DA and DD, the DMAC does not perform an interrupt data transfer. Rather, the DMAC sends to the common decoder 1600 the RDP/WRP host command through the DTCOM0-3 signal line and the 7-bit DSP Core register code through the DTXCODE0-6 line. (See FIG. 4C.) The common decoder 1600 executes this data transfer as a register-register move operation.

Read/Write from/to Memories using RDP/WRP

Host data transfers to memories or peripherals can be executed while the DSP is in HALT or RUN mode. The DMAC is placed in HALT mode when there is no data transfer activity. The DMAC is in RUN mode when there are on-going data transfers.

Figure 15:
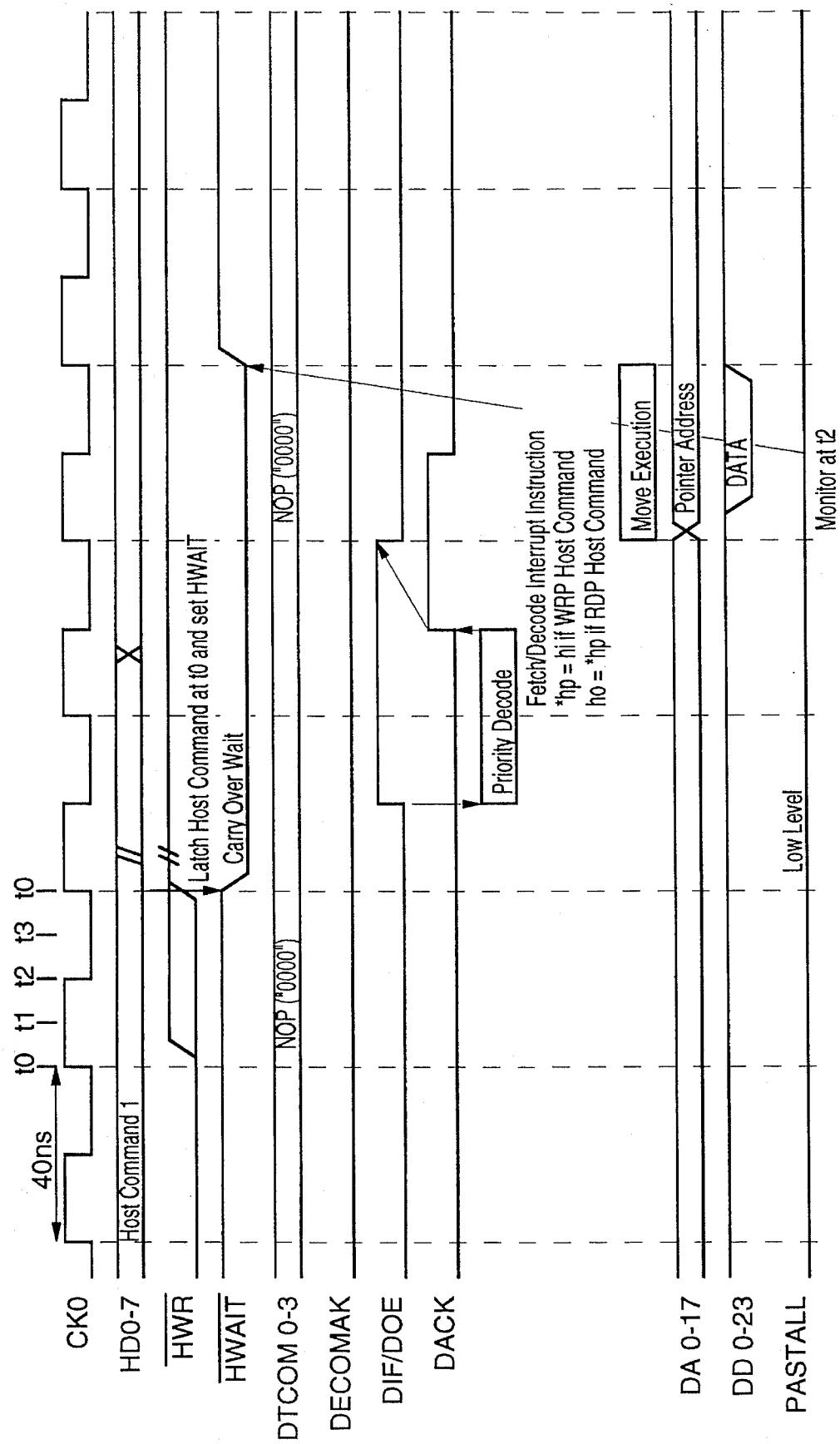
FIG. 15 is a timing diagram for execution of the host RDP/WRP commands when the DMAC is in HALT mode and no wait is required to access the addressed resource.

FIG. 15 shows the execution timing for the host RDP/WRP commands when the DMAC is in HALT mode (where there is no delay). This kind of transfer is possible during both DSP RUN and DSP SLEEP modes.

In the cycle after the host command is latched, the DMAC input register full interrupt DIF (for the WRP command) or output register empty interrupt DOE (for the RDP command) is issued to the DMAC interrupt controller. As soon as the DMAC interrupt controller 3022 receives the interrupt, it decodes the priority, using the prioritization scheme shown in Table 3. When the interrupt is accepted, the interrupt controller 3022 sends back interrupt acknowledge DACK and the DIF/DOE flag is cleared. At the same time, the interrupt instructions corresponding to the host command are decoded and executed. If the host command is WRP, *hp=hi is fetched and decoded. If the command is RDP, ho=*hp is fetched and decoded. These instructions are executed in the following cycle. The address is issued on the DMA address bus DA 1112, then the data is transferred through DMA data bus DD 1106.

The PASTALL signal from the parallel arbiter is monitored at time t2 during this data transfer execution cycle. If it is low (meaning the memory access can proceed), the carry over HWAIT signal to the host is released so that the host knows that the WRP/RDP has been executed.

Figure 16:
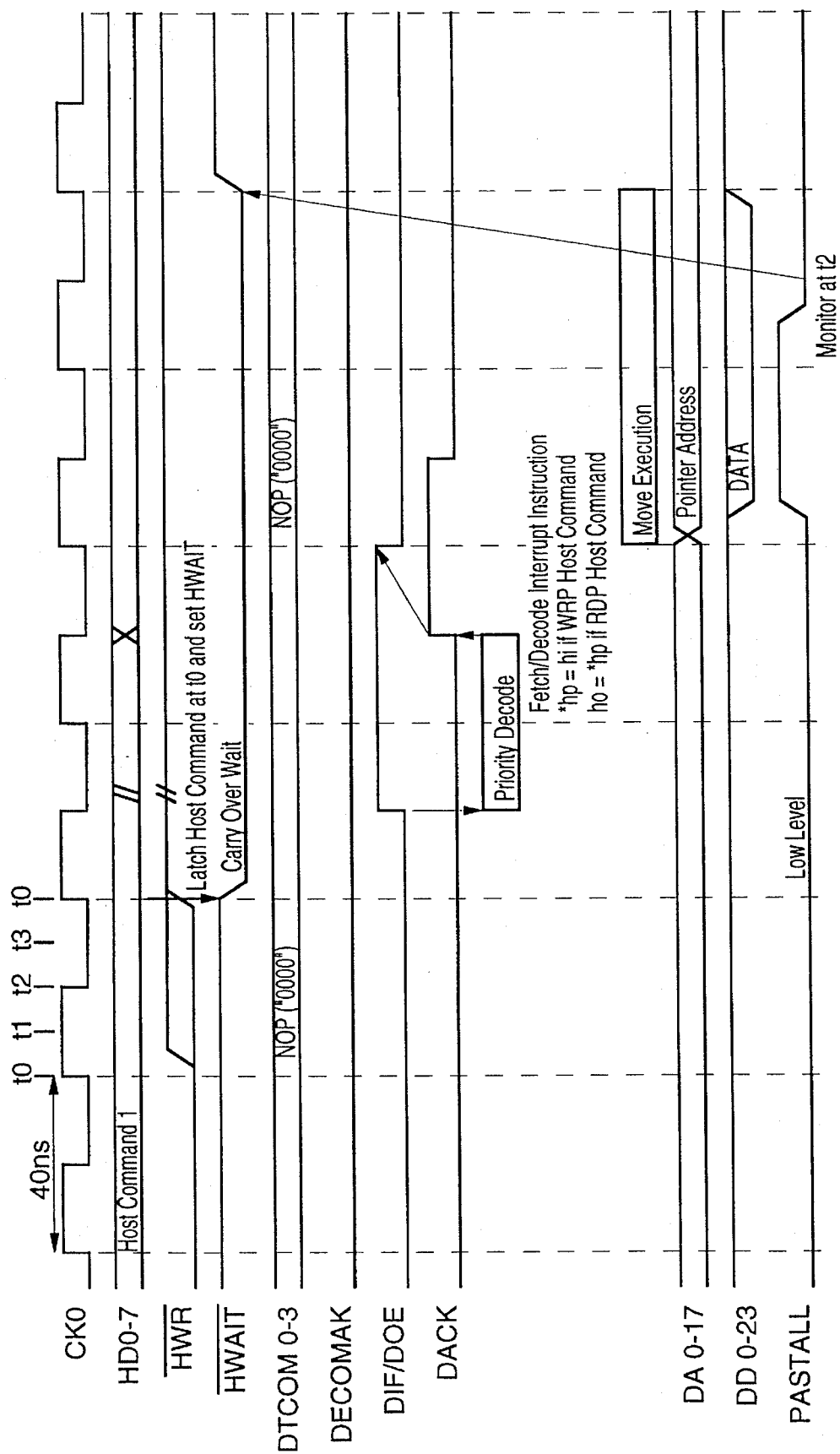
FIG. 16 is a timing diagram for execution of the host RDP/WRP commands when the DMAC is in HALT mode and a one cycle wait is required to access the addressed resource.

FIG. 16 shows the execution timing for the host RDP/WRP command when the DMAC is in HALT mode and a one-cycle wait is required to access the addressed location. In this case, the stall signal PASTALL from the parallel arbiter 2100 is set in the first data transfer execution cycle and reset after one cycle. As long as this stall signal is set, writing data from the DD bus to the destination is suspended. The release of the carry over HWAIT signal is delayed by one cycle compared with the no wait example.

Figure 17:
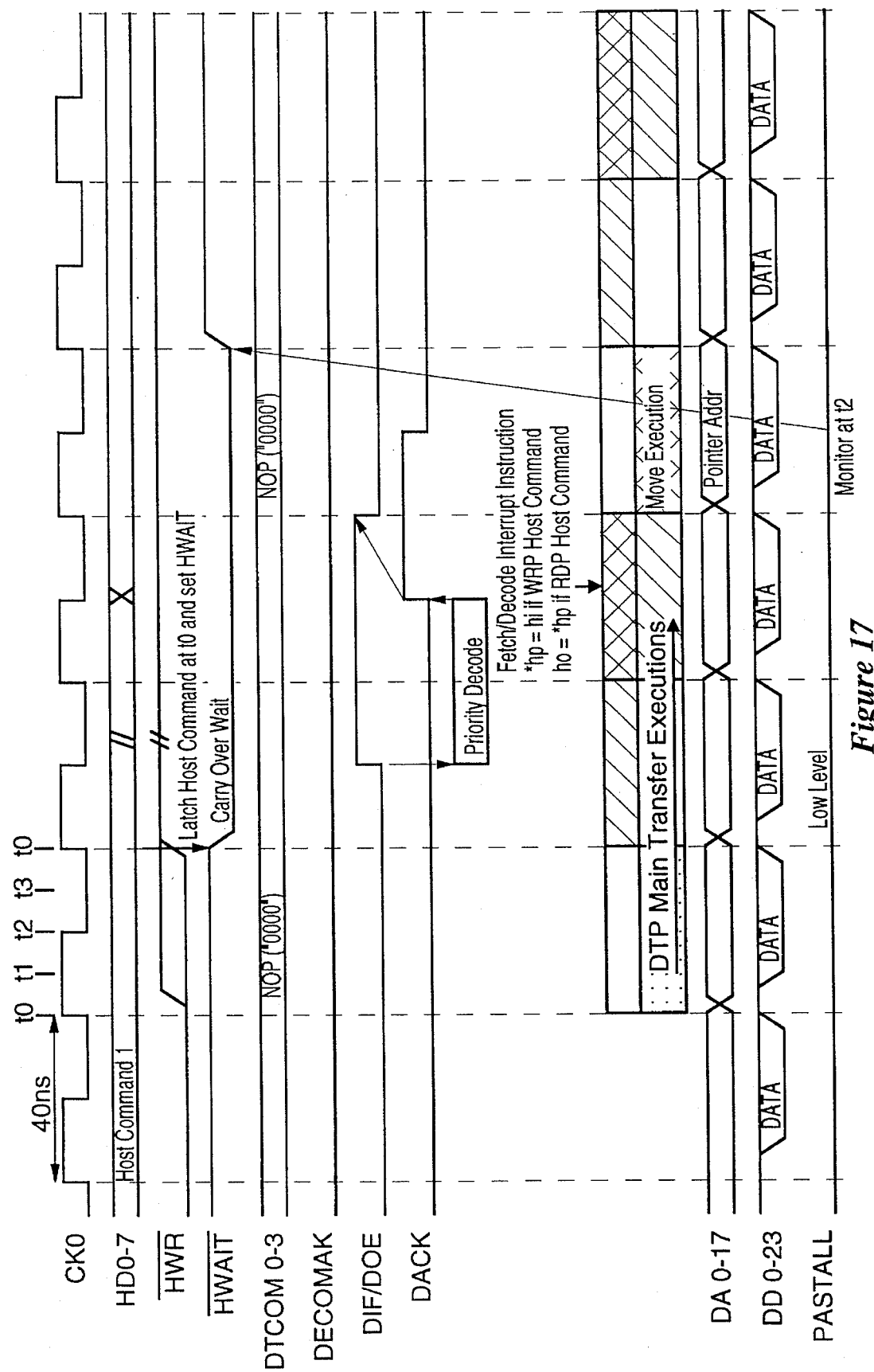
FIG. 17 is a timing diagram for execution of the host RDP/WRP commands when the DMAC is in RUN mode and no wait is required to access the addressed resource.

FIG. 17 shows the execution timing for a host RDP/WRP command when the DMAC is in RUN mode (i.e., when DMAC is running a local data transfer) and no wait is required for read/write access the addressed location (i.e., there is no memory access conflict and the addressed location is accessible in one cycle). This execution timing applies in both DSP Core RUN and SLEEP modes. The host RDP/WRP interrupt sequence steals access cycles from the DMAC main data transfer cycles. The interrupt is accepted only after the current DMAC data transfer has been completed (load to dr 3046 then store from dr 3046).

Read/Write from/to DSP Core Registers using RDP/WRP

Figure 18:
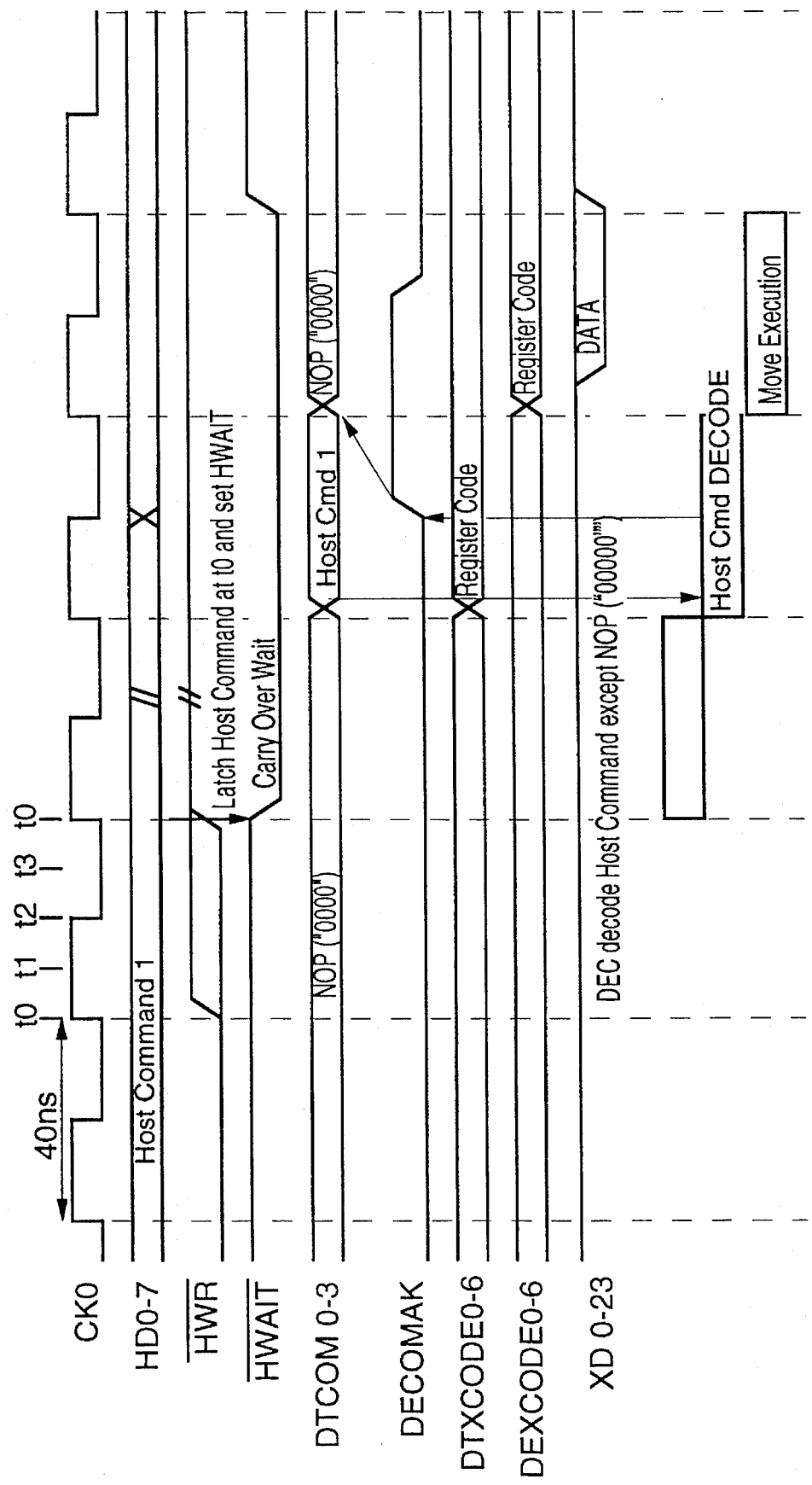
FIG. 18 is a timing diagram for execution of a core register access by the host processor.

FIG. 18 shows the execution timing for the host RDP/WRP command when the DMAC is in SLEEP mode and the location being accessed by the host is a DSP Core register. This kind of transfer is possible when the DSP Core is in RUN or SLEEP modes.

Host address pointer hp 3024 holds the memory mapped address of the DSP Core register. This address is decoded in the cycle after the host command is latched. In the next cycle, DMAC sends to the common decoder 1600 the RDP/WRP host command through the DTCOM0-3 signal lines and the 7-bit register code through the DTXCODE0-6 lines. The common decoder decodes the host command as soon as it is received and executes the data transfer as a register-register move operation.

Figure 19A:
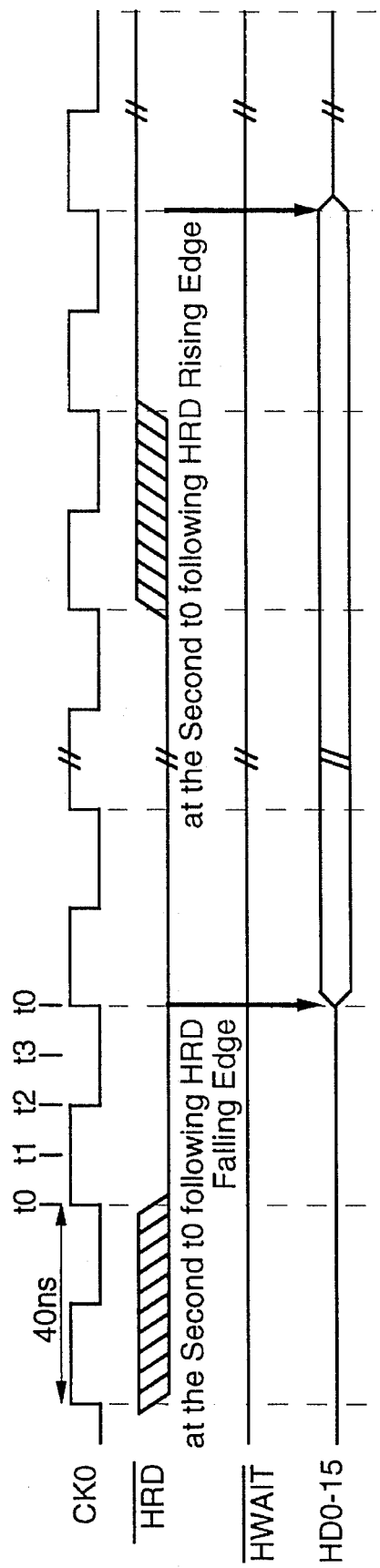
FIGS. 19A and 19B shows the execution timing for the host reading and writing data from and to the DMAC registers in the DMAC's host interface.

FIG. 19A shows the execution timing for the host computer directly accessing host interface registers in the DMAC. The registers accessible in this fashion are shown in FIG. 4B. For the registers that are directly accessible to the host computer, the data in the accessed register is asserted directly on the host data bus HD0-15 at time t0 of the second DSP instruction cycle following the HRD falling edge. After detecting the rising edge of HRD, the data bus HD0-15 is tri-stated in at time t0 of the second DSP cycle following the de-assertion of the HRD signal. During this sequence, the wait pin HWAIT is kept high. No wait state is required here.

Figure 19B:
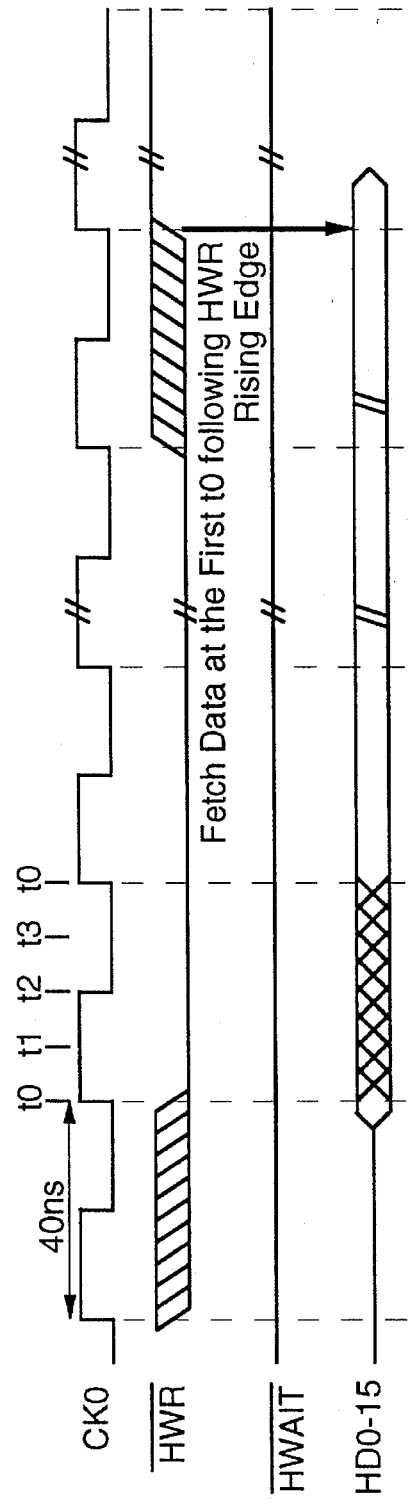

FIG. 19B shows the execution timing for the host computer write sequence to host interface registers, not including hctr. (Note that writing to the host control register hctr causes the DMAC to execute whatever command is written into that register, after which hctr is automatically cleared by the DMAC host interface control block.) In phase t0 of the DSP cycle following the HWR rising edge, the data on the host data bus HD0-15 is stored into onto the destination register specified by the signals on the host address bus HA0-3. During this sequence, the wait pin HWAIT is kept high. No wait state is required here.

Referring to FIG. 4D, it is further noted that the DSP can send an interrupt request to the host computer by setting bit flag register hrq 3017, which causes an HIRQ signal to be sent to the host computer. When the host sends back an HIACK signal, the bit flag register hrq 3017 is cleared by the DMAC Host DMA Transfers Between Host Memory and DSP Host DMA is used as a high speed data transfer method between host memory 1204 and the DSP. Both data and instructions can be transferred to the DSP using host DMA transfers. Therefore, large application programs or data can be down loaded from the host memory, host hard disks, floppy disks or communication networks. Using its own DMA controller 1202 (see FIG. 4D), the host 1200 can access not only DSP on-chip memories and registers, but also DSP external memory 2500. Host DMA can be performed in two modes, cycle steal mode, where the DSP steals memory access cycles from the host, and burst mode, where the DSP captures the host during the transfer.

Figure 20:
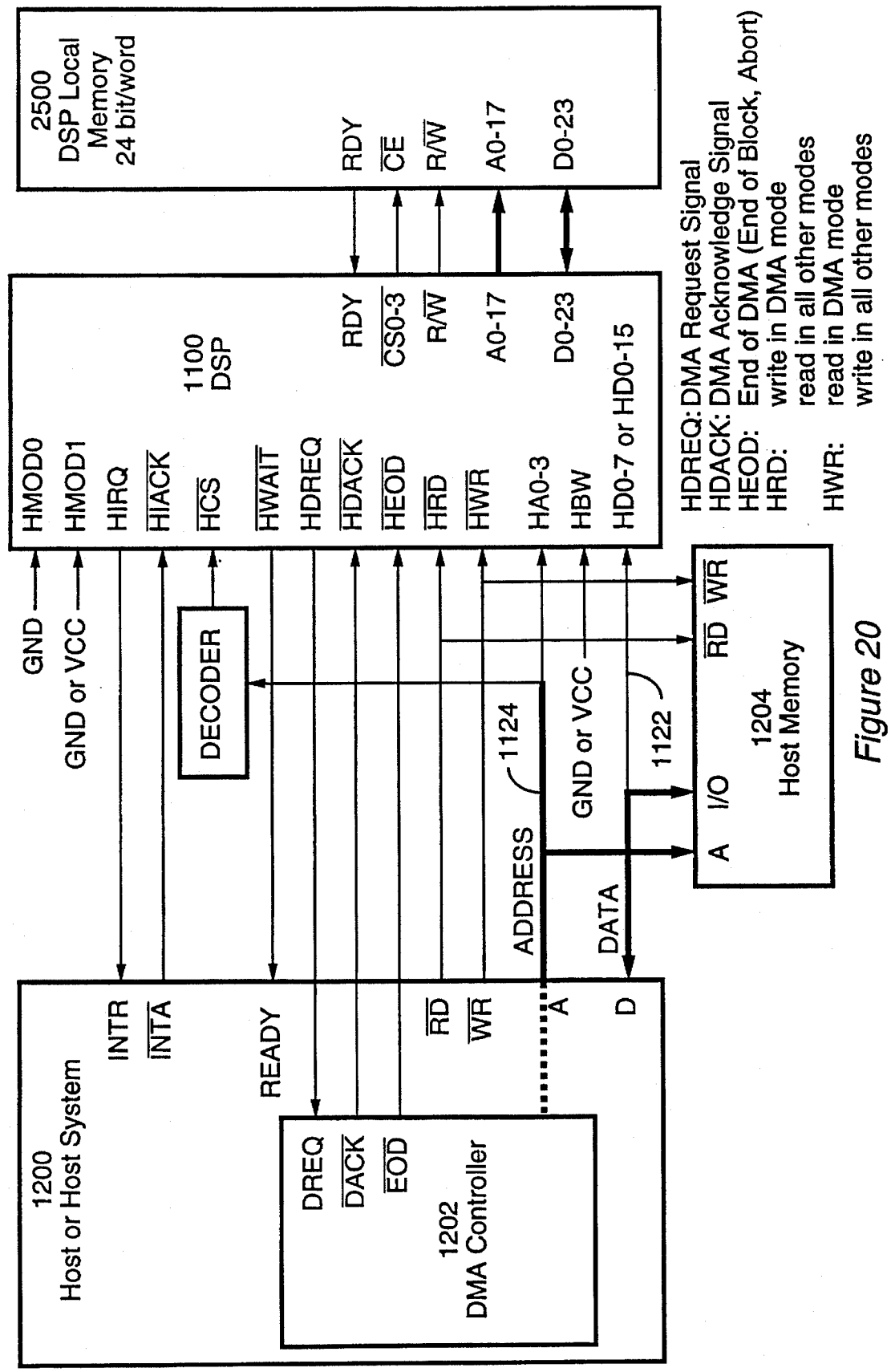
FIG. 20 is a block diagram of a host computer with a host DMA controller coupled to the DSP of the present invention.

FIG. 20 shows a host computer with its own DMA controller connected to the DSP of the present invention. The Host DMAC 1202 can either reside within the host 1200 or be connected outside the host 1200. The DSP's host data bus HD0–7 (when host bus width signal HBW=0) or HD0–15 (when HBW=1) is connected to a corresponding portion of the host's own data bus, either bits 0–7 or bits 0–15. Rather than issuing addresses to the DMAC via the address bus, the host issues addresses to the DSP via the host pointer register hp 3024. During a host DMA transfer, the host increments the value in hp 3024 after every three transfers (if HBW=0) or every two transfers (if HBW=1), which corresponds to the number of transfers required to write to the 24-bit DSP registers.

Host DMA transfers are controlled through the handshake signals, HDREQ, HDACK and HEOD. In the cycle steal data transfer, the DMAC requests the next data by setting the HDREQ signal. The host DMA controller then issues the HDACK signal to the DSP acknowledging the request. In the burst transfer mode, HDREQ is held high during the transaction. The falling edge of HDACK initiates the data move within the DSP. When all data transfer transactions are complete, the host DMA controller 1202 issues the end of data signal HEOD.

Figure 21:
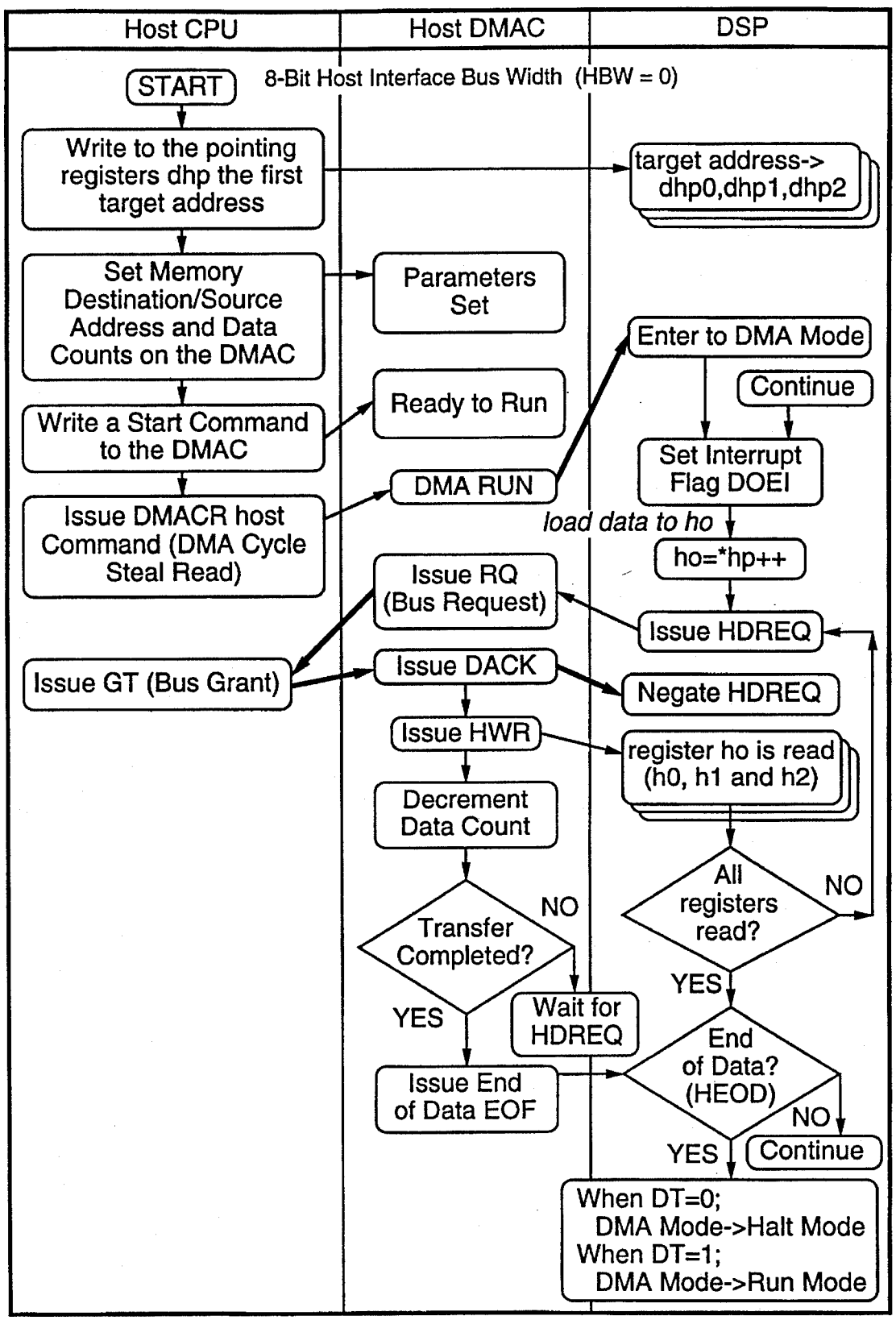
FIG. 21 is a flow chart of the host DMA procedure for a cycle steal mode DMA read operation using an 8-bit host bus.

FIG. 21 shows the DMA procedure in the case of a cycle steal DMA read where the host bus is 8-bit. The host first writes the starting address for the DMA transfer to the DSP pointer registers. The host also sends the destination or source address of the host memory location and the DMA transfer counts to the host DMAC 1202. The host then writes a start command into the host DMAC, after which the DMAC is ready to commence the transfer upon receipt of the HDREQ signal from the DSP.

Upon receiving the HDREQ signal, the host issues the DMACR (DMA cycle steal read) host command to the DSP. This causes the DMA mode flags DM1 and DM0 in the hstr0 register 3013 to be set to a value of "0,0" (See FIG. 4F). The memory/register contents pointed to by the pointer register hp 3024 is moved to the output register ho 3044. After this transfer the DSP's DMAC increments the contents of hp 3024.

In the case of cycle steal DMA mode, after each such transfer is completed, the DSP sends data transfer request signal HDREQ to the host DMAC 1202. Note that where the operation is a DMA write, no data is transferred before HDREQ is sent to the host DMAC.

The host DMAC 1202 receives the HDREQ signal and issues a bus request RQ to the host. After the host grants the bus utilization, the host DMAC 1202 sends the acknowledge signal HDACK to the DSP. Following its receipt of the HDACK signal, the DSP negates the HDREQ signal, signalling the host 1200 that the data in register ho 3044 is ready for reading. The host DMAC then issues the HWR signal, causing the contents of the ho register to written into the host memory 1204. Note that the meanings of the HRD and HWR signals in the DSP are interchanged for the host DMA mode. This is because the host memory 1204 and DSP 1100 are connected to the same HRD and HWR lines, but only one of them can be the transmitter and the other the receiver. Thus, in host DMA mode, the HWR command causes the data in the ho register to be read and asserted on the host data bus HD, while the HRD command causes the data on the host data bus HD to be written into the hi register.

In the case of a host DMA write in cycle steal mode, once data is sent to the input register hi 3042, the DSP moves the contents of hi to the destination pointed by hp 3024 and then increments the pointer stored in hp 3024. In particular the DMA's host interface sets the HIF flag once the host has written data into hi 3042, which causes an interrupt to be sent to the DMAC sequencer.

These host DMA operations are executed as an interrupt to the DMAC. A read interrupt is generated when the host computer setting the DOEI flag in hstr1 3015 (which the host computer has direct access to, as indicated in Table 5), which causes a corresponding interrupt to be sent to the DMAC's interrupt controller; a write interrupt is generated when the host computer sets the DIFI flag in hstr1, after the host supplied data has been stored by the host computer in the input register hi, causing a corresponding interrupt to be sent to the DMAC's interrupt controller. The interrupt program executed by the DMAC sequencer is "*hp++=hi" for write and "ho=*hp++" for read. As explained above, when the host data bus is an 8-bit bus, the host computer must perform three accesses to set the 18-bit host pointer register hp 3024 and three accesses to read/write the ho/hi host data registers. When the host data bus is 16-bits wide, two accesses are required for each of those operations.

Figure 22:
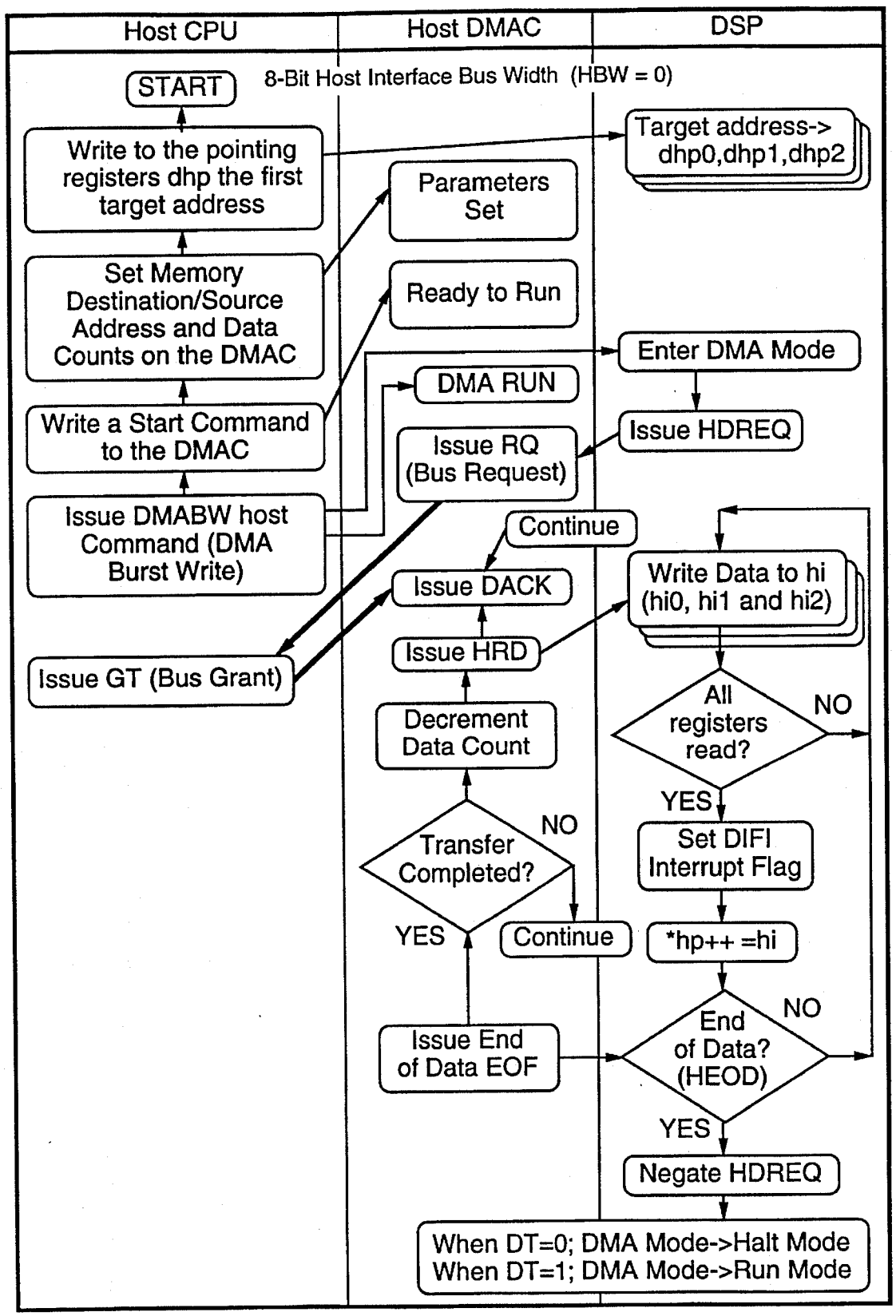
FIG. 22 is a flow chart of the host DMA procedure for a burst mode DMA write operation using an 8-bit host bus.

Referring to FIG. 22, host Burst DMA transfers are similar to the cycle steal data transfers except that Host burst transfers issue only one interrupt to the DSP, either a DOE (signifying a host read) or a DIF (signifying a host write), then transfer data continuously until the end of the data is reached. In contrast, cycle steal mode DMA transfers require interrupting the DSP before every word transferred. Burst mode transfers are implemented by the DSP holding the HREQ pin high during the DMA transaction and each data move is initiated at the falling edge of the HDACK signal. Further, the DMAC 300 does not decrement an internal count register for host burst DMA transfers. Rather, the host computer or the host computer's DMA maintains a counter and sends the DMAC an end of data signal HEOD on the HEOD\ pin after the last data word has been transferred.

All host DMA transactions have similar execution timing. After the DMACR or DMABR host commands, the DSP performs a data move and issues the HDREQ signal. This is implemented by issuing an interrupt DOE to the DMAC interrupt controller and executing the interrupt program "ho=*hp++." For the first transfer, DMACR and DMABR host commands initiate the interrupts (set DOEI interrupt flag). For the following data transfer, the interrupt is initiated when all ho registers (ho2, ho1, ho0 or hoL, ho0) are read by the host (or host DMAC). This DMAC interrupt steals one cycle from the local DMA access operation if DMAC is running. No extra hardware is required for this DMA data transfer.

In case of a host DMA write, the HREQ signal is asserted after the DMACW or DMABW host commands. The data transfer "*hp++=hi" is performed after all the host input registers hi (hi2, 1, 0 or hiL, 0) have been written.

DSP BOOT UP

The RST\ pin is normally connected to a power up reset circuit, to a watchdog circuit, to an external host processor, and/or to a manual switch, for generating a RST pulse on the RST\ pin. A reset pulse on the RST\ causes the DSP to reset itself, to test the HMOD<0,1> pins, and to then perform one or more reset actions based on the settings of the HMOD<0, 1> pins.

The present invention provides two DSP boot up modes, local or host. The boot up mode is controlled by the HMOD0-1 signals. To boot from a host computer when no ROM is connected to the parallel interface of the DSP, the external pin HMOD<0,1> signals are set to "1 0". Whenever the RST pin is set with the HMOD<0,1> signals set to host boot up mode, the DSP resets all its registers and waits in sleep mode. The host down loads interrupt vectors and a reset routine program into the on-chip instruction memory or the DSP's external memory using either WRP commands or a burst mode continuous DMA transfer. Then a control flag is set in the DSP to indicate the location of the 64 interrupt vector words (i.e., on chip or off chip). Finally the host issues the GRES (general reset) command to start operation of the DSP. Typically, the host will also download additional programs and data into the DSP's internal and external memories before issuing the GRES command, although the additional programs could be loaded after issuing the GRES command.

Local Boot Mode

Local boot mode is used when the interrupt vectors reside in either the on-chip instruction memory or in the local external memory connected to the parallel interface. Local mode is selected by setting the host mode signal HMOD<0, 1> to "0, 0." When the RST signal is set, the DSP resets all its registers and immediately jumps to the RST vector location to begin the reset routine.

Stand-alone Boot Mode Using ROM Connected to Host Interface

When no host is connected to the DSP, the DSP can be booted up from a ROM connected to the parallel interface or from a byte-structured ROM connected to the host interface. The latter configuration is the especially useful for the following reasons:

1) One ROM of 8 Mb (1Mword×8-bit) or more is enough to hold all DSP data and programs (which will not exceed 26 Kwords×24-bit=6.114 Mb). However, three 8 Mb ROMs would be required to load the DSP at the 24-bit parallel port as the maximum word length of a ROM is 8-bits.

2) Removing the boot ROM from the parallel interface reduces loading of the parallel external memory, making non-wait accesses to external random access memory easier to achieve.

Figure 23:
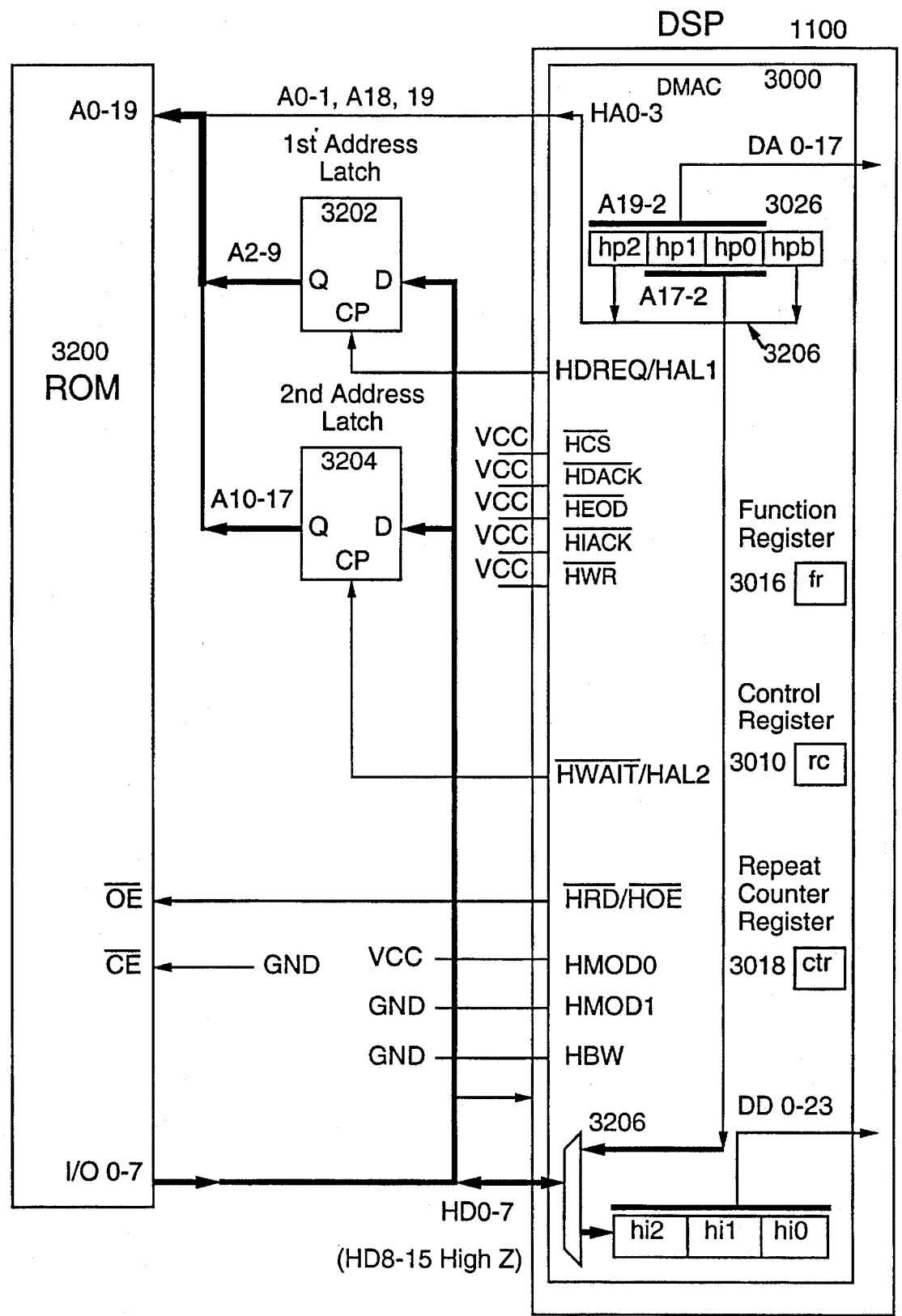
FIG. 23 is a block diagram of a boot ROM coupled to the DSP of the present invention for use in the stand-alone byte boot mode.

FIG. 23 shows the connection of the host interface to the ROM. To set the host interface to this mode, the mode control pin HMOD<0,1> is set to a value of "1,0". In this mode the HCS, HDACK, HEOD, HIACK, and HWR pins should all be pulled high (to VCC). HBW pin should be connected to 0, signifying that the host interface will be used to receive 8-bit host data.

Note that the host boot function requires that the 24-bit DSP 1100, which normally uses 18-bit addresses, to be loadable from an 8-bit ROM having 20-bit addresses. This requires two accommodations so that the DSP and the ROM can effectively communicate. First, in order to write the 24-bit words required by the DSP, 8-bit ROM data from three contiguous memory locations are sequentially written into the hi2, hi1, and hi0 registers which comprise the host input register. This requires three cycles. Second, to be able to address the ROM's 20-bit address space, the DSP employs an additional 2-bit host pointer base counter hpb 3026 (see also FIG. 4C), and employs external latches 3202, 3204 so that the 20-bit addresses can be provided over the 8-bit host data bus HD0-7 and the 4-bit host address bus HA0-3.

The host pointer registers hp2, hp1 and hp0 are used to issue addresses to the DSP memory resources (to load the instruction and data memories, for example). To access the byte-structured ROM, an additional 2-bit base pointer register hpb 3026 is concatenated during a stand-alone boot up to the hp pointer registers at their least significant position. This provides the 20 bits required to address the full memory space of the ROM.

While the hpb counter 3026 is incremented from 0 to 2, the least significant byte, the middle byte, and the most significant byte of one 24-bit word are written from the ROM into the host pointer register to the host input register hi. The ROM location for hpb="3" is not used. Therefore, the word address boundaries at the ROM occur in multiples of 4. The long ROM addresses A0-19 are multiplexed with the data at the 8-bit bi-directional host data interface HD0-7. To ensure that all 20 bits of the ROM address A0-9 are provided simultaneously, two latches are provided 3202 and 3204, which respectively latch address bits A2-9 and A10-17. Address bits A2-9/A10-17 are latched by setting the HAL1 and HAL2 external pins, which are connected to the control pin CP of the first and second address latches 3202 and 3204, respectively. Address bits A0-1 and A18-19 are provided directly on host address lines HA0-3 through the bi-directional host address interface 3206 for HA0-3.

Figure 24:
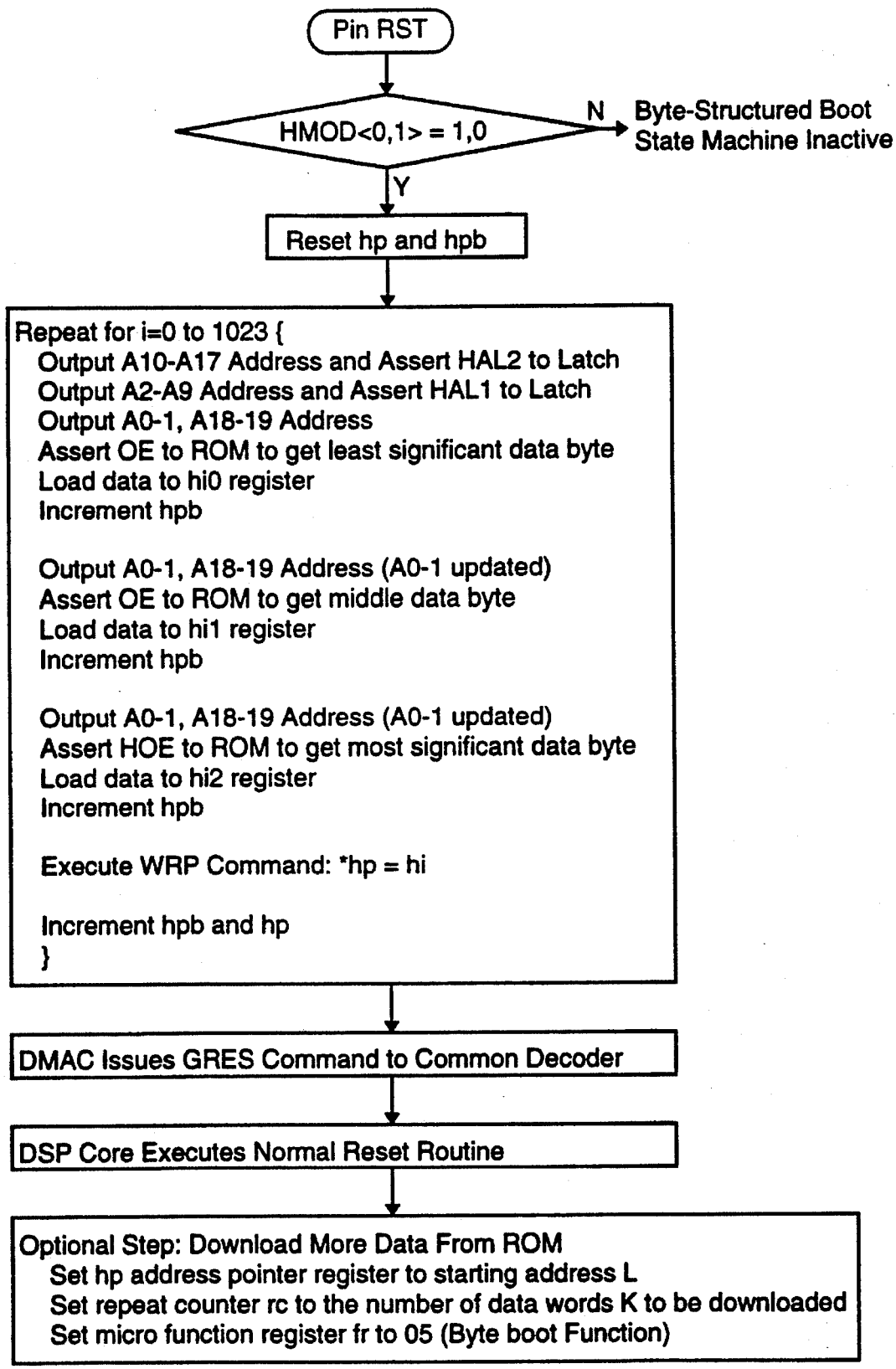
FIG. 24 shows the byte boot sequence for downloading programs and data from a byte structured ROM.

FIG. 24 shows the byte boot sequence for downloading the first 1024 words of the DSP instruction memory from the byte structured ROM. The byte boot operation sequence is initiated by setting the DSP reset pin RST. On the positive edge of the RST signal, if the host mode pins HMOD<0,1> are set to "0 1," the DMAC initiates the byte boot sequence by putting the host in the SLEEP mode (by setting the PSM0-1 flags in the host status register hstr1, as shown in FIG. 4F) to "0 1"), and resetting the host pointer registers hp2,1,0 and hpb to 0×00000 and setting the repeat count register rc to a value of 1023.

It is noted that setting the DSP's mode to "sleep" by storing a value of "0 1" in the PSM0-1 flags disables operation of the DSP core, except for executing one instruction at a time when the host command "Step" is received. Setting the DSP's mode to "software standby" (SSBY) by storing a value of "1 0" in the PSM0-1 flags disables operation of the DSP core 3500 and the DMAC 3000.

As shown in FIG. 4C, the byte boot sequence is controlled by a separate byte-boot sequencer state machine 3080 in the DMAC 3000.

At this point the DMAC initiates the iterative process by which the first 1024 24-bit words of the DSP instruction memory are downloaded in 8-bit words from the ROM. This is accomplished by the following sequence of actions:

(1) outputting the contents of 8-bit host pointer register hp0 through data pins HD0-7 to address latch 1 where they are latched as ROM address bits A2-9 by temporarily asserting HAL1;

(2) outputting the contents of 8-bit host pointer register hp1 through data pins HD0-7 to address latch 2 where they are latched as ROM address bits A10-17 by temporarily asserting HAL2;

(3) outputting the contents of 2-bit host pointer register hp2 and 2-bit host base pointer register hpb onto address pins HA0-3 as, respectively, address bits A18, 19 (where A19 is the most significant bit of the ROM address) and address bits A0,1 (where A0 is the least significant bit of the ROM address), and at the same time outputting the output enable signal HOE to the memory, which causes the ROM to assert the 8-bits at address A0-19 on the host data bus HD0-7.

The first 8 bits input to the DSP through the data pins HD0-7 and are latched into the low order 8-bits of the host input register hi0. This transfer is given a fixed wait of 7 cycles (which, at 40 ns/cycle equates to a 280 ns wait). After this first transfer is finished, the host base pointer register is incremented by "1."

The steps of outputting the hp2 and hpb registers onto the HA0-3 bus lines, asserting HOE, latching in the data on the host data bus and then incrementing hpb are repeated to latch the middle and most significant bytes of the 24-bit instruction word currently into hi1 and hi2 respectively. For these second and third transfers, the address bits A2-19 are retained in the two address latches so that these latches are updated only once for each downloaded 24 bits.

After the three bytes have been downloaded into hi2, hi1, and hi0, the byte boot sequencer stores the hexademical value 3D into the dssr register 3052 in the DMAC transfer controller, which causes the DMAC transfer controller to execute the command *hp++=hi (see FIG. 5C). This command causes the 24-bit data in register hi to be written to the address pointed by the 18-bit host pointer register hp and also causes the hp register to be incremented by 1 after the data transfer is executing. Note that the 2-bit hpb value is not used by the host write command.

Once the 24-bit data transfer has completed, the pointer hpb is incremented for the fourth time, which zeroes the hpb counter (so as to point to the first of the next three 8-bit ROM words to be transferred).

This cycle is repeated until the first 1024 24-bit words have been written to the instruction memory. Once these first 1024 words have been downloaded, the DMAC issues the GRES command to the DSP common decoder (i.e., the DMAC writes code "1 0 1 1" to the 4-bit host command field of the host control register hctr), which causes the program counter to jump to the reset vector location, where it picks up the address of the reset routine (which is typically included in the first 1024 downloaded from the byte-structured boot ROM). Finally, the DSP executes the reset routine.

Referring to the last step in the flow chart of FIG. 24, at this point, it is still possible that more data may need to be downloaded from the ROM, for which eventuality the DMAC provides the programmable byte boot function, which is executed by the byte-boot sequencer state machine 3080 when a value of "5" is loaded into the fr function register 3016. This DMAC function allows a specified number of 24-bit words "K" to be downloaded to the DSP instruction memory starting at any specified destination address "L". In the ROM, the data to be downloaded occupies 4K 8-bit memory words starting at ROM address 4L (this is because the DSP words occur at 4 word intervals in the ROM, three of the four words providing the 24 DSP bits, and the fourth word being unused so that the contents of hp always correspond to ROM address bits A19-2).

In particular, the reset program (which is executed after a general reset of the DSP) invokes the programmable byte boot function by writing the download location start address L to the host pointer register hp. Next, the reset program writes the number of 24-bit words K to be downloaded to the repeat count register rc. Finally, the DSP core under the control of the reset program sets the function register fr to a value of 0x5, the function number of the programmable byte boot operation.

As soon as the function register fr is set to 0x5, the byte boot sequencer 3080 in the DMAC puts the DSP Core in SLEEP mode by issuing the SLEEP host command to the common decoder. While the DSP is halted, the DMAC's byte boot sequencer state machine 3080 proceeds to download the K words starting at ROM source address 4L to DSP destination address L. As with the stand-alone byte boot, the data is stored in the host input register hi and written to the destination pointed by hp. Once the K words are downloaded, the byte boot sequencer 3080 issues the RUN host command (writing this command into the host control register hctr) to the DSP Core and DMAC operation resumes.

Alternate Embodiments

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A single chip digital signal processor (DSP), comprising:

a multiplicity of memory mapped resources, said memory mapped resources including:
  memory locations in a data memory for storing DSP data,
  memory locations in a program memory for storing DSP instructions, and
  a plurality of on-chip peripheral interfaces for interfacing the DSP with peripheral devices external to said DSP;

a DSP core coupled to said data memory and program memory for executing said stored DSP instructions;

a direct memory access (DMA) controller, said DMA controller including a host processor interface for coupling the DSP to a host processor; said DMA controller coupled to said data memory, program memory, DSP core and on-chip peripheral interfaces for performing local data transfers between specified ones of said memory mapped resources and for performing host data transfers between said host processor and said memory mapped resources; and a plurality of data and address bus pairs coupled to said data memory, program memory, DSP core and DMA controller, a first of said data and address bus pairs being dedicated to data transfers controlled by said DMA controller for transferring data between the host processor, said memory mapped resources and said peripheral devices, and a second of said data and address bus pairs dedicated to data transfers controlled by said DSP core for transferring data to and from said DSP core;

said DMA controller including a first set of registers for local data transfers between said memory mapped resources and a second set of registers in said host processor interface for host data transfers; said first set of registers including a data transfer register, an address source register and an address destination register; said second set of registers including a host input register for receiving data from said host processor, a host output register for holding data to be sent to said host processor, a host command register for storing commands received from said host processor, a host pointer register for receiving an address from said host processor wherein said received address specifies one of said memory mapped resources;

said host processor interface including a host address bus and host data bus interface for enabling said host processor to directly access said second set of registers at predefined host address bus addresses; and said DMA controller including a controller for executing said command stored in said host command register, wherein said command stored in said host command register is selected from a predefined set of host commands that include commands for reading and writing any specified one of said memory mapped resources, commands for initiating burst data transfers between said host processor and a set of said memory mapped resources at a sequence of addresses, and commands for initiating cycle stealing data transfers between said host processor and a set of said memory mapped resources at a sequence of addresses wherein each cycle stealing data transfer is interleaved with any local data transfer that said DMA controller is performing.

2. The single chip digital signal processor of claim 1, wherein said DSP includes a control register, coupled to said DSP core and to said host interface, for specifying a mode operation for said DSP core;

said predefined set of host commands further includes a host command for storing any one of predefined plurality of mode control values in said control register, wherein a first one of said predefined mode control values enables execution of said stored DSP instructions by said DSP core and a second one of said predefined mode control values disables execution of said stored DSP instructions by said DSP core.

3. The single chip digital signal processor of claim 2, wherein said predefined plurality of mode control values include a second predefined mode control value that disables execution of said stored DSP instructions by said DSP core and disables said DMA controller from performing data transfers, and a third predefined mode control value that enables normal operation of said DSP core and said DMA controller.

4. The single chip digital signal processor of claim 1, wherein said DMA controller includes a data transfer controller for performing said host data transfers over said first of said data and address bus pairs while said DSP core performs operations using said second of said data and address bus pairs; such that host data transfers can be performed without stopping operation by said DSP core.

5. The single chip digital signal processor of claim 4, further including an arbiter for arbitrating between conflicting accesses to any of said memory mapped resources by said DMA controller via said first of said data and address bus pairs and by said DSP core via said second of said data and address bus pairs, including means for giving accesses via predefined ones of said data and address bus pairs in accordance with predefined prioritization criteria.

6. The single chip digital signal processor of claim 5, wherein said predefined prioritization criteria give higher priority to accesses via said second of said data and address bus pairs than to said accesses via said first of said data and address bus pairs, said arbiter including means for stalling said DMA controller when accesses to any memory mapped resource via said first of said data and address bus pairs and second of said data and address bus pairs conflict until an access via said second of said data and address bus pairs is performed.

7. The single chip digital signal processor of claim 1, wherein said memory mapped memory locations coupled to said first bus pair include memory locations in said data memory in on-chip memory arrays internal to said single chip digital signal processor and further include memory locations in a memory device external to said single chip digital signal processor.

8. The single chip digital signal processor of claim 1, wherein said memory mapped memory locations coupled to said first bus pair include memory locations in said data memory and in said program memory in on-chip memory arrays internal to said single chip digital signal processor and further include memory locations in a memory device external to said single chip digital signal processor.

9. A single chip digital signal processor (DSP), comprising:

a plurality of on-chip peripheral interfaces for interfacing the DSP with peripheral devices external to said DSP;

a multiplicity of memory mapped resources, said memory mapped resources including data registers and memory locations in a memory array, each data register and memory location having a predefined memory mapped address;

a DSP core coupled to said memory array for executing DSP instructions stored in said memory array;

a direct memory access (DMA) controller coupled to said data memory and program memory, said DMA controller including:

a first set of registers for local data transfers between said memory mapped resources; said first set of registers including a data transfer register, an address source register and an address destination register;

a data transfer sequencer for executing data transfers for moving data from specified source locations among said memory mapped resources to specified destination locations among said memory mapped resources; and a host interface coupling said DMA controller to a host processor external to said DSP; said host interface including a second set of registers including a host input register for receiving data from said host processor, a host output register for holding data to be sent to said host processor, a host command register for storing commands received from said host processor, a host pointer register for receiving an address from said host processor wherein said received address specifies one of said memory mapped resources;

said host processor interface including a host address bus and host data bus interface for enabling said host processor to directly access said second set of registers at predefined host address bus addresses; and said DMA controller coupled to said memory array DSP core for performing local data transfers between specified ones of said memory mapped resources and for performing host data transfers between said host processor and said memory mapped resources;

a plurality of data and address bus pairs coupled to said memory array, DSP core and DMA controller, a first of said data and address bus pairs being dedicated to data transfers controlled by said DMA controller for transferring data between the host processor, said memory mapped resources and said peripheral devices, and a second of said data and address bus pairs dedicated to data transfers controlled by said DSP core for transferring data to and from said DSP core;

said DMA controller including a command controller for executing said command stored in said host command register, wherein said command stored in said host command register is selected from a predefined set of host commands that include commands for reading and writing any specified one of said memory mapped resources, commands for initiating burst data transfers between said host processor and a set of said memory mapped resources at a sequence of addresses, and commands for initiating cycle stealing data transfers between said host processor and a set of said memory mapped resources at a sequence of addresses wherein each cycle stealing data transfer is interleaved with any local data transfer that said DMA controller is performing.

10. The single chip digital signal processor of claim 9, wherein said memory mapped memory locations coupled to said first of said data and address bus pairs include memory locations in said data memory in on-chip memory arrays internal to said single chip digital signal processor and further include memory locations in a memory device external to said single chip digital signal processor; and said DMA controller includes means for transferring data between said external memory device and said host processor via said first of said data and address bus pairs and said host data bus.

11. A single chip digital signal processor (DSP), comprising:

a multiplicity of memory mapped resources, said memory mapped resources including data registers and memory locations in a memory array, each data register and memory location having a predefined memory mapped address;

a direct memory access (DMA) controller coupled to a data memory and program memory, said DMA controller including:

a data transfer sequencer for executing data transfers for moving data from specified source locations among said memory mapped resources to specified destination locations among said memory mapped resources;

a host interface coupling said DMA controller to a device external to said DSP; said host interface including a multiplicity of host interface registers for specifying data transfers between said external device and said memory mapped resources, a host data bus for transferring data to and from said external device coupled to said host interface, a host address bus for addressing said registers in said host interface, and a host control signal bus for sending and receiving data flow command signals; wherein said host interface registers include a host input data register comprising a plurality of host input data sub-registers separately addressable via said host address bus;

host mode means for specifying a first host mode value when said external device coupled to said host interface is a data processor and for specifying a second host mode value when said external device coupled to said host interface is a read only memory;

means for receiving a reset signal; and a boot sequencer, responsive to said reset signal and enabled when said host mode means specifies said second host mode value indicating that said host interface is coupled to said read only memory; said boot sequencer including means for automatically transferring a block of data from said read only memory into a predefined subset of said memory locations in said memory array, including means for repeatedly accessing a plurality of memory locations in said read only memory, loading data from sequentially accessed memory locations in said read only memory into said plurality of host input data sub-registers so as to fill said host input register with data, and for successively transferring data from said host input register to a sequence of memory mapped locations in said memory array.

12. The single chip digital signal processor of claim 11, said memory mapped resources including:

memory locations in a data memory for storing DSP data, and memory locations in a program memory for storing DSP instructions;

said DMA controller including a data transfer register for temporarily storing data, an address source register, an address destination register and a repeat counter register to specify source and destination addresses for a data transfer and to specify a quantity of data to be transferred;

said data transfer sequencer including means for executing a data transfer utilizing said data transfer, address source, address destination and repeat counter registers;

said host interface further including a host pointer register for storing a pointer to one of said memory mapped resources, a host output data register for storing data, and a host command register for receiving commands from an external device coupled to said host interface;

said boot sequencer including means for automatically setting said host pointer register to a predefined value, and for then repeatedly:

asserting address signals on said host address bus and control signals on said host control signal bus to sequentially access a plurality of memory locations in said read only memory and to load data from said sequentially accessed memory locations in said read only memory into said plurality of host input data sub-registers so as to fill said host input register with data; and transferring said data in said host input register to a memory mapped location specified by said host pointer register and for updating said host pointer register after each data transfer from said host input register to said memory mapped location.

* * * * *

UNITED STATES PATENT AND TRADEMARK OFFICE
CERTIFICATE OF CORRECTION

PATENT NO. : 5,535,417
DATED : July 9, 1996
INVENTOR(S) : TORU BAJI

It is certified that error appears in the above-indentified patent and that said Letters Patent is hereby corrected as shown below:

On the cover sheet, in item [75], insert -- -shi, Tokyo-- after "Kunitachi".

On the cover sheet, in item [56], add the following U.S. PATENT DOCUMENTS:

| | | | |
|---|---|---|---|
| 4,853,847 | 8/1989 | Ohuchi | 395/425 |
| 4,992,960 | 2/1991 | Yamaoka et al. | 395/164 |
| 5,057,996 | 10/1991 | Cutler et al. | 395/650 |
| 4,502,117 | 2/1985 | Kihara | 395/650 |
| 4,535,404 | 8/1985 | Shenk | 395/275 |
| 4,631,659 | 12/1986 | Hyan, II et al. | 395/325 |
| 4,636,656 | 1/1987 | Snowden et al. | 307/267 |
| 4,692,895 | 9/1987 | Huffman | 395/275 |
| 4,819,164 | 4/1989 | Branson | 395/550 |
| 4,520,458 | 5/1985 | Hattori et al. | 395/550 |
| 4,498,135 | 2/1985 | Caudel | 395/800 |
| 4,503,500 | 3/1985 | Magar | 395/800 |
| 4,935,867 | 6/1990 | Wang et al. | 395/400 |

UNITED STATES PATENT AND TRADEMARK OFFICE
CERTIFICATE OF CORRECTION

PATENT NO. : 5,535,417
DATED : July 9, 1996
INVENTOR(S) : TORU BAJI

It is certified that error appears in the above-indentified patent and that said Letters Patent is hereby corrected as shown below:

```
5,151,986  9/1992   Langan et al. ............395/550
4,245,305  1/1981   Gechele et al. ..........395/275
5,070,473  12/1991  Takano et al. ...........395/725
4,958,276  9/1990   Kiuchi et al. ...........395/425
```

In the drawings, in figure 4A.1 (sheet 6 of 43), label the outer box as --DMAC 3000--.

In the drawings, in figure 4A.2 (sheet 7, of 43), replace "dam" with --dau--.

In the drawings, in figure 5A (sheet 18 of 43), in the operation sequence description corresponding to micro function number 3, after "dp" inset --++--.

In the drawings, in figure 22 (sheet 41 of 43), in column 3, replace "All registers read?" with --All registers written?--.

UNITED STATES PATENT AND TRADEMARK OFFICE
CERTIFICATE OF CORRECTION

PATENT NO. : 5,535,417
DATED : July 9, 1996
INVENTOR(S) : TORU BAJI

Page 3 of 4

It is certified that error appears in the above-indentified patent and that said Letters Patent is hereby corrected as shown below:

At column 1, line 37, insert --, now abandoned-- after "1993".

At column 4, line 22, make a new paragraph at "FIG. 17".

At column 11, line 55, replace "to keeps track" with --to keep track--.

At column 13, line 13, replace "to specifying the" with --to specify the--.

At column 13, line 49, replace "mad/write" with --read/write--.

At column 14, line 33, replace "in integrated" with --is integrated--.

At column 20, line 2, replace "is not be sent" with --is not sent--.

At column 22, line 13, replace "hstr1 0315" with --hstr1 3015--.

At column 24, line 34, replace "registers is accesses" with --register is accessed--.

UNITED STATES PATENT AND TRADEMARK OFFICE
CERTIFICATE OF CORRECTION

PATENT NO. : 5,535,417
DATED : July 9, 1996
INVENTOR(S) : TORU BAJI

It is certified that error appears in the above-indentified patent and that said Letters Patent is hereby corrected as shown below:

At column 26, line 53, following "DMAC", insert --.--.

At column 29, line 36, replace "is the especially" with --is especially--.

Signed and Sealed this

Fifteenth Day of April, 1997

Attest:

BRUCE LEHMAN

Attesting Officer     Commissioner of Patents and Trademarks